US012621760B2

(12) United States Patent (10) Patent No.: US 12,621,760 B2
Babaei (45) Date of Patent: May 5, 2026

(54) NETWORK CONTROLLED REPEATER

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 306 days.

(21) Appl. No.: 18/218,066

(22) Filed: Jul. 4, 2023

(65) Prior Publication Data

US 2024/0007943 A1 Jan. 4, 2024

Related U.S. Application Data

(60) Provisional application No. 63/358,201, filed on Jul. 4, 2022.

(51) Int. Cl.
H04W 48/20 (2009.01)
H04W 72/25 (2023.01)
H04W 76/20 (2018.01)
(52) U.S. Cl.
CPC ........... H04W 48/20 (2013.01); H04W 72/25 (2023.01); H04W 76/20 (2018.02)
(58) Field of Classification Search
CPC .................................................... H04W 48/20
See application file for complete search history.

(56) References Cited

U.S. PATENT DOCUMENTS

2023/0268982 A1* 8/2023 Li ...................... H04B 7/15507
370/315

OTHER PUBLICATIONS

3GPP TS 38.211 V17.2.0 (Jun. 2022); Technical Specification; 3rd Generation Partnership Project; Technical Specification Group Radio Access Network; NR; Physical channels and modulation; (Release 17).
3GPP TS 38.212 V17.2.0 (Jun. 2022); Technical Specification; 3rd Generation Partnership Project; Technical Specification Group Radio Access Network; NR; Multiplexing and channel coding; (Release 17).
3GPP TS 38.213 V17.2.0 (Jun. 2022); Technical Specification; 3rd Generation Partnership Project; Technical Specification Group Radio Access Network; NR; Physical layer procedures for control; (Release 17).
3GPP TS 38.214 V17.2.0 (Jun. 2022); Technical Specification; 3rd Generation Partnership Project; Technical Specification Group Radio Access Network; NR; Physical layer procedures for data; (Release 17).
3GPP TS 38.300 V17.0.0 (Mar. 2022); Technical Specification; 3rd Generation Partnership Project; Technical Specification Group Radio Access Network; NR; NR and NG-RAN Overall Description; Stage 2; (Release 17).

(Continued)

*Primary Examiner* — Pamit Kaur
(74) *Attorney, Agent, or Firm* — Alireza Babaei

(57) ABSTRACT

An NCR may receive, from a base station, a SIB message comprising an IE indicating that a cell supports an NCR. An NCR may be an RF repeater for amplifying and forwarding of signals between a wireless device and a base station based on side control information received by the NCR from the base station. The NCR may select the cell based on the SIB message comprising the IE indicating that the cell supports an NCR.

20 Claims, 43 Drawing Sheets

(56) References Cited

OTHER PUBLICATIONS

3GPP TS 38.321 V17.0.0 (Mar. 2022); Technical Specification; 3rd Generation Partnership Project; Technical Specification Group Radio Access Network; NR; Medium Access Control (MAC) protocol specification; (Release 17).

3GPP TS 38.331 V17.0.0 (Mar. 2022); Technical Specification; 3rd Generation Partnership Project; Technical Specification Group Radio Access Network; NR; Radio Resource Control (RRC); Protocol specification; (Release 17).

3GPP TSG-RAN WG1 Meeting #109-e; R1-2203133; e-Meeting, May 9-20, 2022; Agenda Item: 9.8.1; Source: Huawei, HiSilicon; Title: Discussions on side control information to enable NR network-controlled repeaters; Document for: Discussion and Decision.

3GPP TSG-RAN WG1 Meeting #109-e; R1-2203134; e-Meeting, May 9-20, 2022; Agenda Item: 9.8.2; Source: Huawei, HiSilicon; Title: Discussion on L1/L2 signaling for side control information; Document for: Discussion and Decision.

3GPP TSG RAN WG1 #109-e; R1-2203236; e-Meeting, May 9-May 20, 2022; Source: ZTE; Title: Work plan for NR network-controlled repeaters; Agenda Item: 9.8; Document for: Discussion.

3GPP TSG RAN WG1 #109-e; R1-2203237; e-Meeting, May 9-May 20, 2022; Source: ZTE; Title: Discussion on side control information to enable NR network-controlled repeaters; Agenda Item: 9.8.1; Document for: Discussion.

3GPP TSG RAN WG1 #109-e; R1-2203238; e-Meeting, May 9-May 20, 2022; Source: ZTE; Title: Discussion on L1/L2 signaling for side control information; Agenda Item: 9.8.2; Document for: Discussion.

3GPP TSG RAN WG1 #109-e; R1-2203239; e-Meeting, May 9-May 20, 2022; Source: ZTE; Title: Discussion on other issues for NR network-controlled repeater, Agenda Item: 9.8.3; Document for: Discussion.

3GPP TSG RAN WG1 #109-e; R1-2203343; e-Meeting, May 9-20, 2022; Agenda Item: 9.8.1; Source: Spreadtrum Communications; Title: Discussion on side control information to enable NR network-controlled repeaters; Document for: Discussion and decision.

3GPP TSG RAN WG1 #109; R1-2203354; e-Meeting, May 9-20, 2022; Agenda item: 9.8.1; Source: Nokia, Nokia Shanghai Bell; Title: Discussion on side control information to enable NR network-controlled repeaters; Document for: Discussion and Decision.

3GPP TSG RAN WG1 #109; R1-2203355; e-Meeting, May 9-20, 2022; Agenda item: 9.8.2; Source: Nokia, Nokia Shanghai Bell; Title: Discussion on L1/L2 signaling for side control information of Network-Controlled Repeater; Document for: Discussion and Decision.

3GPP TSG RAN WG1 #109-e; R1-2203376; e-Meeting, May 9-20, 2022; Agenda Item: 9.8.1; Source: InterDigital, Inc.; Title: Discussions on side control information to enable NR network-controlled repeaters; Document for: Discussion and Decision.

3GPP TSG RAN WG1 #109-e; R1-2203377; e-Meeting, May 9-May 20, 2022; Agenda Item: 9.8.2; Source: InterDigital, Inc.; Title: Discussion on L1/L2 Signaling for Side Control Information; Document for: Discussion and Decision.

3GPP TSG RAN WG1 #109-e; R1-2203476; e-Meeting, May 9-May 20, 2022; Source: CATT; Title: Side control Information to enable NR network-controlled repeaters; Agenda Item: 9.8.1; Document for: Discussion and Decision.

3GPP TSG RAN WG1 #109-e; R1-2203477; e-Meeting, May 9-May 20, 2022; Source: CATT; Title: Discussion on signaling for side control information for NR network-controlled repeaters; Agenda Item: 9.8.2; Document for: Discussion and Decision.

3GPP TSG RAN WG1 #109-e; R1-2203578; e-Meeting, May 9-20, 2022; Source: vivo; Title: Discussion on side control information to enable NR network-controlled repeaters; Agenda Item: 9.8.1; Document for: Discussion and Decision.

3GPP TSG RAN WG1 #109-e; R1-2203579; e-Meeting, May 9-20, 2022; Source: vivo; Title: Discussion on L1/L2 signaling for side control information; Agenda Item: 9.8.2; Document for: Discussion and Decision.

3GPP TSG RAN WG1 #109-e; R1-2203580; e-Meeting, May 9-20, 2022; Source: vivo; Title: Discussion on in-band repeater; Agenda Item: 9.8.3; Document for: Discussion and Decision.

3GPP TSG RAN WG1 #109-e; R1-2203697; Electronic Meeting, May 9-20, 2022; Source: NEC; Title: Discussion on side control information for network-controlled repeaters; Agenda item: 9.8.1; Document for: Discussion and Decision.

3GPP TSG RAN WG1 #109-e; R1-2203698; Electronic Meeting, May 9-20, 2022; Source: NEC; Title: Discussion on signaling for side control information; Agenda item: 9.8.2; Document for: Discussion and Decision.

3GPP TSG RAN WG1#109-e; R1-2203741; E-meeting, May 9-20, 2022; Agenda Item: 9.8.1; Source: Sony; Title: Considerations on side control information to enable NR network-controlled repeaters; Document for: Discussion and decision.

3GPP TSG RAN WG1#109-e; R1-2203742; E-meeting, May 9-20, 2022; Agenda Item: 9.8.2; Source: Sony; Title: Considerations on L1/L2 signaling for side control information; Document for: Discussion and decision.

3GPP TSG RAN WG1 #109-e; R1-2203832; e-Meeting, May 9-20, 2022; Agenda item: 9.8.1; Source: Xiaomi; Title: Discussion on side control information to enable NR network-controlled repeaters; Document for: Decision.

3GPP TSG RAN WG1 #109-e; R1-2203833; e-Meeting, May 9-20, 2022; Agenda item: 9.8.2; Source: Xiaomi; Title: Discussion on L1/L2 signalling for side control information; Document for: Decision.

3GPP TSG RAN WG1 #109-e; R1-2203921; e-Meeting, May 9-20, 2022; Agenda item: 9.8.1; Source: Samsung; Title: Side control information to enable NR network-controlled repeaters; Document for: Discussion and Decision.

3GPP TSG RAN WG1 #109-e; R1-2203922; e-Meeting, May 9-20, 2022; Agenda item: 9.8.2; Source: Samsung; Title: L1/L2 signaling for side control information; Document for: Discussion and Decision.

3GPP TSG RAN WG1 #109-e; R1-2204064; e-Meeting, May 9-20, 2022; Agenda Item: 9.8.1; Source: Lenovo; Title: Discussion on side control information for network-controlled repeater; Document for: Discussion.

3GPP TSG RAN WG1 #109-e; R1-2204065; e-Meeting, May 9-20, 2022; Agenda Item: 9.8.2; Source: Lenovo; Title: Discussion on L1/L2 signaling for side control information of network-controlled repeaters; Document for: Discussion.

3GPP TSG RAN WG1 #109-e; R1-2204066; eMeeting, May 9-20, 2022; Agenda item: 9.8.1; Source: Charter Communications; Title: Side Control Information for Network-Controlled Repeaters; Document for: Discussion.

3GPP TSG RAN WG1 Meeting #109-e; R1-2204067; eMeeting, May 9-20, 2022; Agenda item: 9.8.3; Source: Charter Communications; Title: Deployment Scenarios for Network-Controlled Repeaters; Document for: Discussion.

3GPP TSG RAN WG1 #109-e; R1-2204086; e-Meeting, May 9-20, 2022; Source: CableLabs; Title: Side Control Information for supporting initial access; Agenda Item: 9.8.1; Document for: Discussion and Decision.

3GPP TSG RAN WG1 Meeting #109-e; R1-2204119; e-Meeting, May 9-20, 2022; Source: Sharp; Title: Side control information for network-controlled repeaters; Item: 9.8.1; Document for: Discussion and Decision.

3GPP TSG RAN WG1 #109-e; R1-2204258; e-Meeting, May 9-20, 2022; Source: Apple Inc.; Title: Potential Side Control Information for NW-Controlled Repeater; Agenda item: 9.8.1; Document for: Discussion and Decision.

3GPP TSG-RAN WG1 Meeting #109-e; R1-2204259; e-Meeting, May 9-20, 2022; Agenda Item: 9.8.2; Source: Apple Inc.; Title: Discussion on L1/L2 signaling for side control information; Document for: Discussion/Decision.

3GPP TSG RAN WG1 #109-e; R1-2204321; e-Meeting, May 9-May 20, 2022; Agenda item: 9.8.1; Source: CMCC; Title: Discussion on side control information to enable NR network-controlled repeaters; Document for: Discussion and Decision.

(56)                References Cited

OTHER PUBLICATIONS

3GPP TSG RAN WG1 #109-e; R1-2204322; e-Meeting, May 9-May 20, 2022; Agenda item: 9.8.2; Source: CMCC; Title: Discussion on L1/L2 signaling for side control information; Document for: Discussion and Decision.

3GPP TSG RAN WG1 #109-e; R1-2204393; e-Meeting, May 9-20, 2022; Source: NTT Docomo, Inc.; Title: Discussion on side control information to enable NR network-controlled repeaters; Agenda Item: 9.8.1; Document for: Discussion.

3GPP TSG RAN WG1 #109-e; R1-2204394; e-Meeting, May 9-20, 2022; Source: NTT Docomo, Inc.; Title: Discussion on L1/L2 signaling for side control information; Agenda Item: 9.8.2; Document for: Discussion and Decision.

3GPP TSG RAN WG1 #109-e; R1-2204532; e-Meeting, May 9-20, 2022; Agenda Item: 9.8.1; Source: LG Electronics; Title: Discussion on side control information for NCR; Document for: Discussion and decision.

3GPP TSG RAN WG1 #109-e; R1-2204533; e-Meeting, May 9-20, 2022; Agenda Item: 9.8.2; Source: LG Electronics; Title: Discussion on L1/L2 Signaling for Side Control Information; Document for: Discussion and decision.

3GPP TSG RAN WG1 #109-e; R1- 2204534; e-Meeting, May 9-20, 2022; Agenda Item: 9.8.3; Source: LG Electronics; Title: Discussion on operation scenarios for NCR; Document for: Discussion and decision.

3GPP TSG RAN WG1 #109-e; R1-2204565; e-Meeting, May 9-20, 2022; Source: Panasonic; Title: Discussion on side control signals for network-controlled repeaters; Agenda Item: 9.8.1; Document for: Discussion.

3GPP TSG RAN WG1 #109-e; R1-2204610; e-Meeting, May 9-20, 2022; Source: CAICT; Title: Discussion on side control information to enable NR network-controlled repeaters; Agenda Item: 9.8.1; Document for: Discussion and Decision.

3GPP TSG-RAN WG1 Meeting #109-e; R1-2204643; Online, May 9-20, 2022; Agenda Item: 9.8.2; Source: Ericsson; Title: Signaling of control information for NW-controlled repeaters; Document for: Discussion, Decision.

3GPP TSG-RAN WG1 Meeting #109-e; R1-2204644; Online, May 9-20, 2022; Agenda Item: 9.8.3; Source: Ericsson; Title: Terminology for NW-controlled repeaters; Document for: Discussion, Decision.

3GPP TSG RAN WG1 #109-e; R1-2204653; e-Meeting, May 9-20, 2022; Agenda item: 9.8.1; Source: ETRI; Title: Discussion on side control information for network-controlled repeater; Document for: Discussion/Decision.

3GPP TSG RAN WG1 #109-e; R1-2204654; e-Meeting, May 9-20, 2022; Agenda item: 9.8.2; Source: ETRI; Title: Discussion on L1/L2 signaling for side control information; Document for: Discussion/Decision.

3GPP TSG RAN WG1 #109-e; R1-2204688; e-Meeting, May 9-20, 2022; Agenda item: 9.8.1; Source: MediaTek Inc.; Title: Side control information for network-controlled repeaters; Document for: Discussion/Decision.

3GPP TSG RAN WG1 #109-e; R1-2204689; e-Meeting, May 9-20, 2022; Agenda item: 9.8.2; Source: MediaTek Inc.; Title: L1/L2 control signaling for enabling network controlled repeaters; Document for: Discussion/Decision.

3GPP TSG RAN WG1 Meeting #109-e; R1-2204757; May 9-May 20, 2022; Agenda Item: 9.8.1; Source: CEWiT, IIT-K, IIT-M, Reliance Jio, Saankhya Labs; Title: Discussion on Side control information to enable NR network-controlled repeaters; Document for: Discussion.

3GPP TSG RAN WG1 Meeting #109-e; R1-2204758; May 9-May 20, 2022; Agenda Item: 9.8.2; Source: CEWiT, IIT-K, IIT-M, Reliance Jio, Saankhya Labs; Title: Discussion on L1/L2 signaling for side control information for NCR; Document for: Discussion.

3GPP TSG RAN WG1 #109-e; R1-2204813; e-Meeting, May 9-20, 2022; Source: Intel Corporation; Title: Discussion on Side control information to enable NR network-controlled repeater; Agenda item: 9.8.1; Document for: Discussion and Decision.

3GPP TSG RAN WG1 #109-e; R1-2204814; e-Meeting, May 9-20, 2022; Source: Intel Corporation; Title: Discussions on L1/L2 signaling for side control information; Agenda item: 9.8.2; Document for: Discussion and Decision.

3GPP TSG RAN WG1 #109-e; R1-2204847; e-Meeting, May 9-20, 2022; Agenda Item: 9.8.1; Source: KDDI; Title: Discussion on side control information to enable NR network-controlled repeaters; Document for: Discussion and decision.

3GPP TSG-RAN WG1 #109-e; R1-2204864; e-Meeting, May 9-20, 2022; Agenda Item: 9.8.1; Source: AT Title: Side control information to enable NR network-controlled repeaters; Document for: Discussion/Approval.

3GPP TSG-RAN WG1 Meeting #109-e; R1-2204930; e-Meeting, May 9-20, 2022; Agenda Item: 9.8.3; Source: Huawei, HiSilicon; Title: Other considerations for NR network-controlled repeaters; Document for: Discussion and Decision.

3GPP TSG RAN WG1 #109-e; R1-2205047; e-Meeting, May 9-20, 2022; Agenda item: 9.8.1; Source: Qualcomm Incorporated; Title: On side control information for network controlled repeaters (NCR); Document for: Discussion/Decision.

3GPP TSG RAN WG1 #109-e; R1-2205048; e-Meeting, May 9-20, 2022; Agenda item: 9.8.2; Source: Qualcomm Incorporated; Title: On L1-L2 signaling for side control information for NCR; Document for: Discussion/Decision.

3GPP TSG RAN WG1 #109-e; R1- 2205068; e-Meeting, May 9-May 20, 2022; Source: Rakuten Mobile Inc.; Title: Initial view on network-controlled repeater, Agenda: 9.8.1; Document for: Discussion.

3GPP TSG RAN WG1 #109-e; R1-2205069; e-Meeting, May 9-May 20, 2022; Source: Rakuten Mobile Inc.; Title: Initial view on signaling for Network-controlled repeater; Agenda: 9.8.2; Document for: Discussion.

3GPP TSG RAN WG1 #109-e; R1-2205085; e-Meeting, May 9-20, 2022; Source: Fujitsu; Title: Side control Information for NR network-controlled repeaters; Agenda item: 9.8.1; Document for: Discussion and decision.

3GPP TSG RAN WG1 #109-e; R1-2205086; e-Meeting, May 9-20, 2022; Source: Fujitsu; Title: NR network-controlled repeaters receive signaling of side control information; Agenda item: 9.8.2; Document for: Discussion and decision.

3GPP TR 38.867 V0.1.0 (May 2022); Technical Report; 3rd Generation Partnership Project; Technical Specification Group Radio Access network; Study on NR network-controlled repeaters; (Release 18).

3GPP TSG RAN Meeting #94e; RP-213700; Electronic Meeting, Dec. 6-17, 2021; Source: ZTE Corporation; Title: New SI: Study on NR Network-controlled Repeaters; Document for: Approval; Agenda Item: 8.6.1.

* cited by examiner

PBCH PSS SSS time

P3

P1

P2

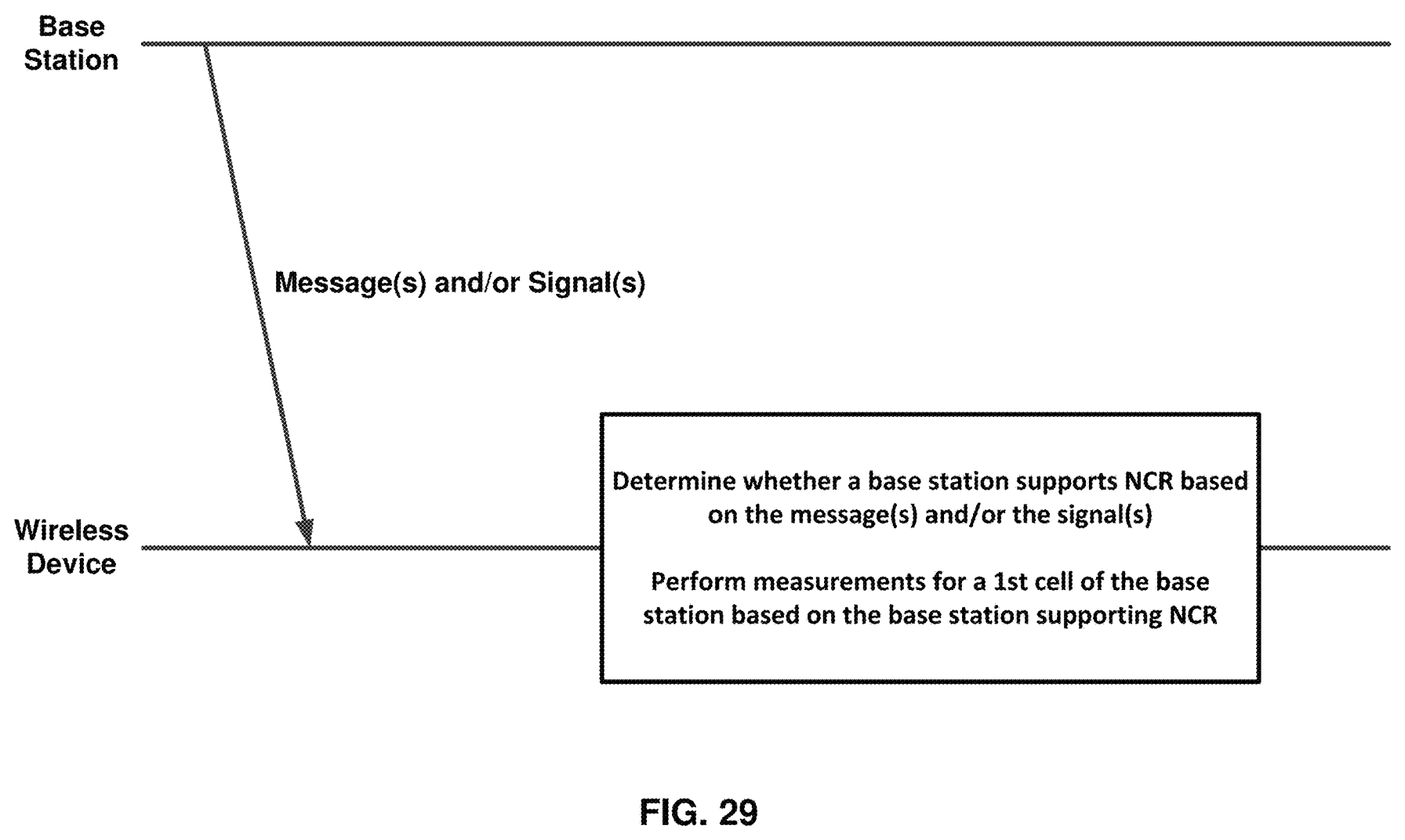

Base
Station

Wireless
Device

Message(s) and/or Signal(s)

Determine whether a base station supports NCR based on the message(s) and/or the signal(s)

Perform measurements for a 1st cell of the base station based on the base station supporting NCR

FIG. 29

Config parameters of 1st cell(s) of cell(s) based on an indication from the 2nd base station to the 1st base station related to NCR support Measurement report (measurement info associated with cell(s) of a 2nd BS)

1st Base Station

Wireless Device

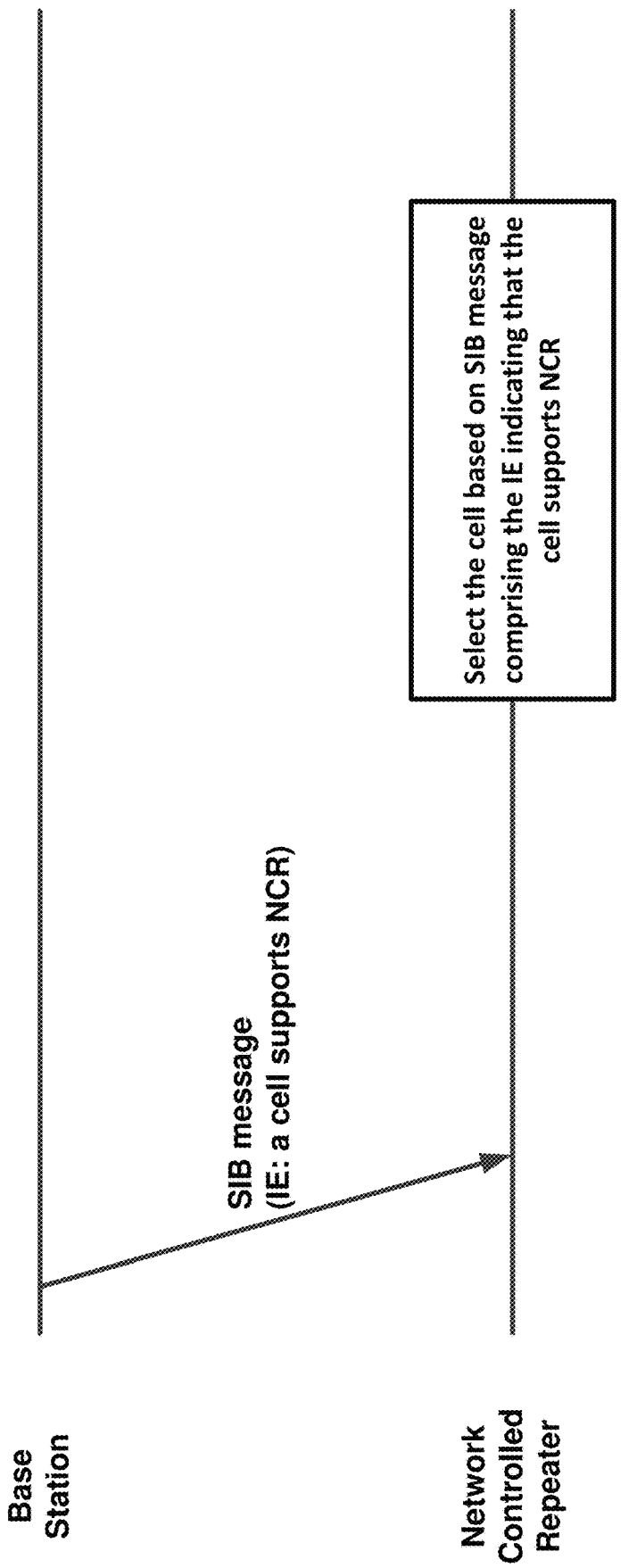

Select the cell based on SIB message comprising the IE indicating that the cell supports NCR SIB message
(IE: a cell supports NCR)

Base Station

Network Controlled Repeater

NCR: RF repeater comprising a 1st entity and a 1st function

1st entity: for communications with the BS and receiving SCI via a control link between 1st entity and BS 1st function: for amplifying and forwarding of signals between a wireless device and the BS based on SCI

FIG. 37

Figure 38:
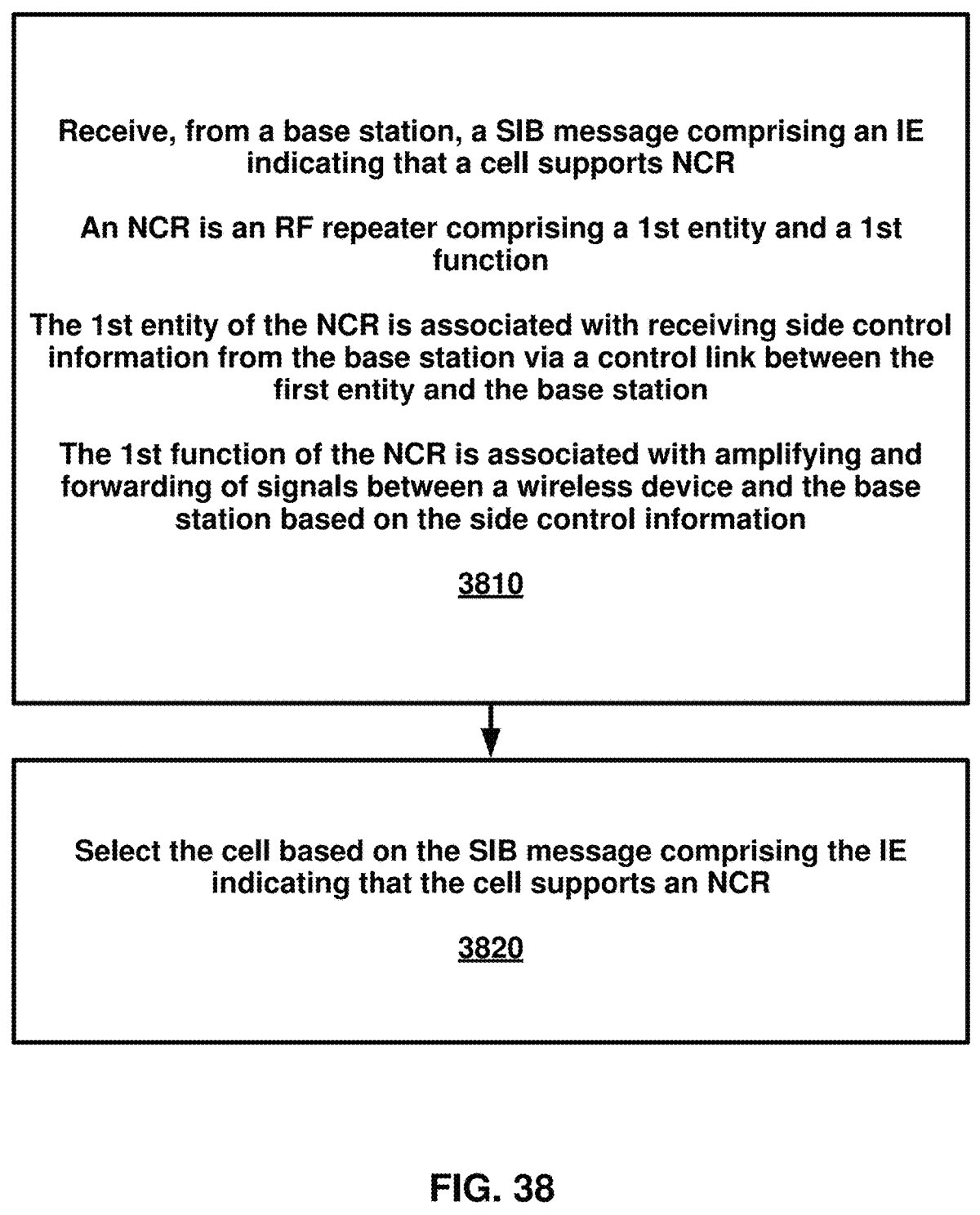

Receive, from a base station, a SIB message comprising an IE indicating that a cell supports NCR An NCR is an RF repeater comprising a 1st entity and a 1st function The 1st entity of the NCR is associated with receiving side control information from the base station via a control link between the first entity and the base station The 1st function of the NCR is associated with amplifying and forwarding of signals between a wireless device and the base station based on the side control information

3810

Select the cell based on the SIB message comprising the IE indicating that the cell supports an NCR

Figure 39:
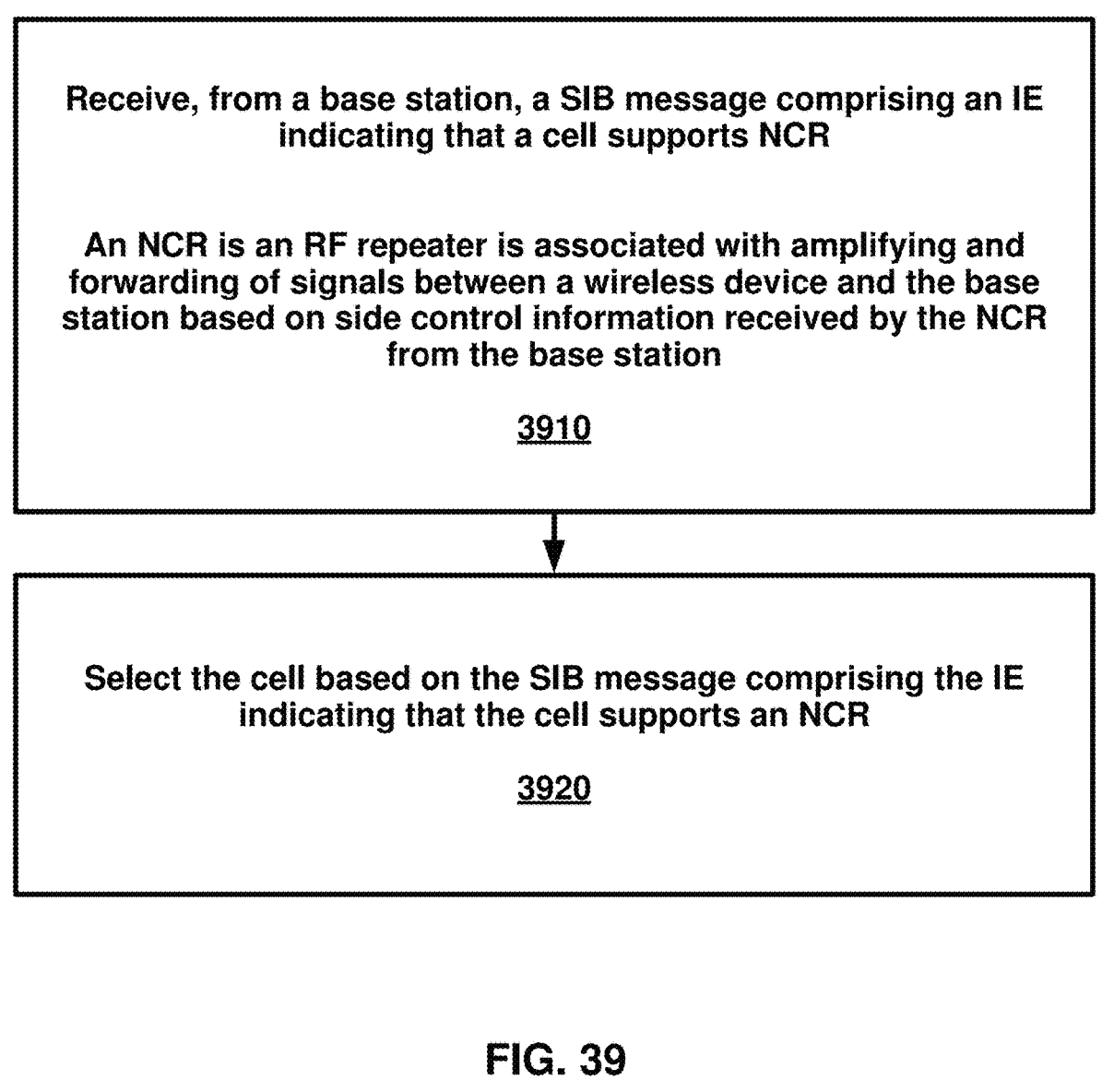

Receive, from a base station, a SIB message comprising an IE indicating that a cell supports NCR An NCR is an RF repeater is associated with amplifying and forwarding of signals between a wireless device and the base station based on side control information received by the NCR from the base station

3910

Select the cell based on the SIB message comprising the IE indicating that the cell supports an NCR

Figure 40:
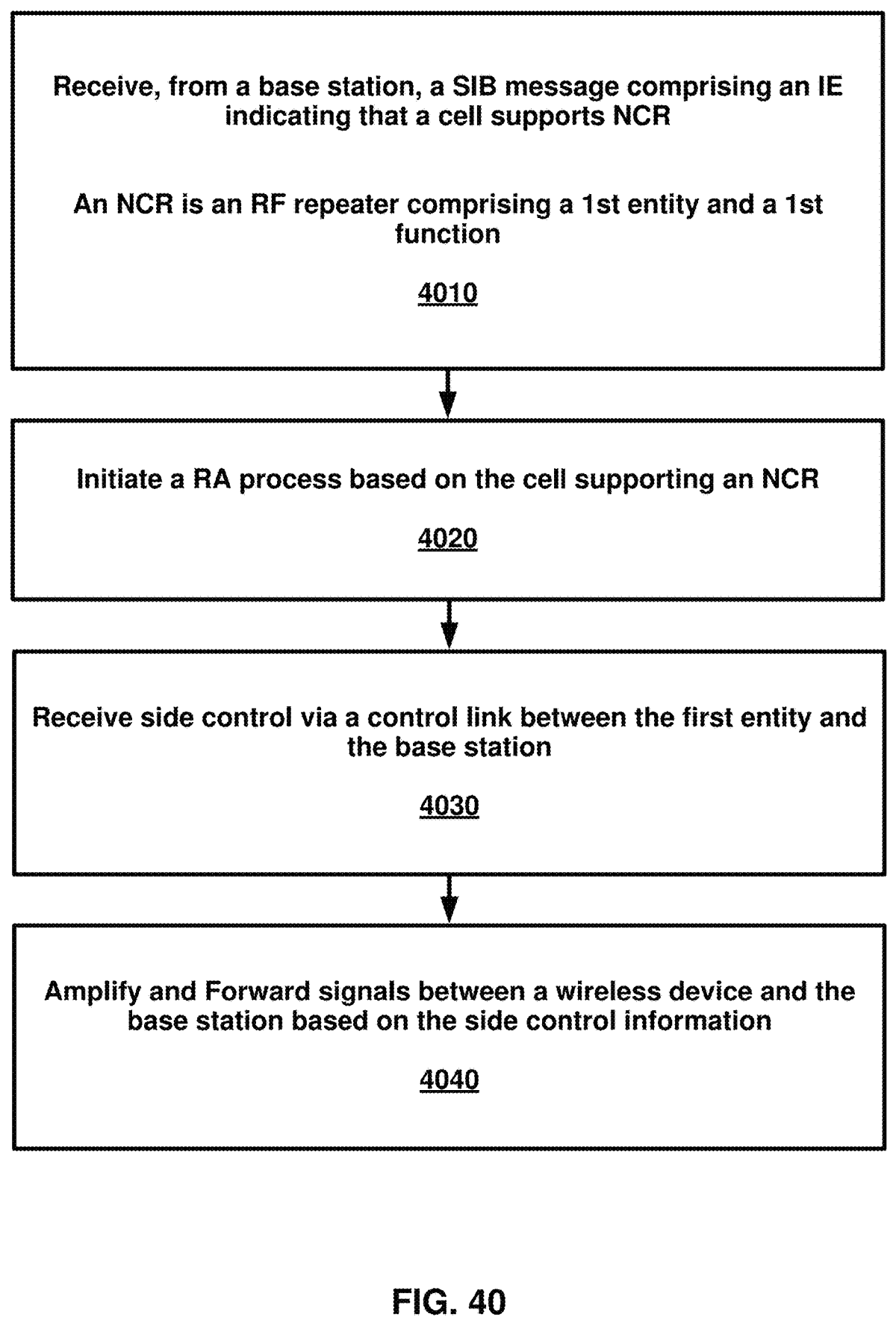

Receive, from a base station, a SIB message comprising an IE indicating that a cell supports NCR An NCR is an RF repeater comprising a 1st entity and a 1st function

4010

Initiate a RA process based on the cell supporting an NCR

4020

Receive side control via a control link between the first entity and the base station

4030

Amplify and Forward signals between a wireless device and the base station based on the side control information

Figure 41:
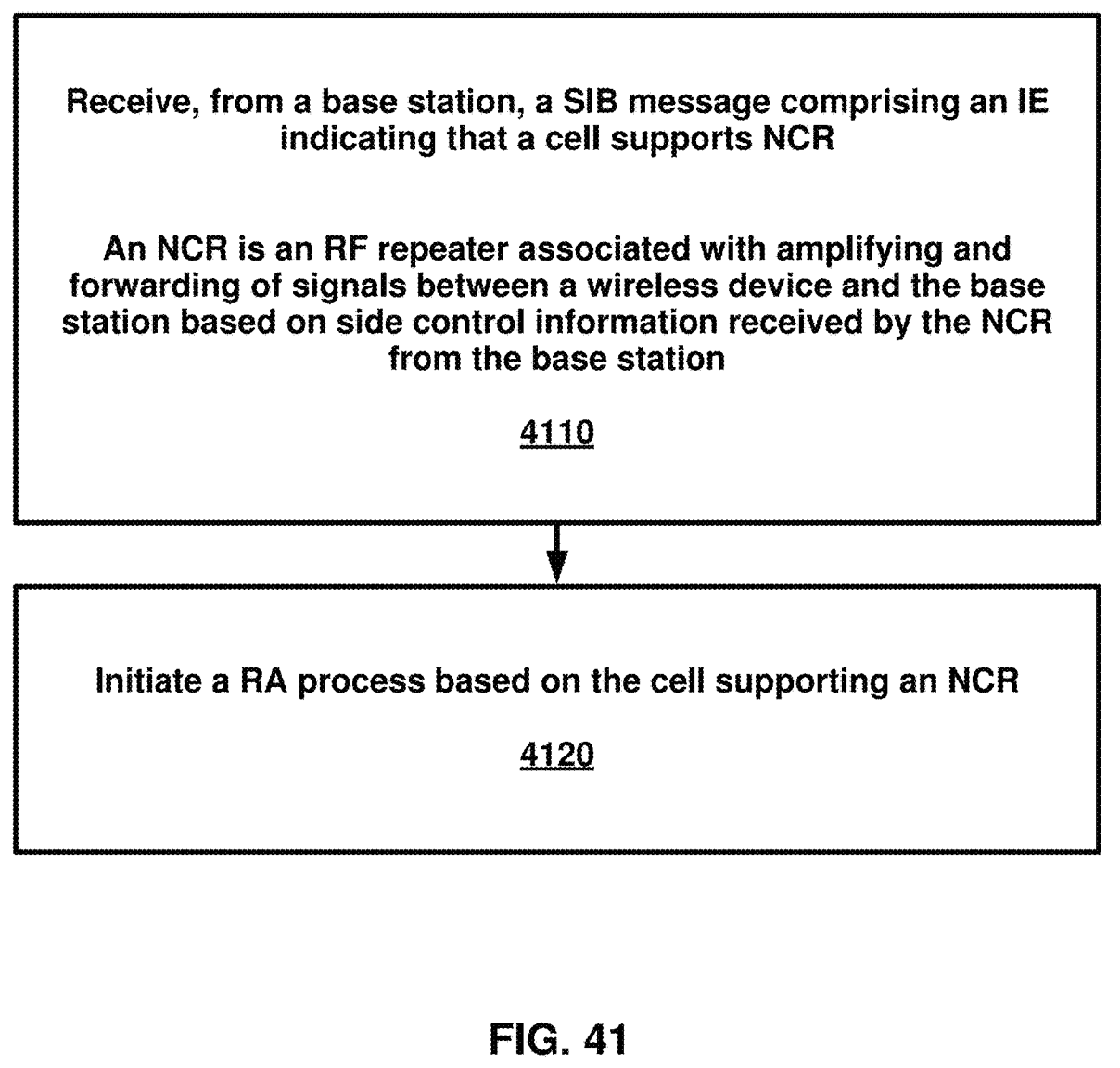

Receive, from a base station, a SIB message comprising an IE indicating that a cell supports NCR An NCR is an RF repeater associated with amplifying and forwarding of signals between a wireless device and the base station based on side control information received by the NCR from the base station <u>4110</u>

Initiate a RA process based on the cell supporting an NCR

Figure 42:
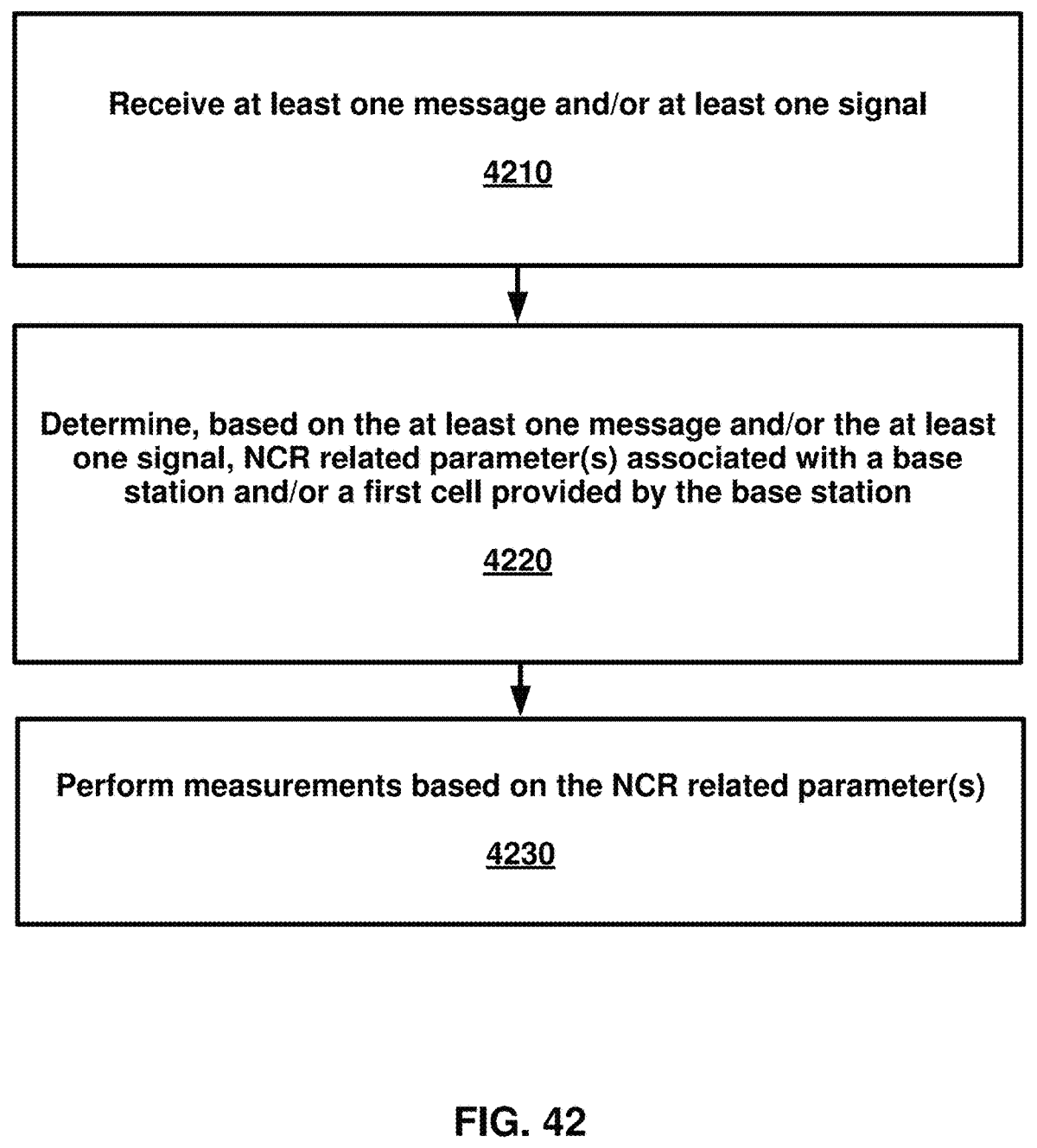

Receive at least one message and/or at least one signal

4210

Determine, based on the at least one message and/or the at least one signal, NCR related parameter(s) associated with a base station and/or a first cell provided by the base station

4220

Perform measurements based on the NCR related parameter(s)

Figure 43:
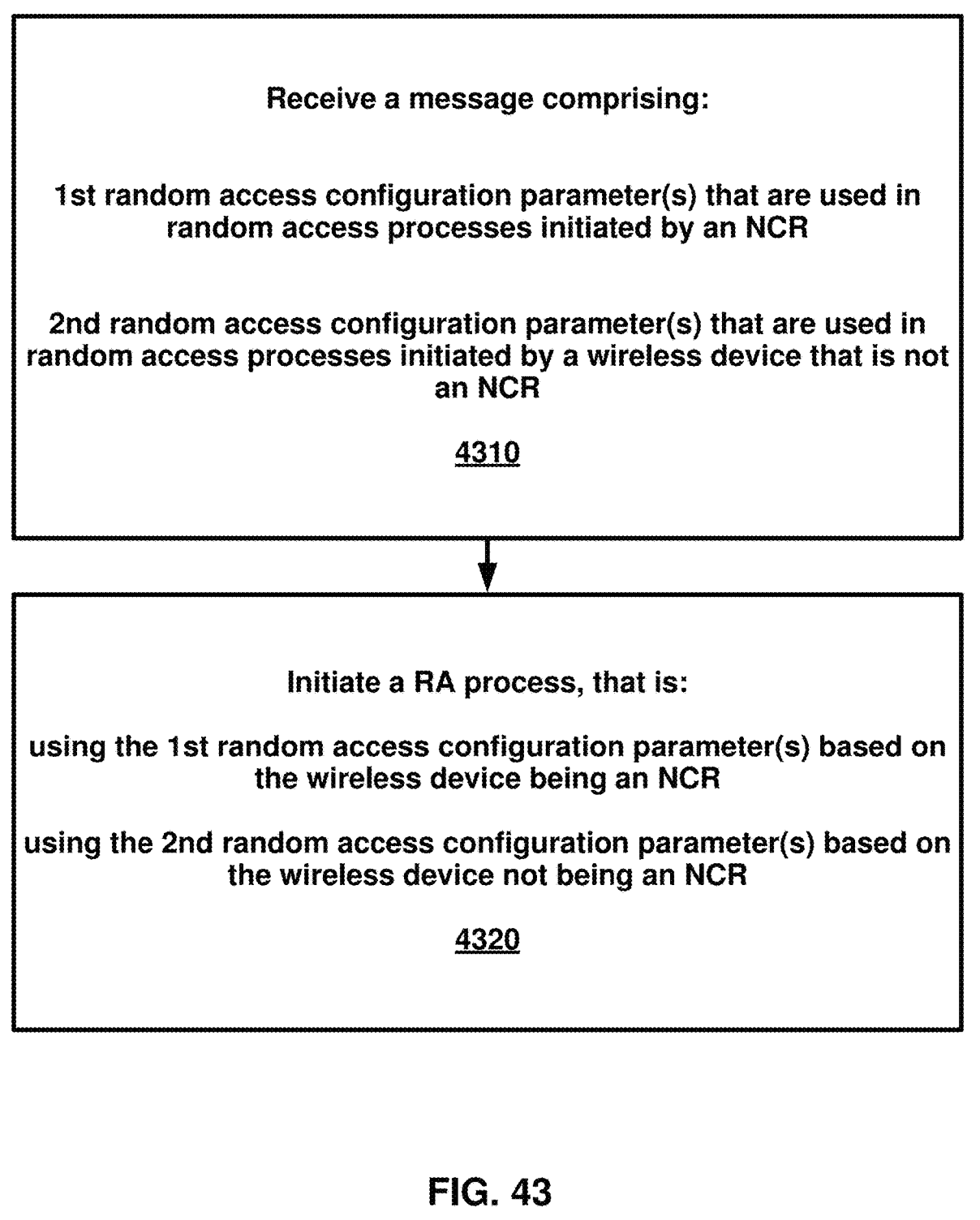

Receive a message comprising:

1st random access configuration parameter(s) that are used in random access processes initiated by an NCR 2nd random access configuration parameter(s) that are used in random access processes initiated by a wireless device that is not an NCR

4310

Initiate a RA process, that is:

using the 1st random access configuration parameter(s) based on the wireless device being an NCR using the 2nd random access configuration parameter(s) based on the wireless device not being an NCR

NETWORK CONTROLLED REPEATER

CROSS-REFERENCE TO RELATED APPLICATIONS

This application claims the benefit of U.S. Provisional Application No. 63/358,201, filed Jul. 4, 2022, which is hereby incorporated by reference in its entirety.

BRIEF DESCRIPTION OF THE DRAWINGS

FIG. 29 shows an example process in accordance with several of various embodiments of the present disclosure.

FIG. 37 shows an example process in accordance with several of various embodiments of the present disclosure.

FIG. 38 shows an example flow diagram in accordance with several of the various embodiments of the present disclosure.

FIG. 39 shows an example flow diagram in accordance with several of the various embodiments of the present disclosure.

FIG. 40 shows an example flow diagram in accordance with several of the various embodiments of the present disclosure.

FIG. 41 shows an example flow diagram in accordance with several of the various embodiments of the present disclosure.

FIG. 42 shows an example flow diagram in accordance with several of the various embodiments of the present disclosure.

FIG. 43 shows an example flow diagram in accordance with several of the various embodiments of the present disclosure.

DETAILED DESCRIPTION

The exemplary embodiments of the disclosed technology enhance the processes in a wireless device (e.g., a network controlled repeater (NCR) wireless device or a non-NCR wireless device) and/or one or more base stations for network energy saving. The exemplary disclosed embodiments may be implemented in the technical field of wireless communication systems. More particularly, the embodiments of the disclosed technology enhance processes and associated signaling for a network controlled repeater (NCR) to extend coverage based on side control information received by the NCR from network.

The devices and/or nodes of the mobile communications system disclosed herein may be implemented based on various technologies and/or various releases/versions/ amendments of a technology. The various technologies include various releases of long-term evolution (LTE) technologies, various releases of 5G new radio (NR) technologies, various wireless local area networks technologies and/ or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figures 1A, 1B:
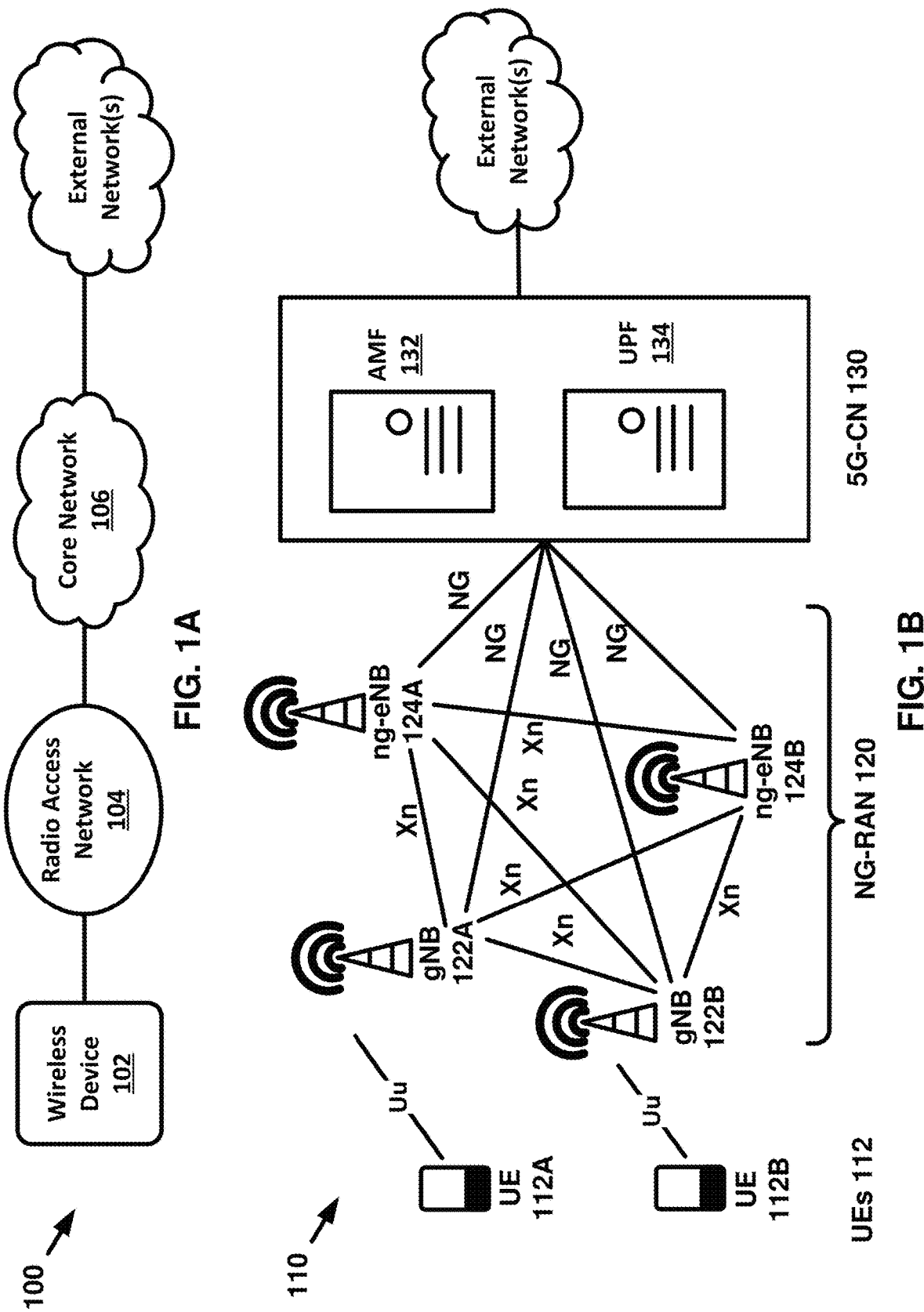
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including servicebased architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an under-lying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility man-agement, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be con-nected using the Uu interface using the LTE user plane and control plane protocol stack.

In the example mobile communications system of FIG. 1B, a 5G-CN is connected to a RAN comprised of 4G LTE and/or 5G NR RATs. In other example mobile communica-tions systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone operation, the 5G NR gNB is connected to a 5G-CN and the user plane and the control plane functionalities are provided by the 5G NR gNB.

Figure 2A:
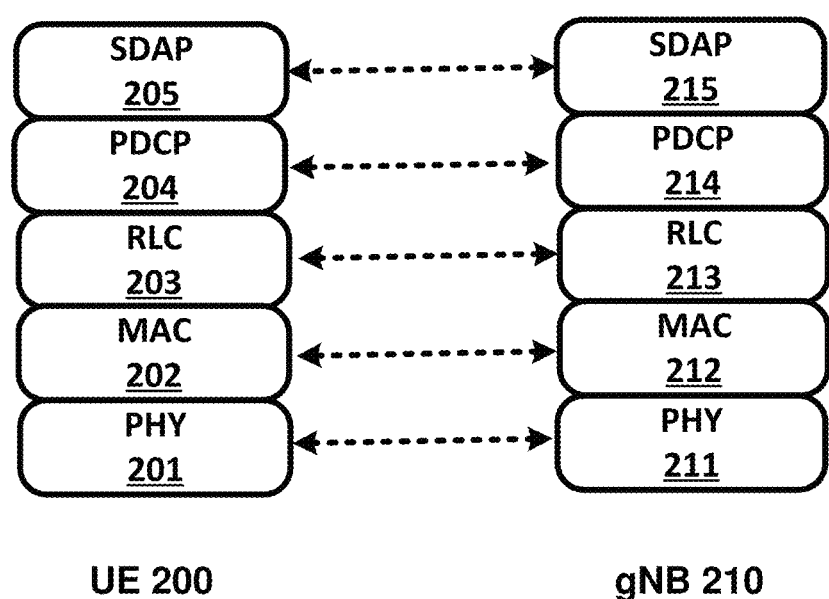
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data conver-gence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
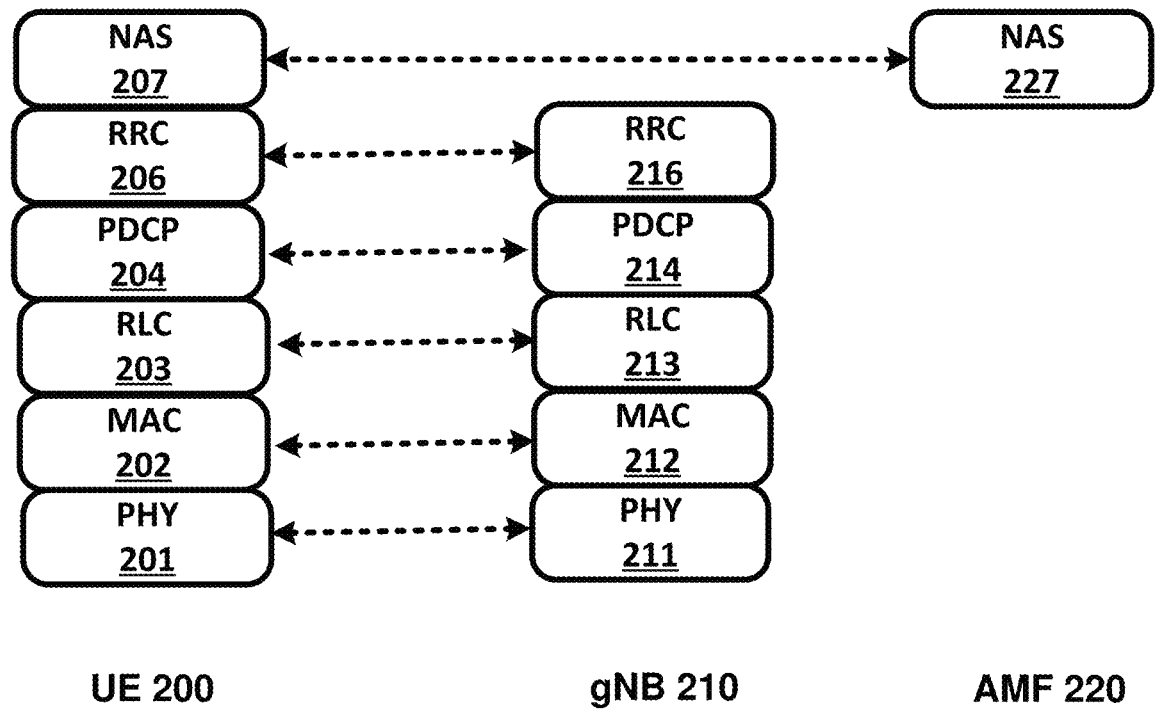

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plane protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
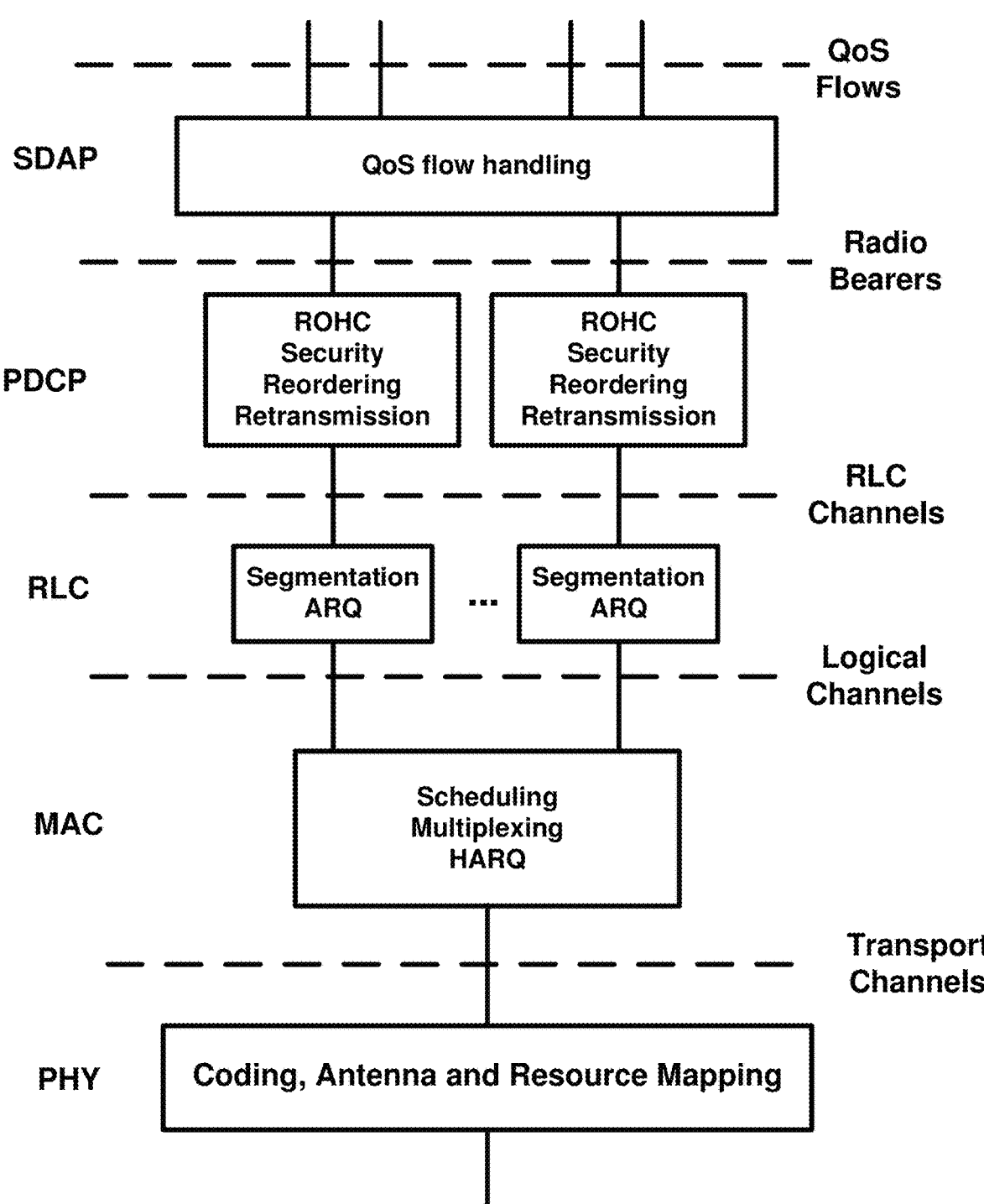
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodi-ments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
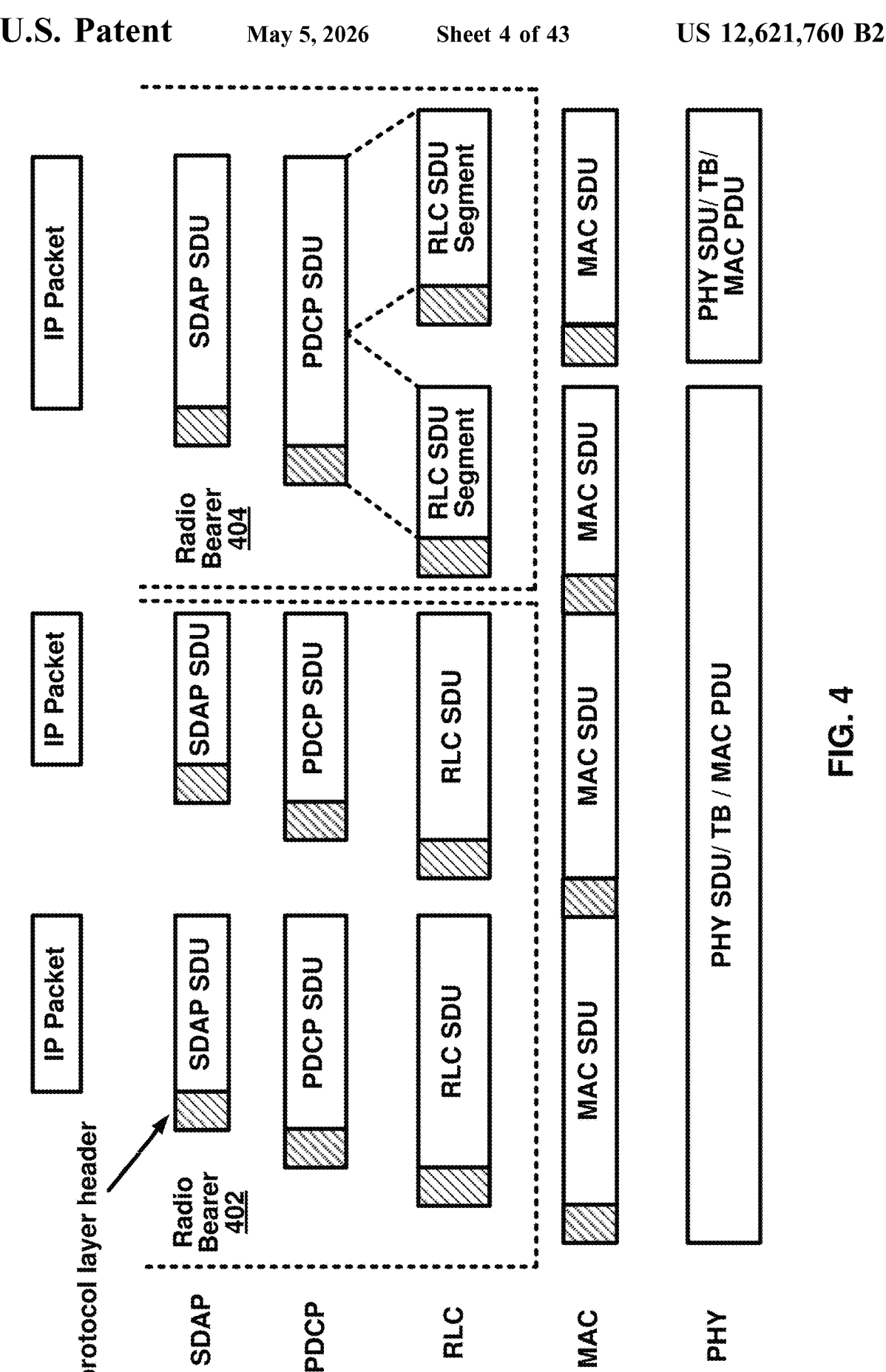
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
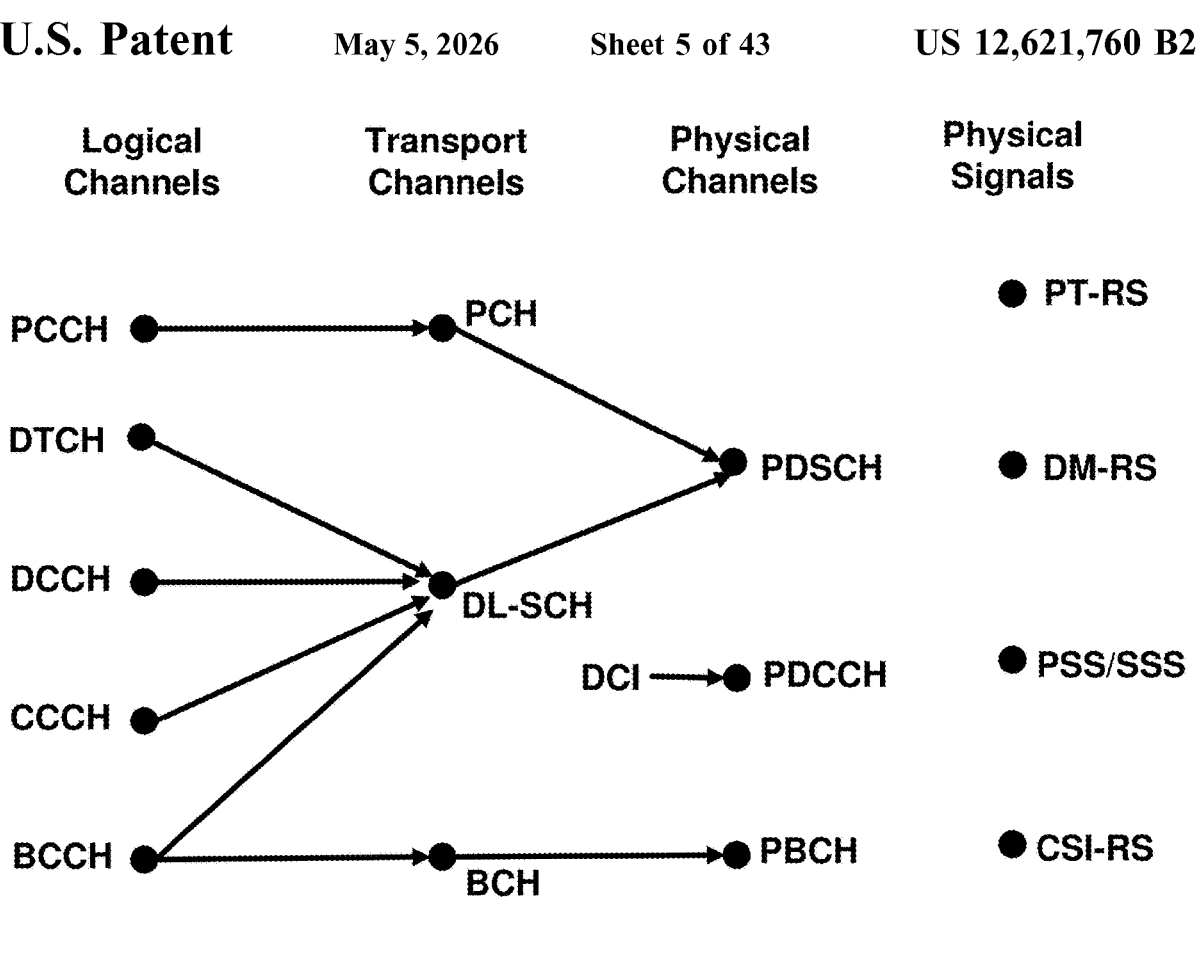
FIG. 5A shows example mapping of channels between layers of the protocol stack and different physical signals in downlink in accordance with several of various embodiments of the present disclosure.
Figure 5B:
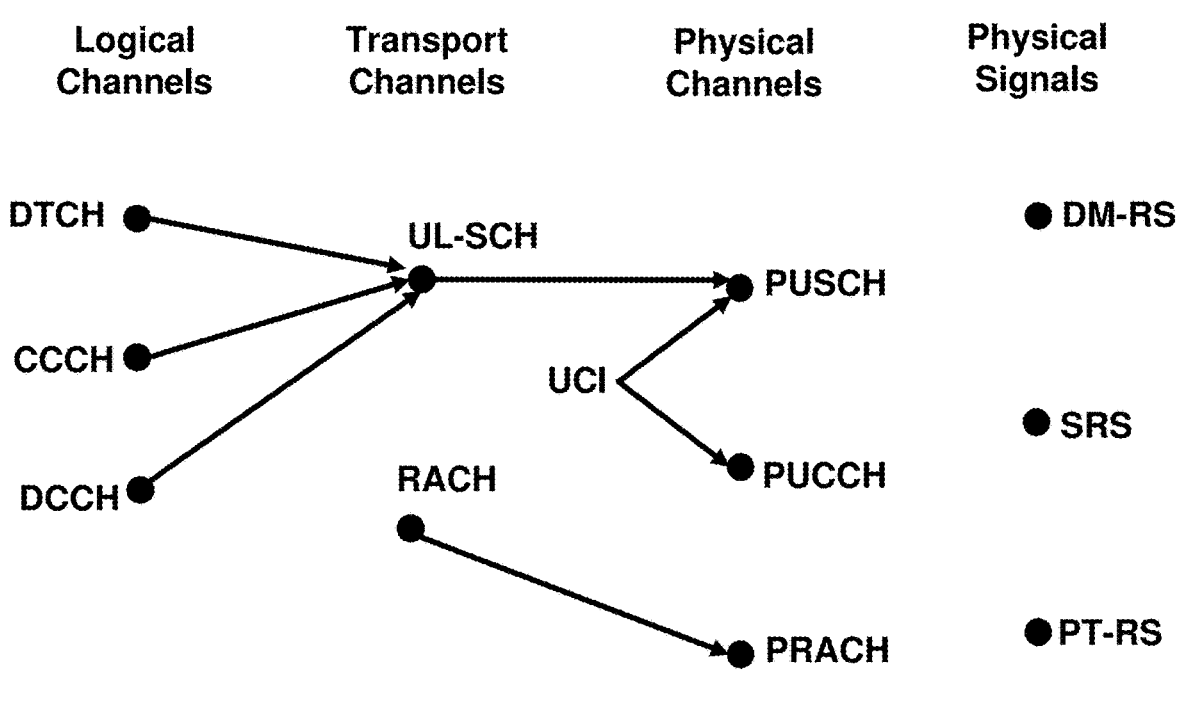
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
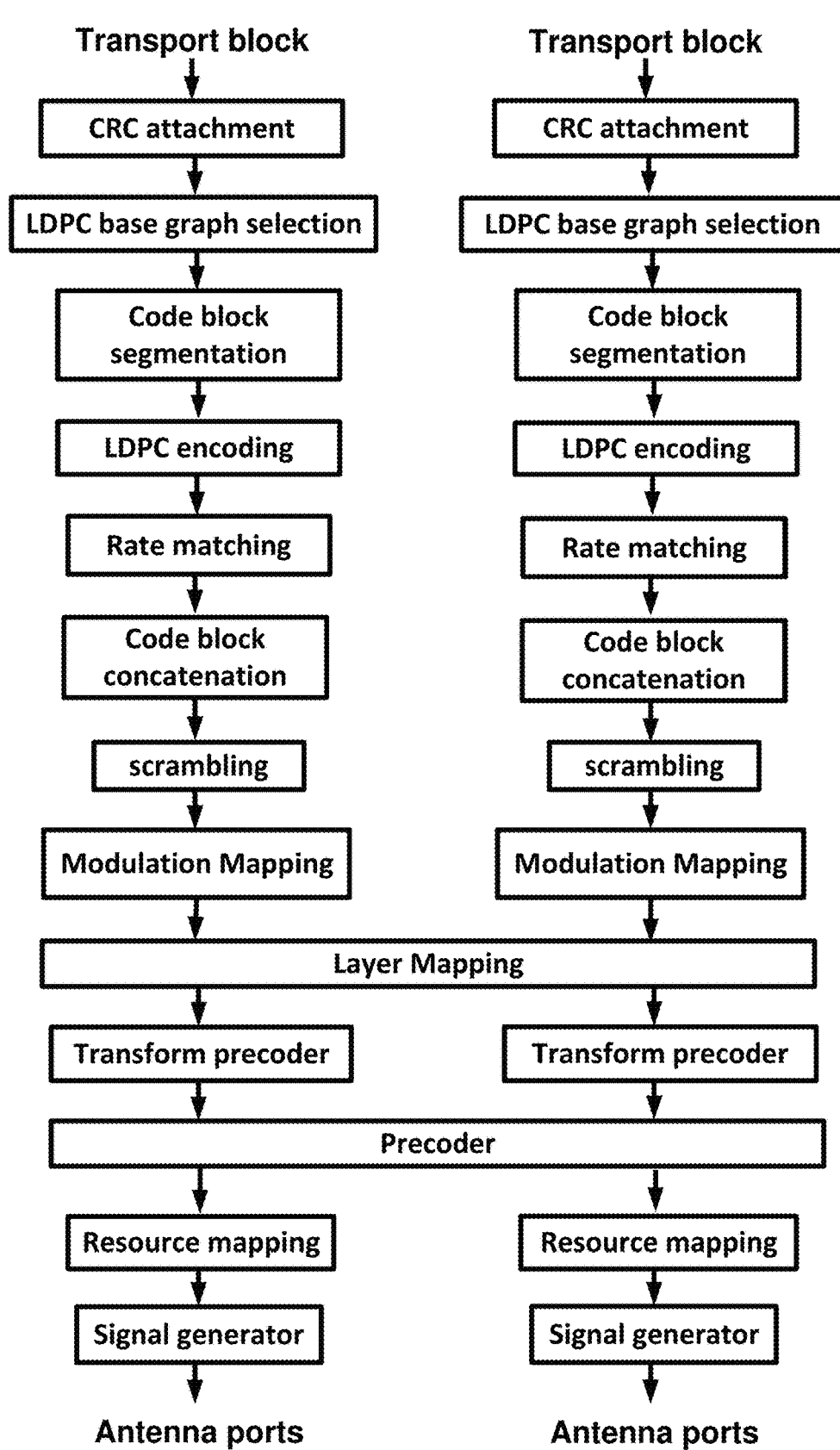
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
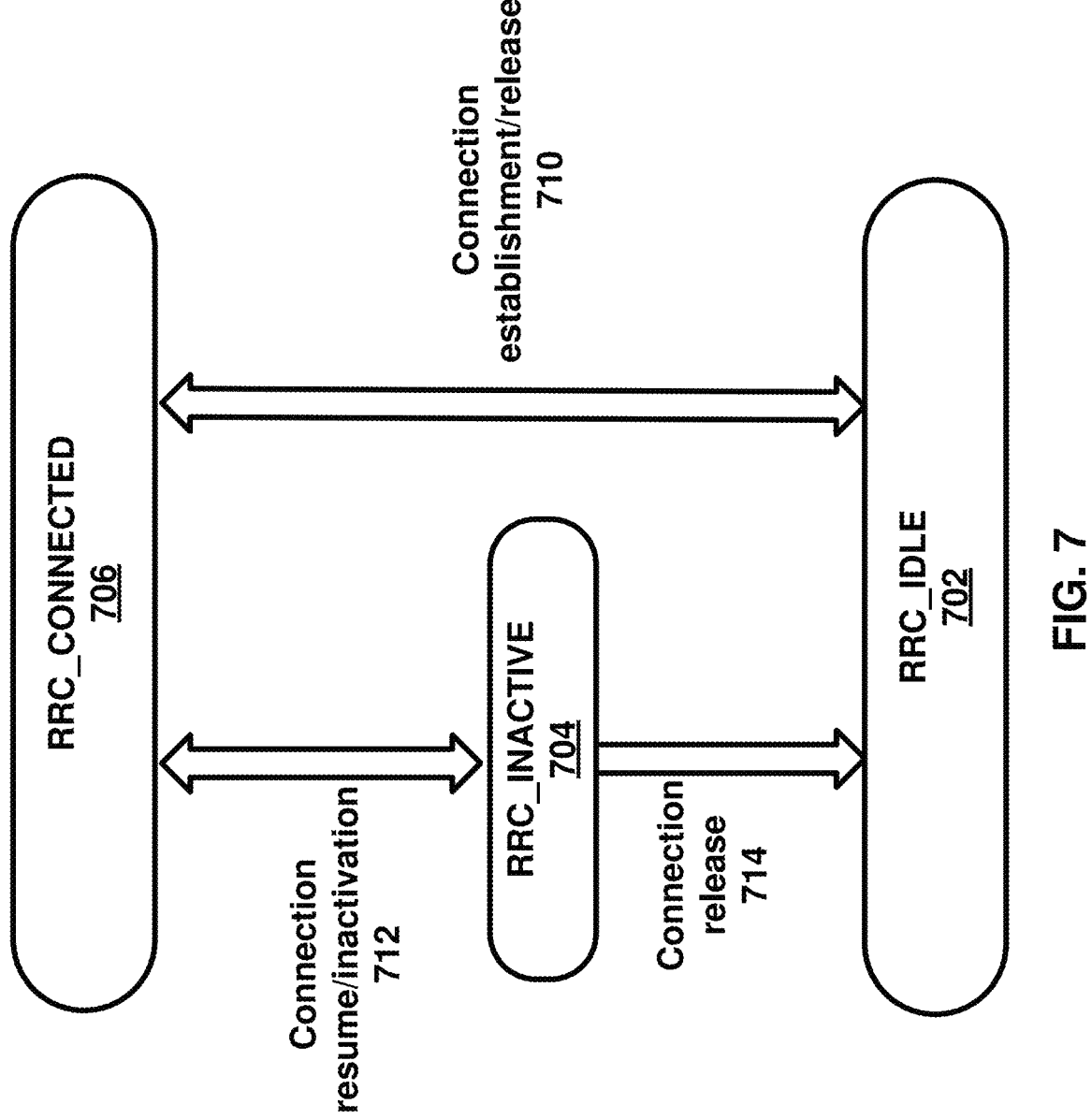
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.74s. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2\mu \cdot 0.15$ KHz ($\mu=0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the $\mu$ value).

Figure 8:
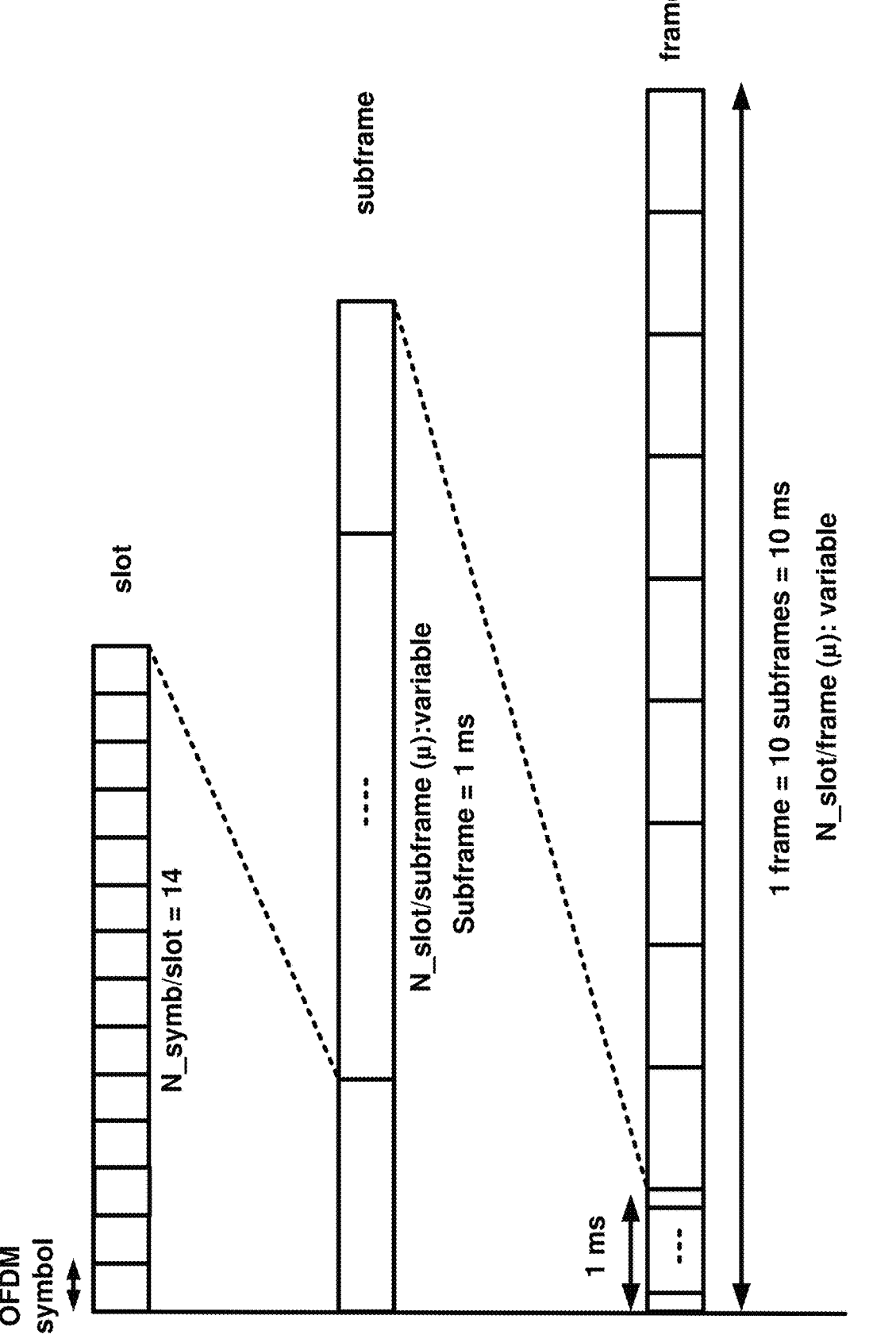
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $$N_{symb}^{slot}$$

OFDM symbols, wherein the $$N_{symb}^{slot}$$

may have a constant value (e.g., 14). Since different numerologies result in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of p and may generally expressed as $$N_{slot}^{subframe,\mu}$$

and the number of symbols per subframe may be expressed as $$N_{symb}^{subframe,\mu} = N_{symb}^{slot} N_{slot}^{subframe,\mu}.$$

A frame may have a duration of 10 ms and may consist of 10 subframes. The number of slots per frame may depend on the numerology and therefore may be variable. The number of slots per frame may generally be expressed as $$N_{slot}^{frame,\mu}.$$

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
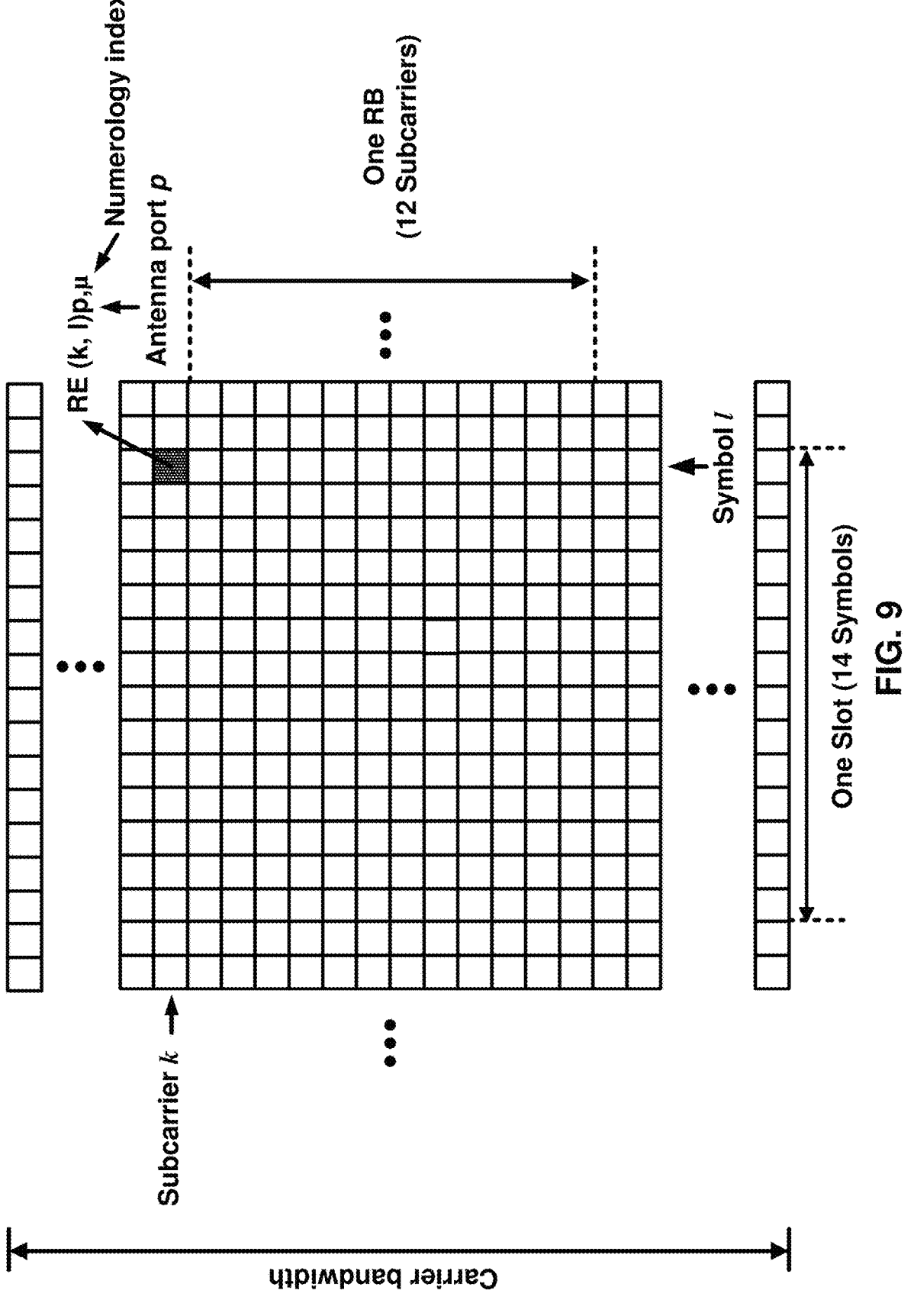
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration μ may be uniquely identified by $(k,l)_{p,\mu}$ where k is the index of a subcarrier in the frequency domain and 1 may refer to the symbol position in the time domain relative to some reference point. A resource block may be defined as $$N_{SC}^{RB} = 12$$

subcarriers. Since subcarrier spacing depends on the numerology of OFDM transmission, the frequency domain span of a resource block may be variable and may depend on the numerology. For example, for a subcarrier spacing of 15 KHz (e.g., μ=0), a resource block may be 180 KHz and for a subcarrier spacing of 30 KHz (e.g., μ=1), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
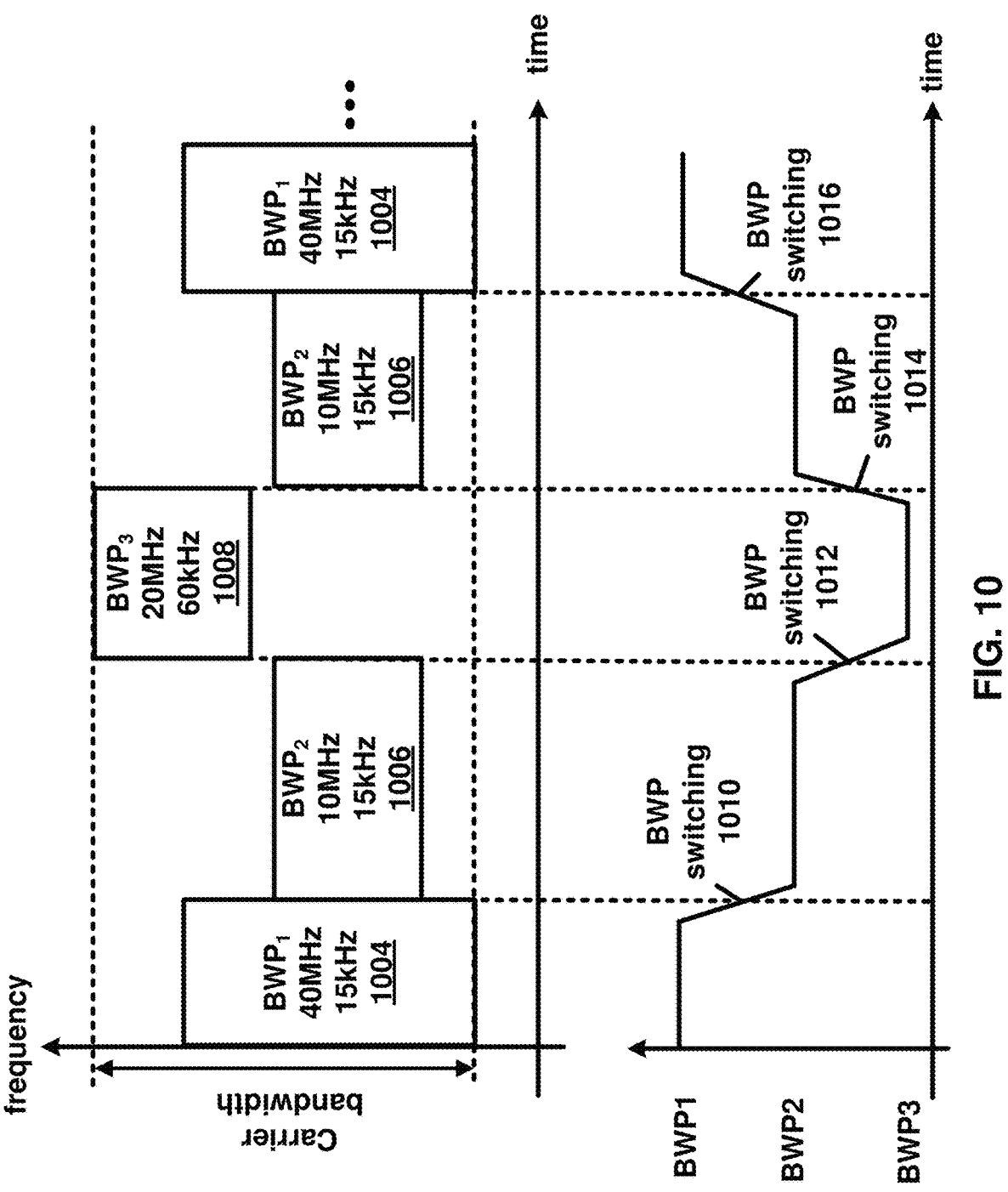
FIG. 10 shows example adaptation and switching of bandwidth parts in accordance with several of various embodiments of the present disclosure.

FIG. 10 shows an example of bandwidth part adaptation and switching. In this example, three BWPs (BWP₁ 1004, BWP₂ 1006 and BWP₃ 1008) are configured for a UE on a carrier bandwidth. The BWP₁ is configured with a bandwidth of 40 MHz and a numerology with subcarrier spacing of 15 KHz, the BWP₂ is configured with a bandwidth of 10 MHz and a numerology with subcarrier spacing of 15 KHz and the BWP₃ is configured with a bandwidth of 20 MHz and a subcarrier spacing of 60 KHz. The wireless device may switch from a first BWP (e.g., BWP₁) to a second BWP (e.g., BWP₂). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORE-SETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figures 11A, 11B:
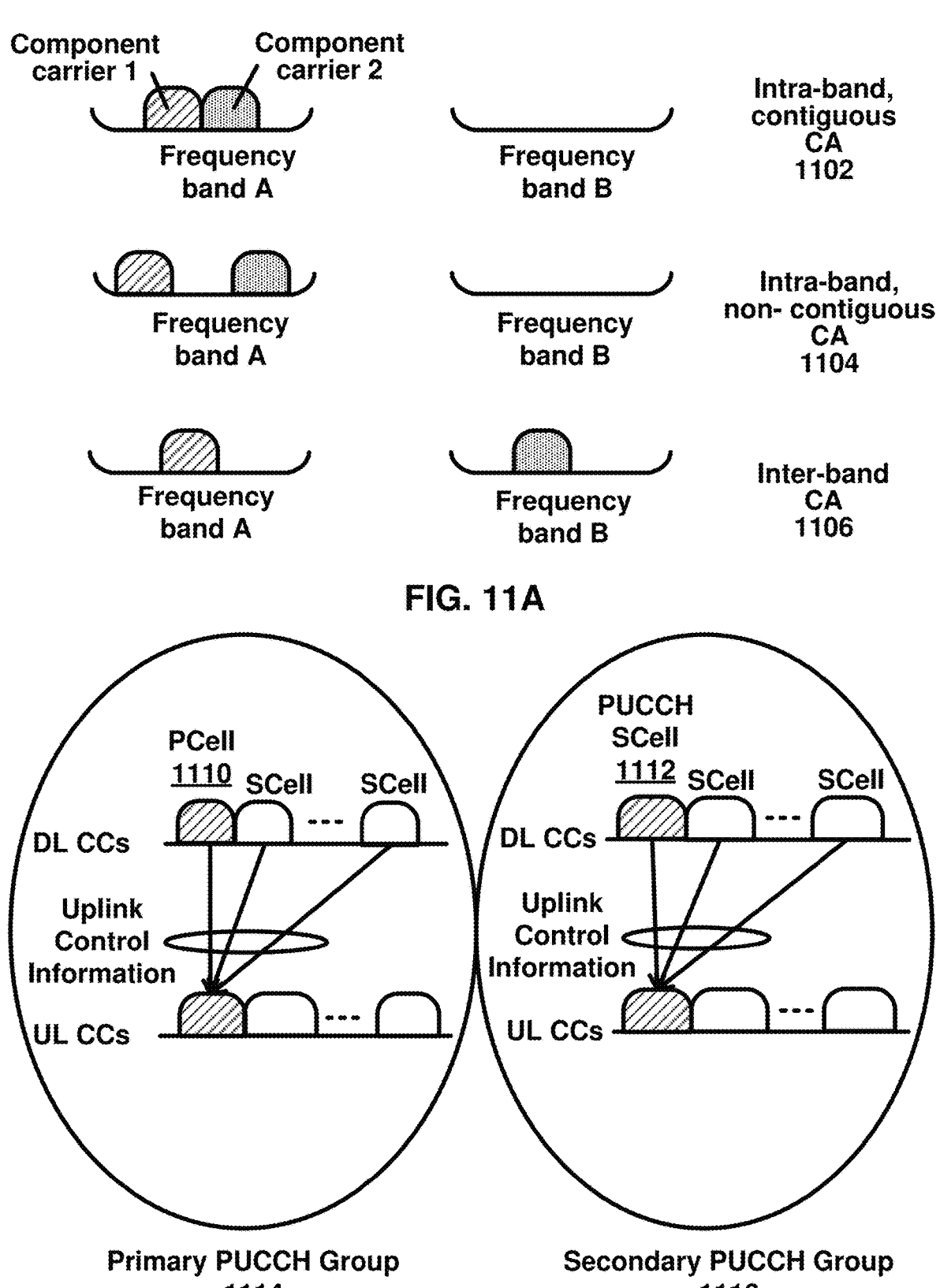
FIG. 11A shows example arrangements of carriers in carrier aggregation in accordance with several of various embodiments of the present disclosure.
FIG. 11B shows examples of uplink control channel groups in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
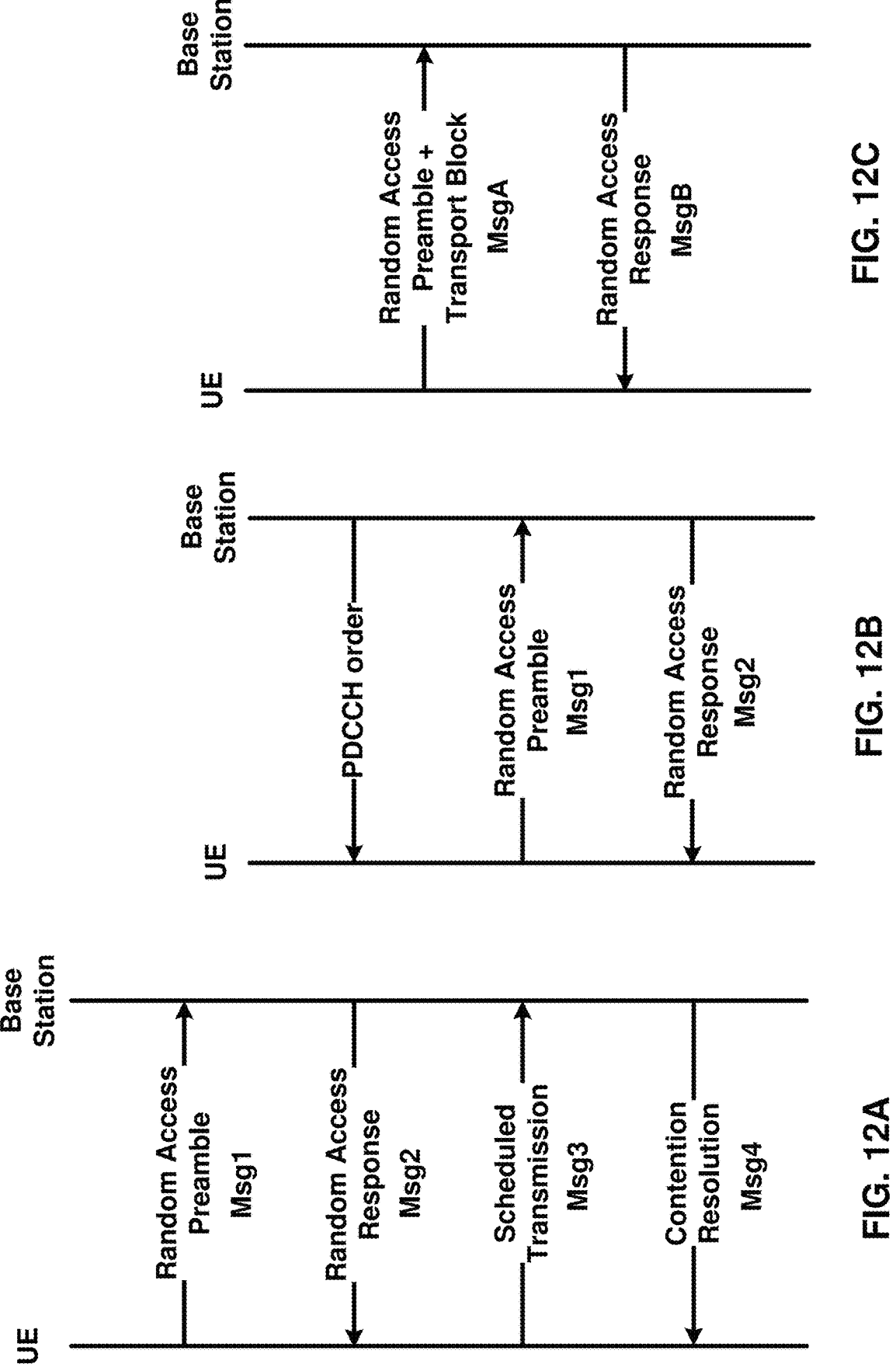
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
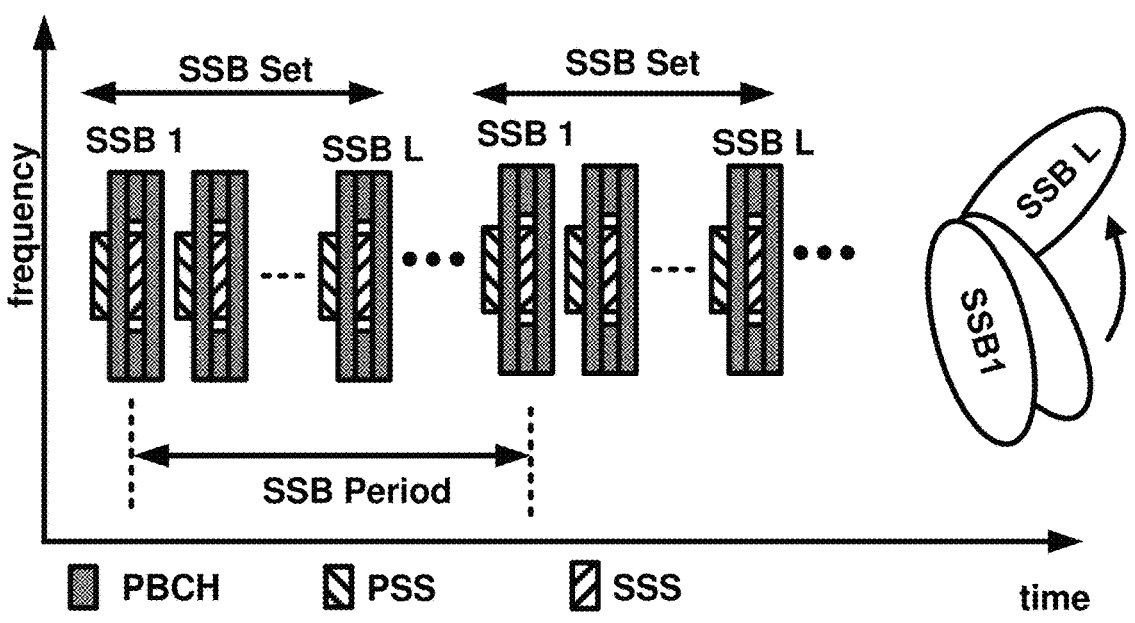
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some cases, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/De-activation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more severe in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
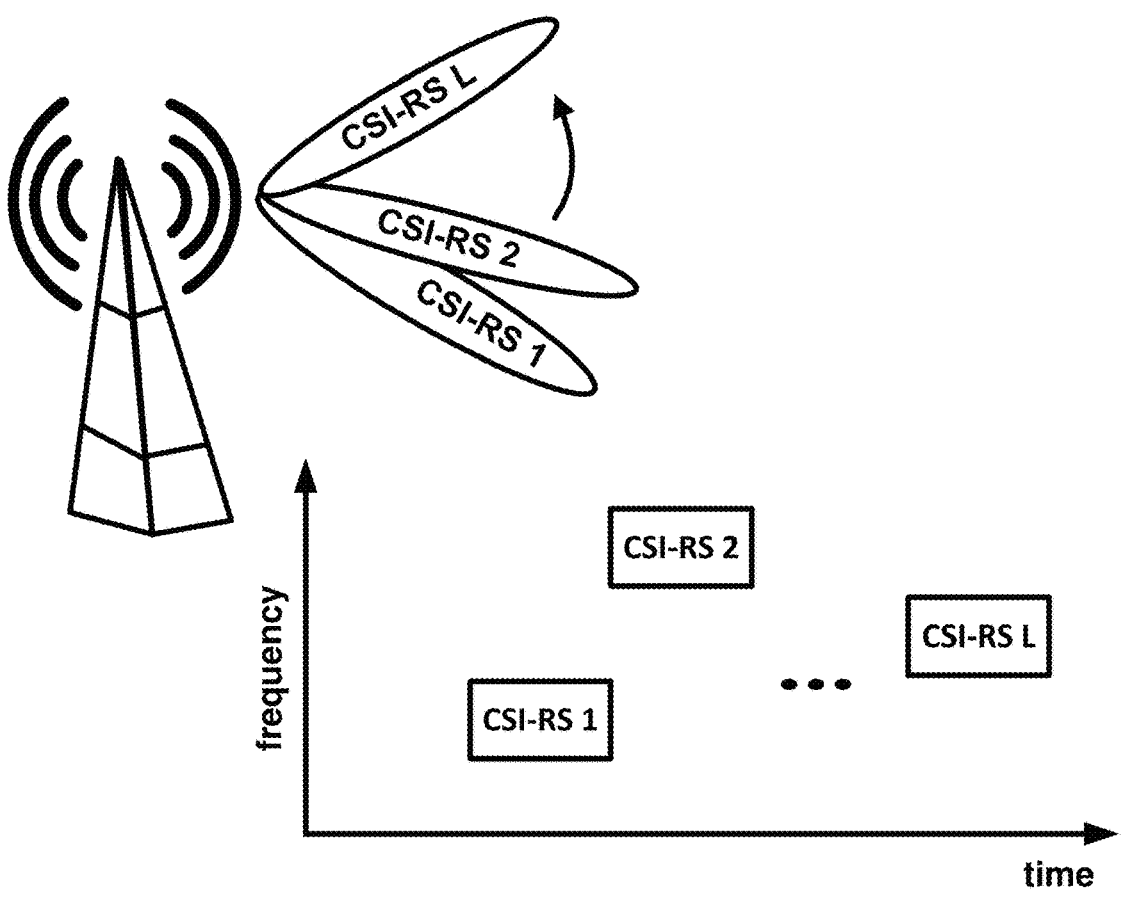
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14C:
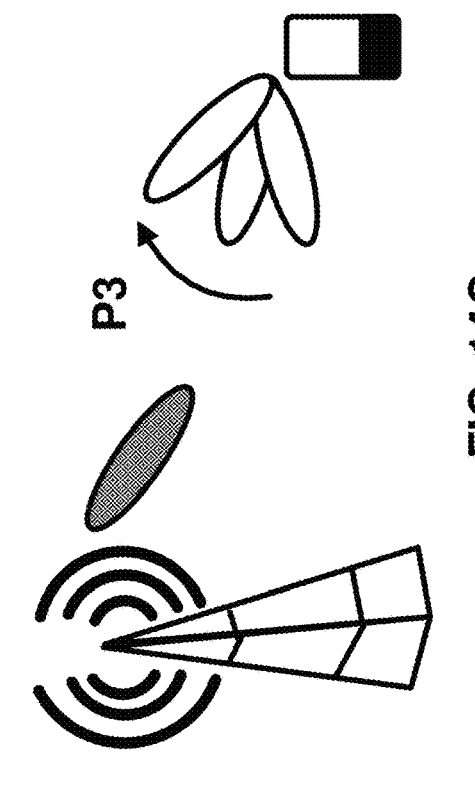
FIG. 14A, FIG. 14B and FIG. 14C show example beam management processes in accordance with several of various embodiments of the present disclosure.
Figure 14A:
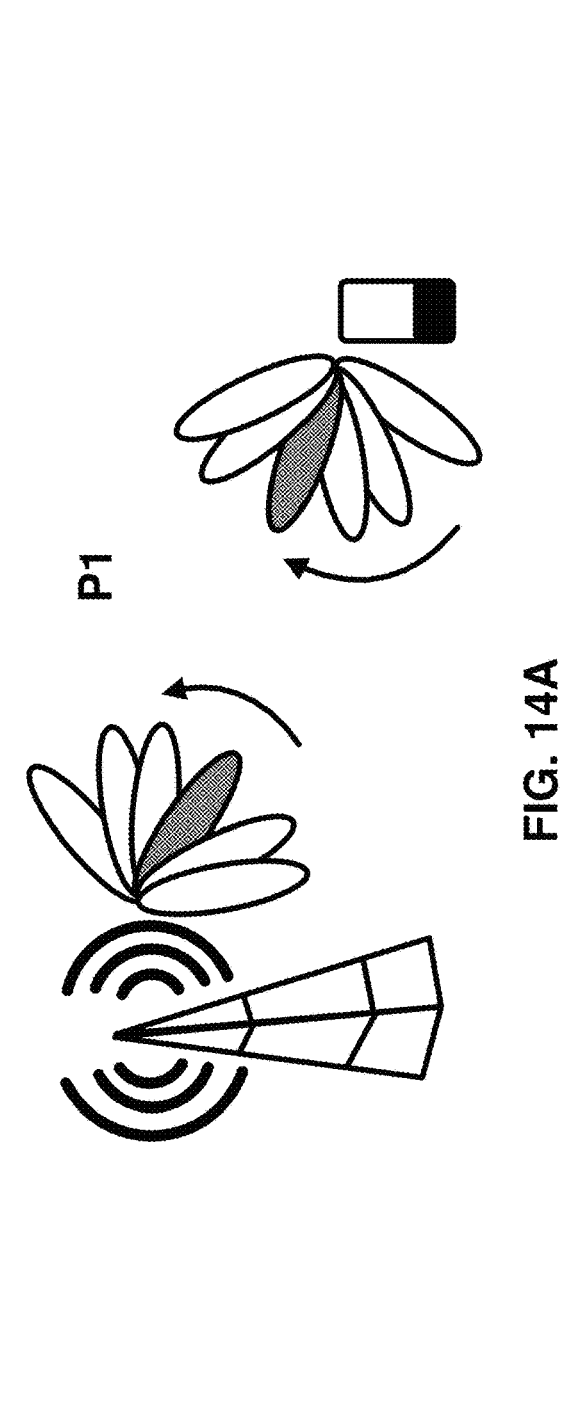
Figure 14B:
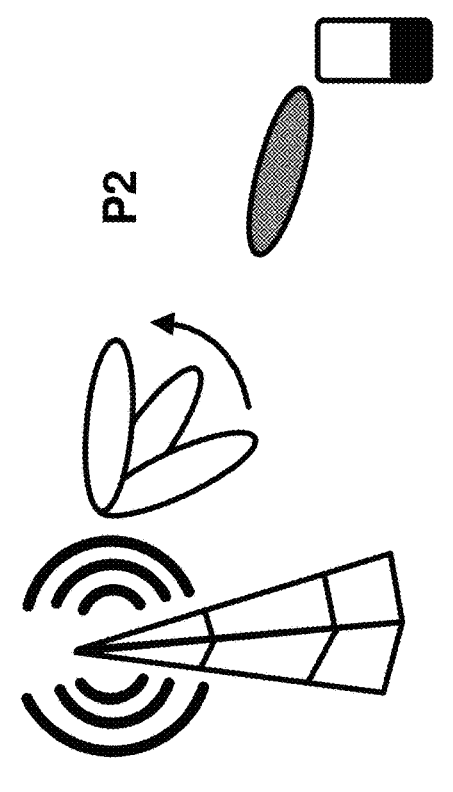

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base stations (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
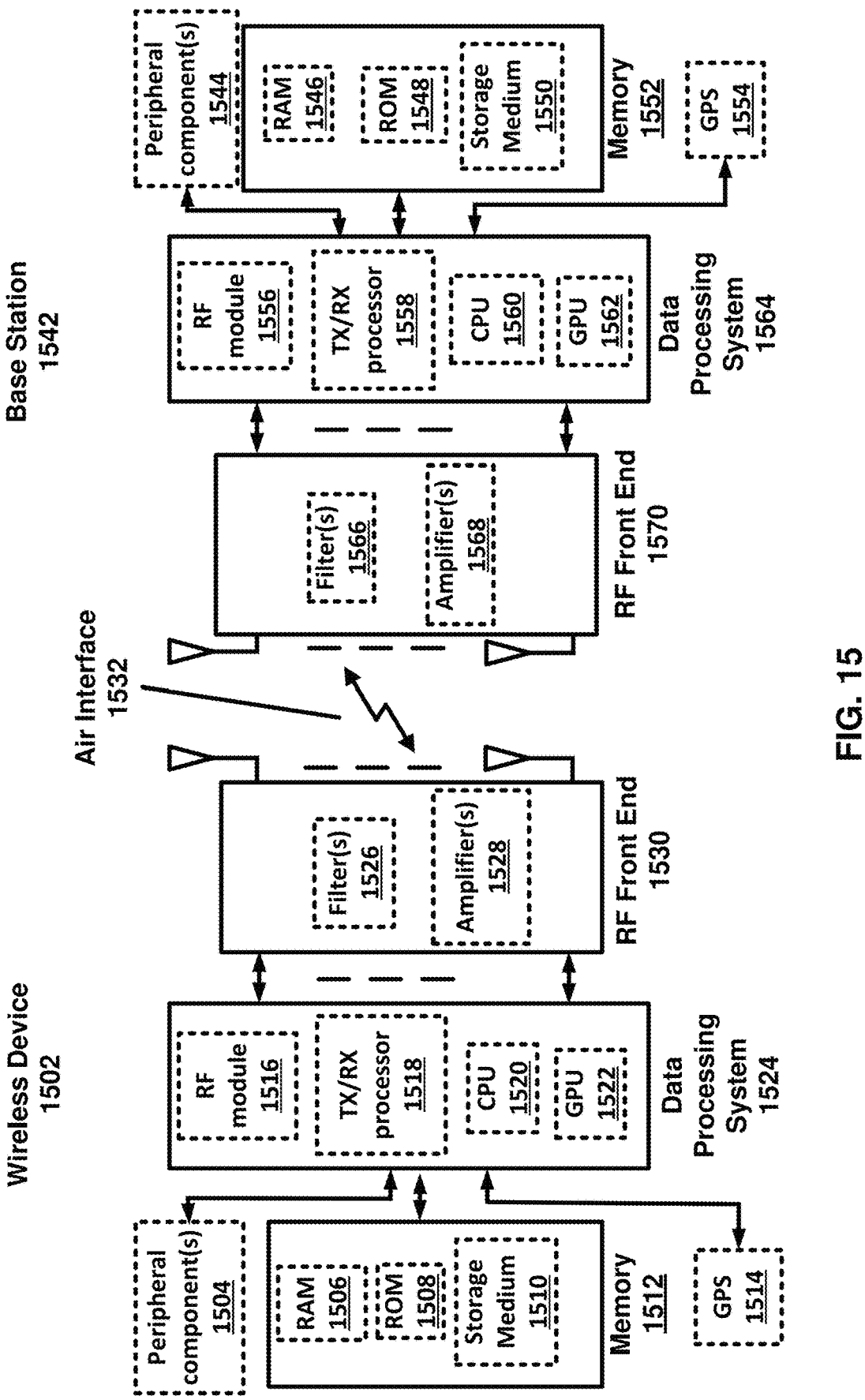
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System1524 at the wireless device 1502 and Data Processing System1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System1524 and the Data Processing System1564 may process the data to be transmitted or the received signals by implementing functions at different layers of the protocol stack such as PHY, MAC, RLC, etc. Example PHY layer functions that may be implemented by the Data Processing System1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System1524 and/or the Data Processing System1564. One or more processes described in the present disclosure may be implemented by the Data Processing System1524 and/or the Data Processing System1564. A Data Processing System may include an RF module (RF module 1516 at the Data Processing System1524 and RF module 1556 at the Data Processing System1564) and/or a TX/RX processor (e.g., TX/RX processor 1518 at the Data Processing System1524 and TX/RX processor 1558 at the Data Processing System1566) and/or a central processing unit (CPU) (e.g., CPU 1520 at the Data Processing System1524 and CPU 1560 at the Data Processing System1564) and/or a graphical processing unit (GPU) (e.g., GPU 1522 at the Data Processing System1524 and GPU 1562 at the Data Processing System1564).

The Memory 1512 may have interfaces with the Data Processing System1524 and the Memory 1552 may have interfaces with Data Processing System1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System1524 and Data Processing System1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System1524 and/or the Data Processing System1564 may be connected to other components such as a GPS module 1514 and a GPS module 1554, respectively, wherein the GPS module 1514 and a GPS module 1554 may enable delivery of location information of the wireless device 1502 to the Data Processing System1524 and location information of the base station 1542 to the Data Processing System1564. One or more other peripheral components (e.g., Peripheral Component(s) 1504 or Peripheral Component(s) 1544) may be configured and connected to the data Processing System1524 and data Processing System1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more messages comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

Figure 16B:
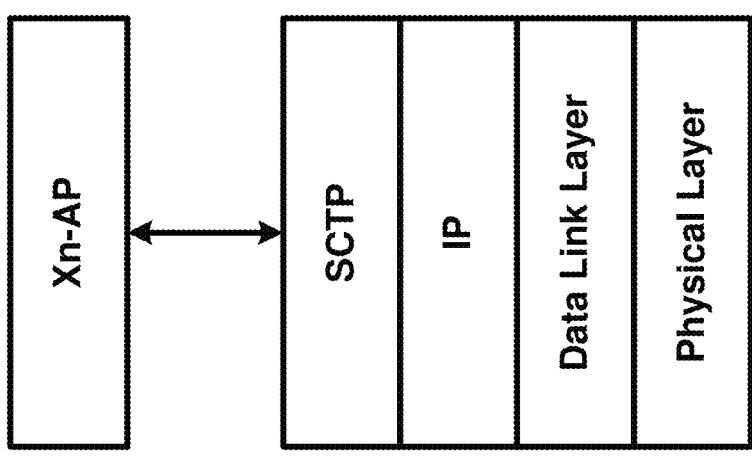
FIG. 16B shows an example control plane protocol stack of the Xn interface in accordance with several of various embodiments of the present disclosure.
Figure 16A:
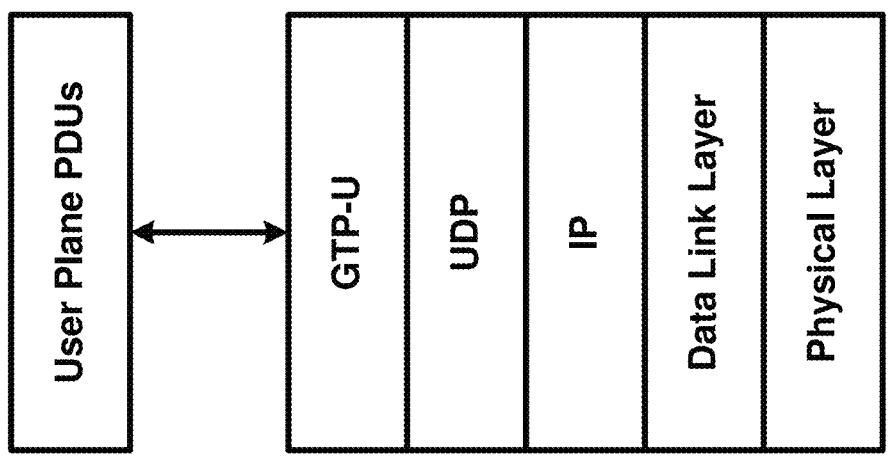
FIG. 16A shows an example user plane protocol stack on the Xn interface in accordance with several of various embodiments of the present disclosure.

In an example, an Xn User plane (Xn-U) interface may be defined between two NG-RAN nodes. An example user plane protocol stack on the Xn interface is shown in FIG. 16A. The transport network layer may be built on IP transport and GTP-U may be used on top of UDP/IP to carry the user plane PDUs. The Xn-U interface may provide non-guaranteed delivery of user plane PDUs and may support data forwarding and flow control.

In an example, the Xn control plane interface (Xn-C) may be defined between two NG-RAN nodes. An example control plane protocol stack of the Xn interface is shown in FIG.

16B. The transport network layer may be built on SCTP on top of IP. The application layer signaling protocol may be referred to as XnAP (Xn Application Protocol). The SCTP layer may provide the guaranteed delivery of application layer messages. In the transport IP layer point-to-point transmission may be used to deliver the signaling PDUs. The Xn-C interface may support Xn interface management; UE mobility management, including context transfer and RAN paging; and dual connectivity.

In an example, load balancing may be achieved with handover, redirection mechanisms upon RRC release and through the usage of inter-frequency and inter-RAT absolute priorities and inter-frequency $Q_{offset}$ parameters.

In example embodiments, measurements to be performed by a UE for connected mode mobility may be classified in at least four measurement types: Intra-frequency measurements; Inter-frequency measurements; Inter-radio access technology (RAT) measurements for a first RAT (e.g., E-UTRA); Inter-RAT measurements for a second RAT (e.g., UTRA).

In an example, for a measurement type, one or several measurement objects may be defined (a measurement object may define e.g., the carrier frequency to be monitored).

In an example, for a measurement object, one or several reporting configurations may be defined (a reporting configuration may define the reporting criteria). In an example, three reporting criteria may be used: event triggered reporting, periodic reporting and event triggered periodic reporting.

In an example, the association between a measurement object and a reporting configuration may be created by a measurement identity (a measurement identity may link together one measurement object and one reporting configuration of the same RAT). By using several measurement identities (one for each measurement object, reporting configuration pair) it may be possible to: associate several reporting configurations to one measurement object and; associate one reporting configuration to several measurement objects.

In an example, the measurement identity may be used as well when reporting results of the measurements.

In an example, measurement quantities may be considered separately for each RAT.

In an example, measurement commands may be used by NG-RAN to order the UE to start, modify or stop measurements.

In an example, handover may be performed within the same RAT and/or CN, or it may involve a change of the RAT and/or CN.

In an example, inter-gNB CSI-RS based mobility (i.e., handover) may be supported between two neighbor gNBs by enabling that neighbor gNBs can exchange and forward their own CSI-RS configurations and on/off status.

In an example, cell selection may be required on transition from RM-DEREGISTERED to RM-REGISTERED, from CM-IDLE to CM-CONNECTED and from CM-CONNECTED to CM-IDLE. In an example, the UE NAS layer may identify a selected PLMN and equivalent PLMNs. In an example, cell selection may be based on cell defining SSBs (CD-SSBs) located on the synchronization raster.

In an example, the UE may search the NR frequency bands and for each carrier frequency may identify the strongest cell as per the CD-SSB. It may read cell system information broadcast to identify its PLMN(s). The UE may search each carrier in turn ("initial cell selection") or make use of stored information to shorten the search ("stored information cell selection").

In an example, the UE may seek to identify a suitable cell. If it is not able to identify a suitable cell it may seek to identify an acceptable cell. When a suitable cell is found or if only an acceptable cell is found it may camp on that cell and may commence the cell reselection procedure. A suitable cell may be one for which the measured cell attributes satisfy the cell selection criteria. The cell PLMN may be the selected PLMN, registered or an equivalent PLMN. The cell may not be barred or may be reserved and the cell may not be part of a tracking area which is in the list of "forbidden tracking areas for roaming". An acceptable cell is one for which the measured cell attributes satisfy the cell selection criteria and the cell is not barred.

In an example, on transition from RRC_CONNECTED or RRC_INACTIVE to RRC_IDLE, a UE may camp on a cell as result of cell selection according to the frequency be assigned by RRC in the state transition message if any.

In an example, the UE may attempt to find a suitable cell. If no suitable cell is found on any frequency or RAT, the UE may attempt to find an acceptable cell.

In an example, in multi-beam operations, the cell quality may be derived amongst the beams corresponding to the same cell.

In an example, a UE in RRC_IDLE may perform cell reselection.

In an example, cell reselection may be based on CD-SSBs located on the synchronization raster. The UE may make measurements of attributes of the serving and neighbor cells to enable the reselection process. For the search and measurement of inter-frequency neighboring cells, the carrier frequencies need to be indicated.

In an example, cell reselection may identify the cell that the UE may camp on. It may be based on cell reselection criteria which involves measurements of the serving and neighbor cells. In an example, intra-frequency reselection may be based on ranking of cells. In an example, inter-frequency reselection may be based on absolute priorities where a UE may try to camp on the highest priority frequency available. In an example, an NCL may be provided by the serving cell to handle specific cases for intra- and inter-frequency neighboring cells. In an example, exclude-lists may be provided to prevent the UE from reselecting to specific intra- and inter-frequency neighboring cells. In an example, allow-lists may be provided to request the UE to reselect to only specific intra- and inter-frequency neighboring cells. In an example, cell reselection may be speed dependent. In an example, service specific prioritization may be used. In an example, slice specific cell reselection information may be provided to facilitate the UE to reselect a cell that supports specific slices.

In an example, in multi-beam operations, the cell quality may be derived amongst the beams corresponding to the same cell.

In an example, Network controlled mobility may apply to UEs in RRC_CONNECTED and may be categorized into two types of mobility: cell level mobility and beam level mobility.

Figure 17:
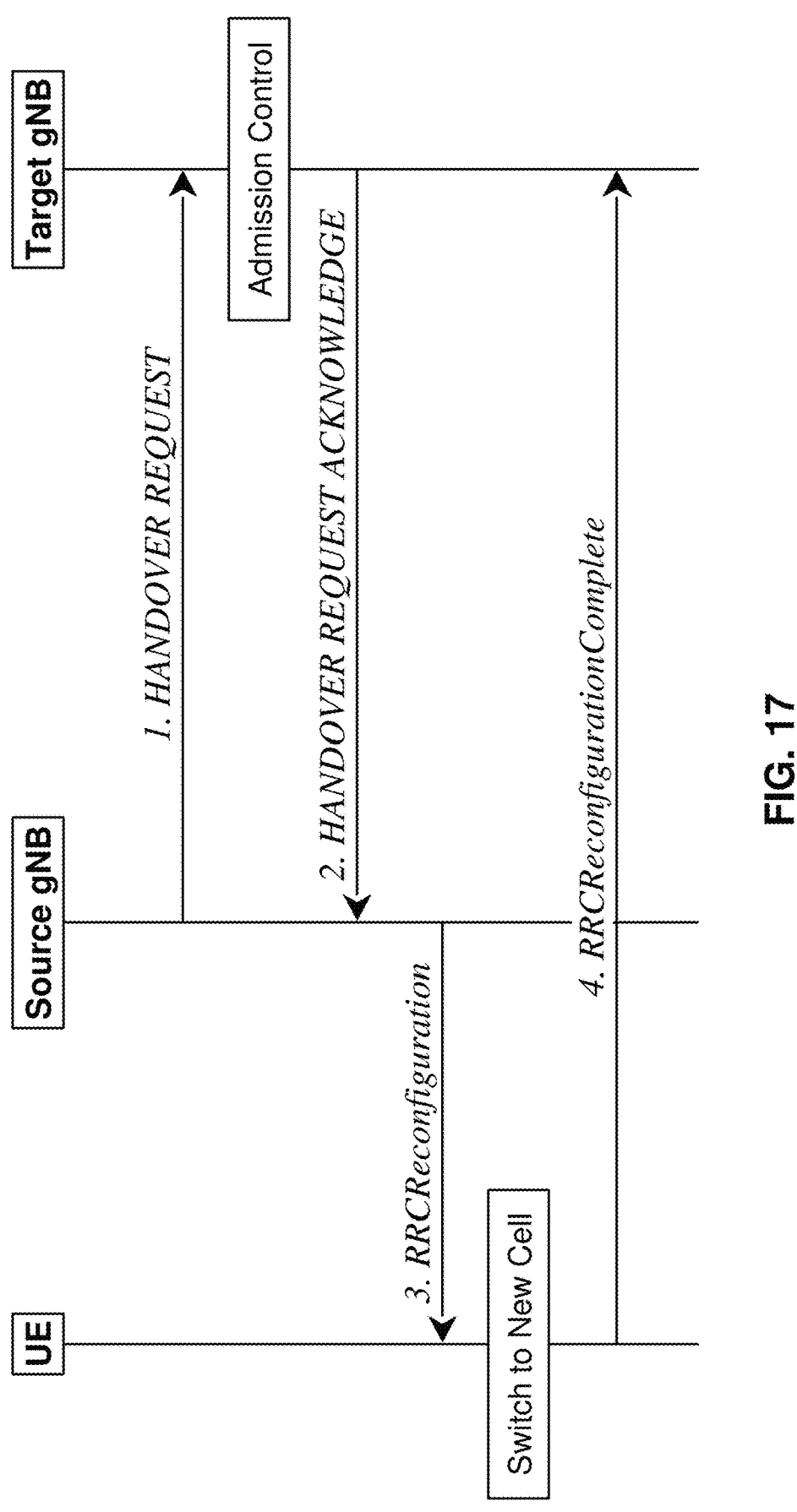
FIG. 17 shows example components of an inter-gNB handover procedure in accordance with several of various embodiments of the present disclosure.

In an example, cell level mobility may require explicit RRC signaling to be triggered, e.g., handover. For inter-gNB handover, the signaling procedures may comprise at least the following elemental components as shown in FIG. 17. The source gNB may initiate handover and may issue a HANDOVER REQUEST over the Xn interface. The target gNB may perform admission control and may provide the new RRC configuration as part of the HANDOVER REQUEST ACKNOWLEDGE. The source gNB may provide the RRC configuration to the wireless device by forwarding the RRCReconfiguration message received in the HANDOVER REQUEST ACKNOWLEDGE. The RRCReconfiguration message may include at least cell ID and information required to access the target cell so that the wireless device may access the target cell without reading system information. For some cases, the information required for contention-based and contention-free random access may be included in the RRCReconfiguration message. The access information to the target cell may include beam specific information, if any.

The wireless device may move the RRC connection to the target gNB and may reply with the RRCReconfiguration-Complete.

In an example, a handover mechanism triggered by RRC may require the wireless device at least to reset the MAC entity and re-establish RLC. RRC managed handovers with and without PDCP entity re-establishment may be both supported. For DRBs using RLC AM mode, PDCP may either be re-established together with a security key change or may initiate a data recovery procedure without a key change. For DRBs using RLC UM mode and for SRBs, PDCP may either be re-established together with a security key change or may remain as it is without a key change.

In an example, data forwarding, in-sequence delivery and duplication avoidance at handover may be guaranteed when the target gNB uses the same DRB configuration as the source gNB.

In an example, timer based handover failure procedure may be supported in NR. RRC connection re-establishment procedure may be used for recovering from handover failure.

In an example, beam level mobility may not require explicit RRC signaling to be triggered. The gNB may provide, via RRC signaling, the wireless device with measurement configuration containing configurations of SSB/CSI resources and resource sets, reports and trigger states for triggering channel and interference measurements and reports. Beam level mobility may then be dealt with at lower layers by means of physical layer and MAC layer control signaling, and RRC may not be required to know which beam is being used at a given point in time.

In an example, SSB-based beam level mobility may be based on the SSB associated to the initial DL BWP and may be configured for the initial DL BWPs and for DL BWPs containing the SSB associated to the initial DL BWP. For other DL BWPs, beam level mobility may be performed based on CSI-RS.

Figure 18:
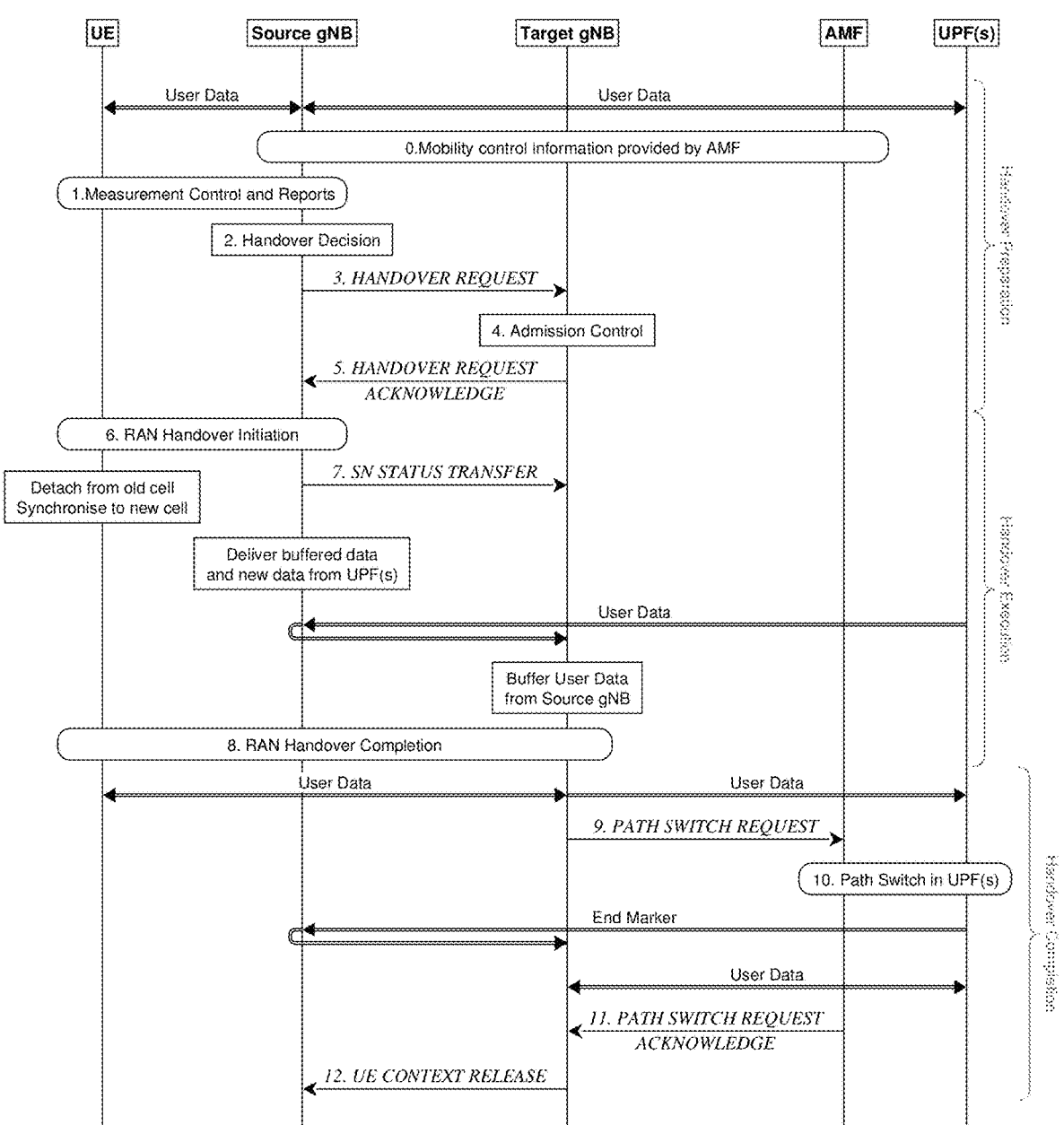
FIG. 18 shows an example Handover scenario in accordance with several of various embodiments of the present disclosure.

In an example, the intra-NR RAN handover may perform the preparation and execution phase of the handover procedure performed without involvement of the 5GC, e.g., preparation messages may be directly exchanged between the gNBs. The release of the resources at the source gNB during the handover completion phase may be triggered by the target gNB. FIG. 18 shows an example basic handover scenario where neither the AMF nor the UPF changes:

0. The UE context within the source gNB may contain information regarding roaming and access restrictions which may be provided either at connection establishment or at the last TA update.

1. The source gNB may configure the UE measurement procedures and the UE may report according to the measurement configuration.

2. The source gNB may decide to handover the UE, based on MeasurementReport and RRM information.

3. The source gNB may issue a Handover Request message to the target gNB passing a transparent RRC container with necessary information to prepare the handover at the target side. The information may include at least the target cell ID, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different RATs, PDU session related information, and may include the UE reported measurement information including beam-related information if available. The PDU session related information may include the slice information and QoS flow level QoS profile(s).

4. Admission Control may be performed by the target gNB. Slice-aware admission control may be performed if the slice information is sent to the target gNB. If the PDU sessions are associated with non-supported slices the target gNB may reject such PDU sessions.

5. The target gNB may prepare the handover with L1/L2 and sends the HANDOVER REQUEST ACKNOWL-EDGE to the source gNB, which may include a transparent container to be sent to the UE as an RRC message to perform the handover.

6. The source gNB may trigger the Uu handover by sending an RRCReconfiguration message to the UE, containing the information required to access the target cell: at least the target cell ID, the new C-RNTI, the target gNB security algorithm identifiers for the selected security algorithms. It may also include a set of dedicated RACH resources, the association between RACH resources and SSB(s), the association between RACH resources and UE-specific CSI-RS configuration(s), common RACH resources, and system information of the target cell, etc.

7. The source gNB may send the SN STATUS TRANSFER message to the target gNB.

8. The UE may synchronize to the target cell and may complete the RRC handover procedure by sending RRCReconfigurationComplete message to target gNB.

9. The target gNB may send a PATH SWITCH REQUEST message to AMF to trigger 5GC to switch the DL data path towards the target gNB and to establish an NG-C interface instance towards the target gNB.

10. 5GC may switch the DL data path towards the target gNB. The UPF may send one or more "end marker" packets on the old path to the source gNB per PDU session/tunnel and then may release any U-plane/TNL resources towards the source gNB.

11. The AMF may confirm the PATH SWITCH REQUEST message with the PATH SWITCH REQUEST ACKNOWLEDGE message.

12. Upon reception of the PATH SWITCH REQUEST ACKNOWLEDGE message from the AMF, the target gNB may send the UE CONTEXT RELEASE to inform the source gNB about the success of the handover. The source gNB may then release radio and C-plane related resources associated to the UE context. Any ongoing data forwarding may continue.

In an example, the RRM configuration may include both beam measurement information (for layer 3 mobility) associated to SSB(s) and CSI-RS(s) for the reported cell(s) if both types of measurements are available. Also, if carrier aggregation (CA) is configured, the RRM configuration may include the list of best cells on each frequency for which measurement information is available. The RRM measurement information may also include the beam measurement for the listed cells that belong to the target gNB.

In an example, the common RACH configuration for beams in the target cell may be associated to the SSB(s). The network may have dedicated RACH configurations associated to the SSB(s) and/or may have dedicated RACH configurations associated to CSI-RS(s) within a cell. The target gNB may include one of the following RACH configurations in the Handover Command to enable the UE to access the target cell: Common RACH configuration; Common RACH configuration+Dedicated RACH configuration associated with SSB; Common RACH configuration+Dedicated RACH configuration associated with CSI-RS.

In an example, the dedicated RACH configuration may allocate RACH resource(s) together with a quality threshold to use them. When dedicated RACH resources are provided, they may be prioritized by the UE and the UE may not switch to contention-based RACH resources as long as the quality threshold of those dedicated resources is met. The order to access the dedicated RACH resources may be up to UE implementation.

In an example, the U-plane handling during the Intra-NR-Access mobility activity for UEs in RRC_CONNECTED may take the following principles into account to avoid data loss during HO: During HO preparation, U-plane tunnels may be established between the source gNB and the target gNB; During HO execution, user data may be forwarded from the source gNB to the target gNB; Forwarding may take place in order as long as packets are received at the source gNB from the UPF or the source gNB buffer has not been emptied. During HO completion: the target gNB may send a path switch request message to the AMF to inform that the UE has gained access and the AMF then may trigger path switch related 5GC internal signaling and actual path switch of the source gNB to the target gNB in UPF; the source gNB may continue forwarding data as long as packets are received at the source gNB from the UPF or the source gNB buffer has not been emptied.

Figure 19:
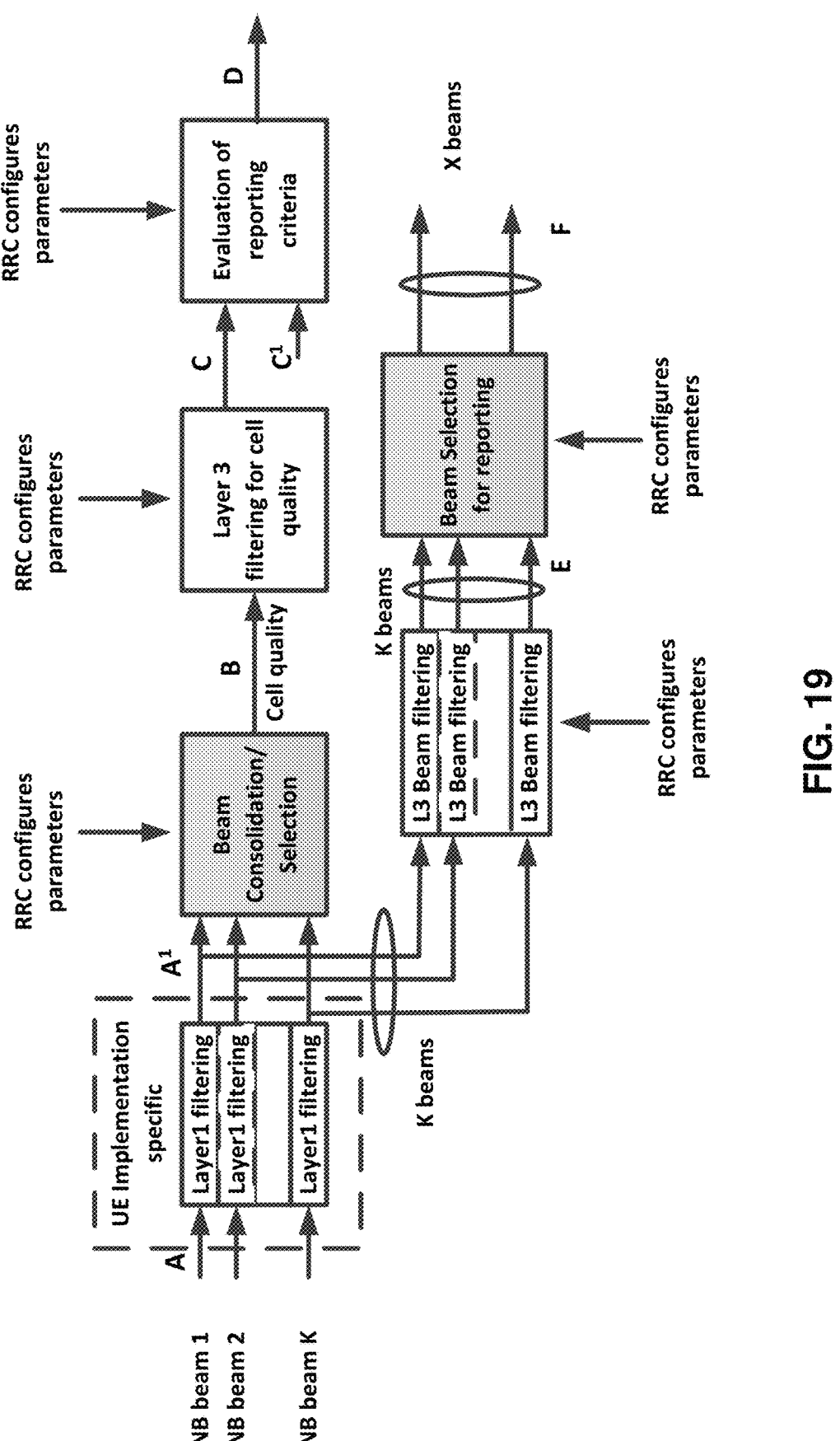
FIG. 19 shows an example measurement process in accordance with several of various embodiments of the present disclosure.

In an example, in RRC_CONNECTED, the wireless device may measure multiple beams (at least one) of a cell and the measurement results (power values) may be averaged to derive the cell quality. In doing so, the UE may be configured to consider a subset of the detected beams. Filtering may take place at two different levels: at the physical layer to derive beam quality and then at RRC level to derive cell quality from multiple beams. Cell quality from beam measurements may be derived in the same way for the serving cell(s) and for the non-serving cell(s). Measurement reports may contain the measurement results of the X best beams if the UE is configured to do so by the gNB. An example measurement process is shown in FIG. 19.

A: measurements (beam specific samples) internal to the physical layer.

Layer 1 filtering: internal layer 1 filtering of the inputs measured at point A. Exact filtering may be implementation dependent.

A1: measurements (e.g., beam specific measurements) may be reported by layer 1 to layer 3 after layer 1 filtering.

Beam Consolidation/Selection: beam specific measurements may be consolidated to derive cell quality.

B: a measurement (e.g., cell quality) derived from beam-specific measurements may be reported to layer 3 after beam consolidation/selection.

Layer 3 filtering for cell quality: filtering performed on the measurements provided at point B.

C: a measurement after processing in the layer 3 filter. The reporting rate may be identical to the reporting rate at point B. This measurement may be used as input for one or more evaluation of reporting criteria.

Evaluation of reporting criteria: may check whether actual measurement reporting is necessary at point D. The evaluation may be based on more than one flow of measurements at reference point C e.g., to compare between different measurements. This is illustrated by input C and C1. The UE may evaluate the reporting criteria at least every time a new measurement result is reported at point C, C1.

D: measurement report information (message) sent on the radio interface.

L3 Beam filtering: filtering performed on the measurements (e.g., beam specific measurements) provided at point A1.

E: a measurement (e.g., beam-specific measurement) after processing in the beam filter. The reporting rate may be identical to the reporting rate at point A1. This measurement may be used as input for selecting the X measurements to be reported.

Beam Selection for beam reporting: may select the X measurements from the measurements provided at point E.

F: beam measurement information included in measurement report (sent) on the radio interface.

In an example, measurement reports may be characterized by the following: measurement reports may include the measurement identity of the associated measurement configuration that triggered the reporting; cell and beam measurement quantities to be included in measurement reports may be configured by the network; the number of non-serving cells to be reported may be limited through configuration by the network; cells belonging to a blacklist configured by the network may not be used in event evaluation and reporting, and conversely when a whitelist is configured by the network, only the cells belonging to the whitelist may be used in event evaluation and reporting; Beam measurements to be included in measurement reports may be configured by the network.

In an example, intra-frequency neighbor (cell) measurements and inter-frequency neighbor (cell) measurements may be defined as follows: SSB based intra-frequency measurement: a measurement is defined as an SSB based intra-frequency measurement provided the center frequency of the SSB of the serving cell and the center frequency of the SSB of the neighbor cell are the same, and the subcarrier spacing of the two SSBs may also be the same. SSB based inter-frequency measurement: a measurement may be defined as an SSB based inter-frequency measurement provided the center frequency of the SSB of the serving cell and the center frequency of the SSB of the neighbor cell are different, or the subcarrier spacing of the two SSBs is different. For SSB based measurements, one measurement object may correspond to one SSB and the UE may consider different SSBs as different cells. CSI-RS based intra-frequency measurement: a measurement may be defined as a CSI-RS based intra-frequency measurement provided the bandwidth of the CSI-RS resource on the neighbor cell configured for measurement is within the bandwidth of the CSI-RS resource on the serving cell configured for measurement, and the subcarrier spacing of the two CSI-RS resources is the same. CSI-RS based inter-frequency measurement: a measurement may be defined as a CSI-RS based inter-frequency measurement provided the bandwidth of the CSI-RS resource on the neighbor cell configured for measurement is not within the bandwidth of the CSI-RS resource on the serving cell configured for measurement, or the subcarrier spacing of the two CSI-RS resources may be different.

In an example, whether a measurement is non-gap-assisted or gap-assisted may depend on the capability of the UE, the active BWP of the UE and the current operating frequency: For SSB based inter-frequency, a measurement gap configuration may be provided in the following cases: If the UE only supports per-UE measurement gaps; If the UE supports per-FR measurement gaps and any of the configured BWP frequencies of any of the serving cells are in the same frequency range of the measurement object. For SSB based intra-frequency measurement, a measurement gap configuration may be provided in the following case: Other than the initial BWP, if any of the UE configured BWPs do not contain the frequency domain resources of the SSB associated to the initial DL BWP.

In an example, in non-gap-assisted scenarios, the UE may be able to carry out such measurements without measurement gaps. In gap-assisted scenarios, the UE may not be assumed to be able to carry out such measurements without measurement gaps.

In an example, an IE MeasConfig may specify measurements to be performed by the UE, and may cover intra-frequency, inter-frequency and inter-RAT mobility as well as configuration of measurement gaps. A parameter measGap-Config may be used to setup and release measurement gaps in NR. A parameter measIdToAddModList may indicate a list of measurement identities to add and/or modify. A parameter measIdToRemoveList may indicate a list of measurement identities to remove. A parameter measObject-ToAddModListmay indicate a list of measurement objects to add and/or modify. A parameter reportConfigToAddModList may indicate a list of measurement reporting configurations to add and/or modify. A parameter reportConfig-ToRemoveList may indicate a list of measurement reporting configurations to remove. A parameter s-MeasureConfig may indicate a threshold for NR SpCell RSRP measurement controlling when the UE is required to perform measurements on non-serving cells. Choice of ssb-RSRP corresponds to cell RSRP based on SS/PBCH block and choice of csi-RSRP corresponds to cell RSRP of CSI-RS. A parameter measGapSharingConfig may specify the measurement gap sharing scheme and controls setup/release of measurement gap sharing.

In an example, an IE MeasId may be used to identify a measurement configuration, e.g., linking of a measurement object and a reporting configuration.

In an example, an IE MeasIdToAddModList may concern a list of measurement identities to add or modify, with for each entry the measId, the associated measObjectId and the associated reportConfigId. In an example, an IE MeasObjectId may be used to identify a measurement object configuration.

In an example, an IE MeasObjectNR may specify information applicable for SS/PBCH block(s) intra/inter-frequency measurements and/or CSI-RS intra/inter-frequency measurements. A parameter cellIndividualOffset may indicate cell individual offsets applicable to a specific cell. A parameter physCellId may indicate physical cell identity of a cell in the cell list. A parameter absThreshCSI-RS-Consolidation may indicate absolute threshold for the consolidation of measurement results per CSI-RS resource(s) from L1 filter(s). The field may be used for the derivation of cell measurement results and the reporting of beam measurement information per CSI-RS resource. A parameter absThreshSS-BlocksConsolidation may indicate absolute threshold for the consolidation of measurement results per SS/PBCH block(s) from L1 filter(s). The field may be used for the derivation of cell measurement results and the reporting of beam measurement information per SS/PBCH block index. A parameter blackCellsToAddModList may indicate a list of cells to add/modify in the black list of cells. It may apply to SSB resources. A parameter blackCellsToRemoveList may indicate a list of cells to remove from the black list of cells. A parameter cellsToAddModList may indicate a list of cells to add/modify in the cell list. A parameter cellsToRemoveList may indicate a list of cells to remove from the cell list. A parameter freqBandIndicatorNR may indicate a frequency band in which the SSB and/or CSI-RS indicated in this MeasObjectNR may be located and according to which the UE may perform the RRM measurements. This field may be provided when the network configures measurements with this MeasObjectNR. A parameter measCycleSCell may be used when an SCell is configured on the frequency indicated by the measObjectNR and is in deactivated state. gNB may configure the parameter whenever an SCell is configured on the frequency indicated by the measObjectNR. The field may also be signalled when an SCell is not configured. A parameter nrofCSInrofCSI-RS-ResourcesToAverage may indicate the maximum number of measurement results per beam based on CSI-RS resources to be averaged. The same value applies for each detected cell associated with this MeasObjectNR. A parameter offsetMO may indicate values applicable to all measured cells with reference signal(s) indicated in this MeasObjectNR. A parameter quantityConfigIndex may indicate the n-th element of quantityConfigNR-List provided in MeasConfig. A parameter referenceSignalConfig may indicate RS configuration for SS/PBCH block and CSI-RS. A parameter refFreqCSI-RS may indicate point A which may be used for mapping of CSI-RS to physical resources. A parameter ssbFrequency may indicate the frequency of the SS associated to this MeasObjectNR. A parameter ssbSubcarrierSpacing may indicate subcarrier spacing SSB. A parameter whiteCellsToAddModList may indicate list of cells to add/modify in the white list of cells. It may apply to SSB resources. A parameter whiteCellsToRemoveList may indicate a list of cells to remove from the white list of cells.

In an example, an IE MeasObjectToAddModList may concern a list of measurement objects to add or modify. In an example, an IE MeasResults may cover measured results for intra-frequency, inter-frequency, and inter-RAT mobility.

Figure 20:
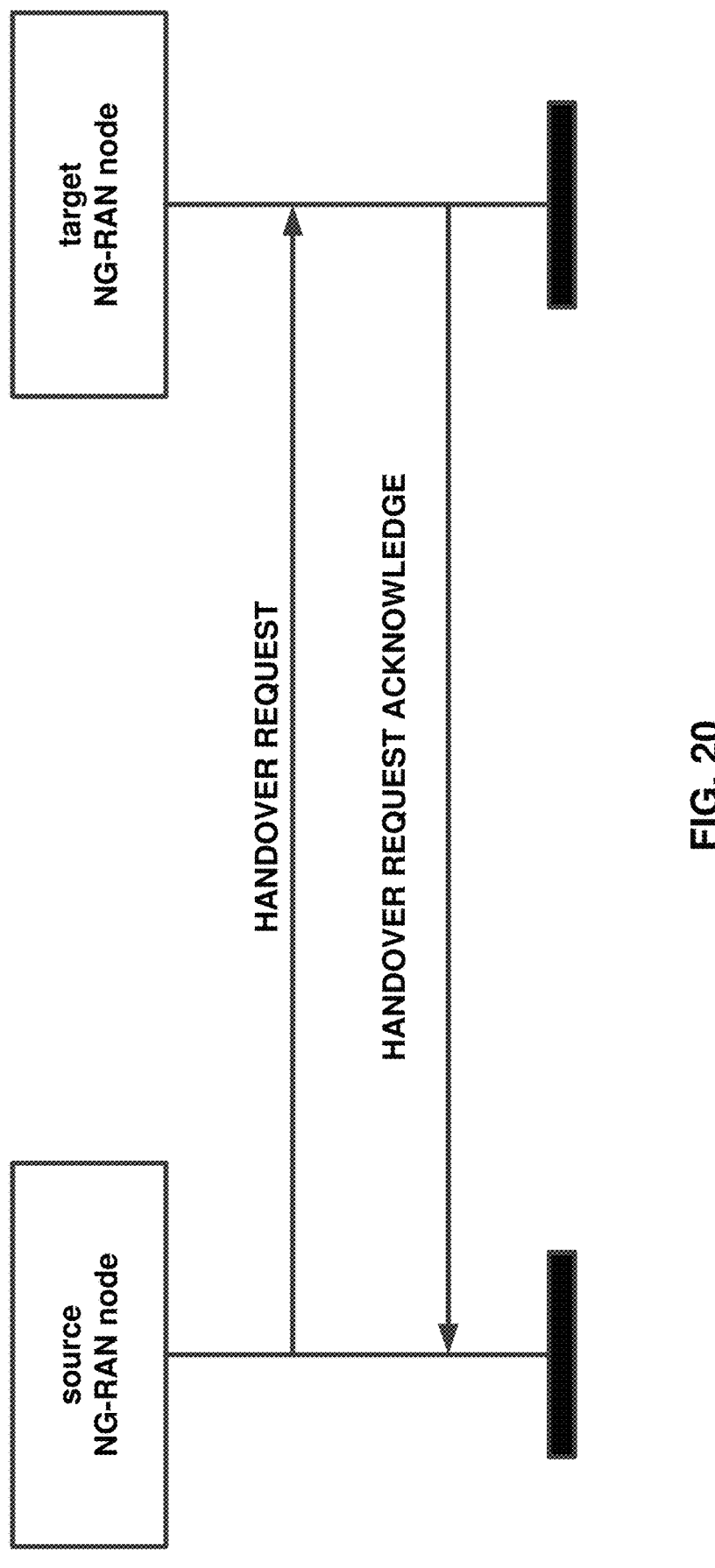
FIG. 20 shows a Handover preparation procedure in accordance with several of various embodiments of the present disclosure.

In an example, a handover preparation procedure may be used to establish necessary resources in an NG-RAN node for an incoming handover. The procedure may use UE-associated signalling. An example procedure is shown in FIG. 20.

In an example, the source NG-RAN node may initiate the procedure by sending the HANDOVER REQUEST message to the target NG-RAN node. When the source NG-RAN node sends the HANDOVER REQUEST message, it may start a timer TXnRELOCprep.

Figure 21:
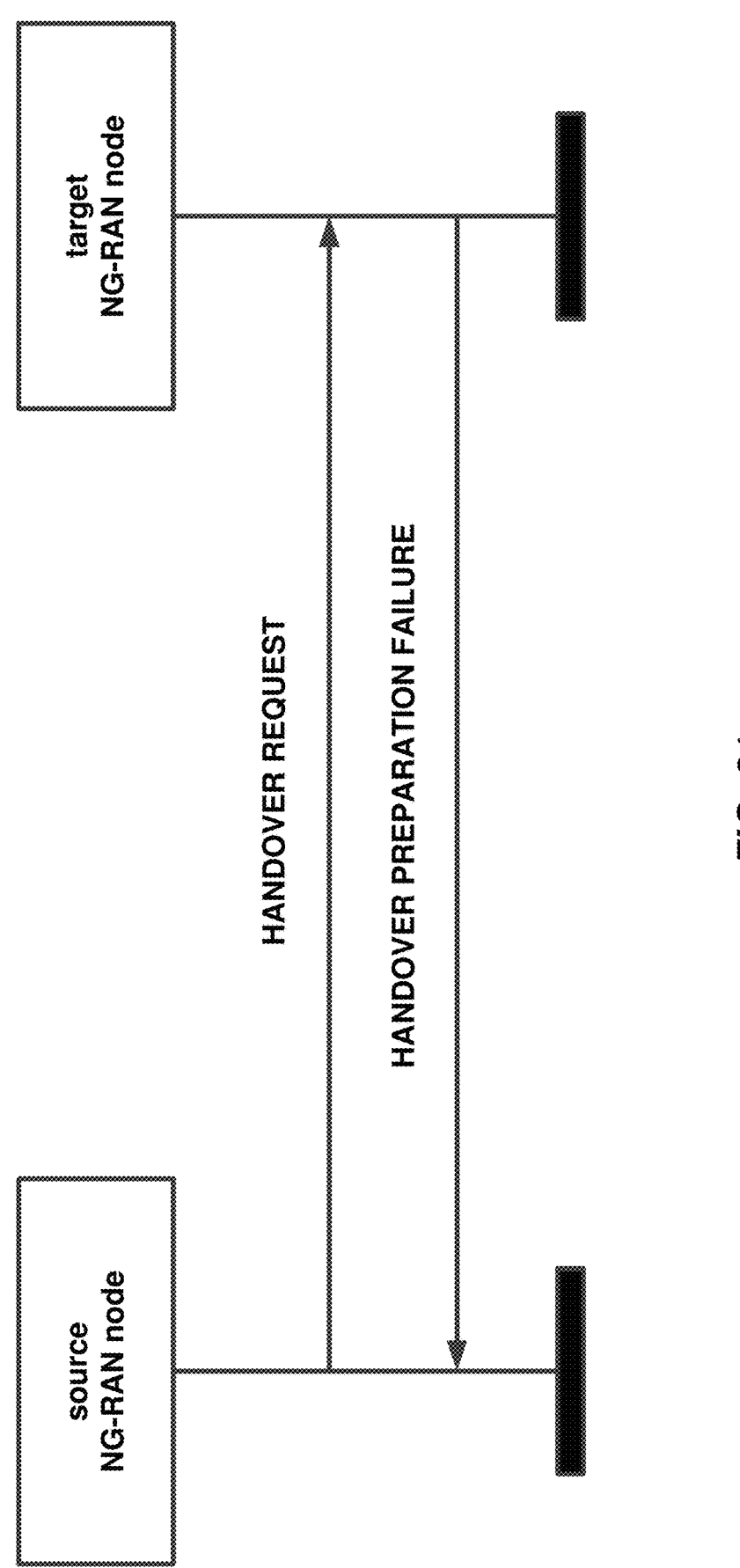
FIG. 21 shows example signaling for unsuccessful Handover preparation in accordance with several of various embodiments of the present disclosure.

In an example, if the target NG-RAN node does not admit at least one PDU session resource, or a failure occurs during the Handover Preparation, the target NG-RAN node may send the HANDOVER PREPARATION FAILURE message to the source NG-RAN node. An example procedure is shown in FIG. 21. The message may contain the Cause IE with an appropriate value.

In an example, if there is no response from the target NG-RAN node to the HANDOVER REQUEST message before timer TXnRELOCprep expires in the source NG-RAN node, the source NG-RAN node may cancel the Handover Preparation procedure towards the target NG-RAN node by initiating the Handover Cancel procedure with the appropriate value for the Cause IE. The source NG-RAN node may ignore a HANDOVER REQUEST ACKNOWLEDGE or HANDOVER PREPARATION FAILURE message received after the initiation of the Handover Cancel procedure and may remove reference and release resources related to the concerned Xn UE-associated signaling.

Figure 22:
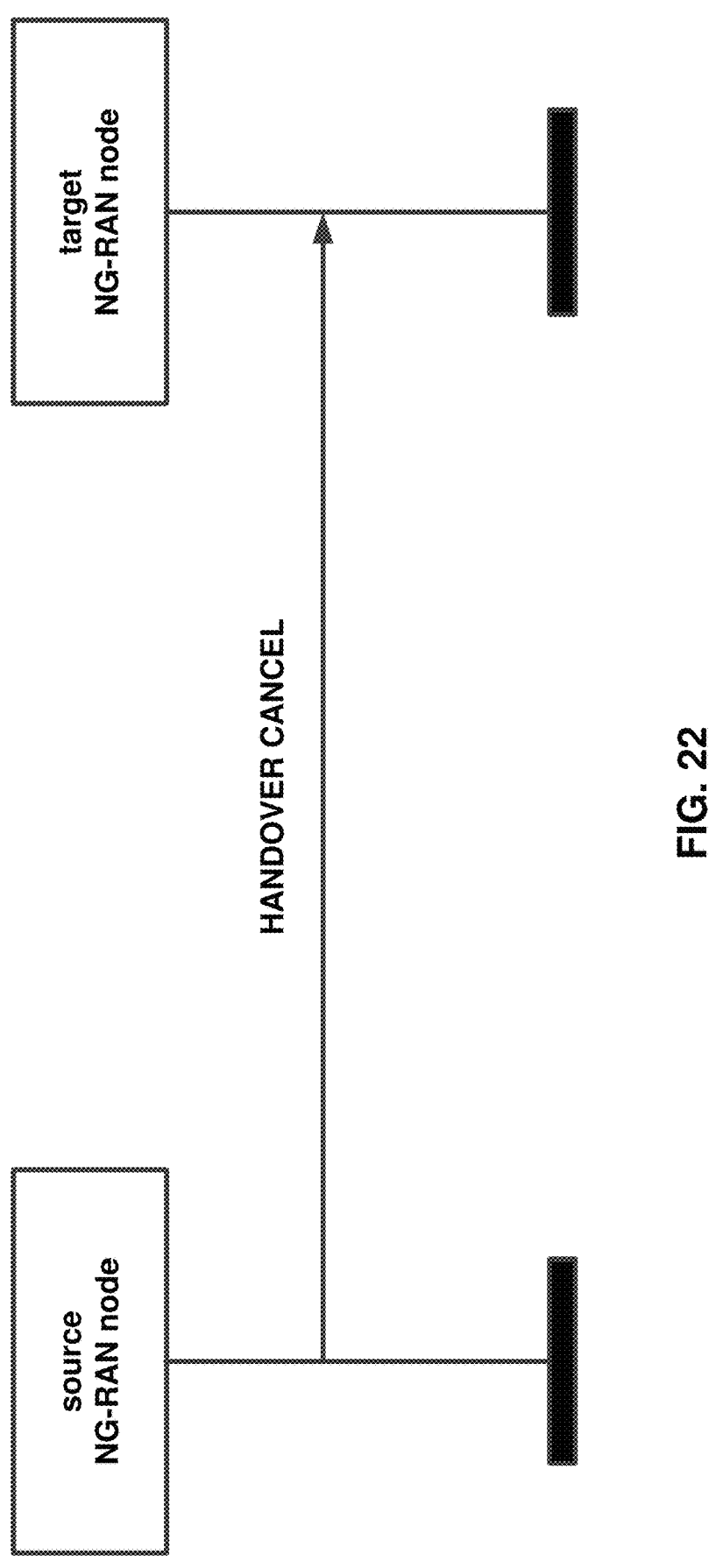
FIG. 22 shows an example Handover cancel procedure in accordance with several of various embodiments of the present disclosure.

In an example, a Handover Cancel procedure is used to enable a source NG-RAN node to cancel an ongoing handover preparation or an already prepared handover. An example is shown in FIG. 22. The procedure may use UE-associated signaling. In an example, the source NG-RAN node initiates the procedure by sending the HANDOVER CANCEL message to the target NG-RAN node. The source NG-RAN node shall indicate the reason for cancelling the handover by means of an appropriate cause value. In an example, if the HANDOVER CANCEL message refers to a context that does not exist, the target NG-RAN node may ignore the message.

In an example, a handover request message may be sent by the source NG-RAN node to the target NG-RAN node to request the preparation of resources for a handover. The handover request message may comprise the following IEs and IE Groups: Message Type, Source NG-RAN node UE XnAP ID reference, Cause, Target Cell Global ID, GUAMI, UE Context information, Trace Activation, Masked IMEISV, UE History Information and UE Context Reference at the S-NG-RAN node.

The UE Context Information may comprise following IEs: NG-C UE associated Signaling reference, Signaling TNL association address at source NG-C side, UE Security Capabilities, AS Security Information, Index to RAT/Frequency Selection Priority, UE Aggregate Maximum Bit Rate, PDU Session Resources To Be Setup List, RRC Context, Location Reporting Information and Mobility Restriction List.

The UE Context Reference at the S-NG-RAN node may comprise Global NG-RAN Node ID and S-NG-RAN node UE XnAP ID.

The Message Type IE uniquely identifies the message being sent. The Message Type IE may include a Procedure Code field and a Type of Message field. The type of Message field may comprise Initiating Message, Successful Outcome and Unsuccessful Outcome. The NG-RAN node UE XnAP ID may uniquely identify a UE over the Xn interface within the NG-RAN node.

The purpose of the Cause IE may be to indicate the reason for a particular event for the XnAP protocol. In an example, the cause may be a Radio Network Layer cause. Example Radio Network Layer causes may include: Cell not Available, Handover Desirable for Radio Reasons, Handover Target not Allowed, Invalid AMF Set ID, No Radio Resources Available in Target Cell, Partial Handover, Reduce Load in Serving Cell, Resource Optimization Handover, Time Critical Handover, TXnRELOCoverall Expiry, TXnRELOCprep Expiry, Unknown GUAMI ID, Unknown Local NG-RAN node UE XnAP ID, Inconsistent Remote NG-RAN node UE XnAP ID, Encryption And/Or Integrity Protection Algorithms Not Supported, Protection Algorithms Not Supported, Multiple PDU Session ID Instances, Unknown PDU Session ID, Unknown QoS Flow ID, Multiple QoS Flow ID Instances, Switch Off Ongoing, Not supported 5QI value, TXnDCoverall Expiry, TXnDCprep Expiry, Action Desirable for Radio Reasons, Reduce Load, Resource Optimization, Time Critical action, Target not Allowed, No Radio Resources Available, Invalid QoS combination, Encryption Algorithms Not Supported, Procedure cancelled, RRM purpose, Improve User Bit Rate, User Inactivity, Radio Connection With UE Lost, Failure in the Radio Interface Procedure, Bearer Option not Supported, UP integrity protection not possible, UP confidentiality protection not possible, Resources not available for the slice(s), UE Maximum integrity protected data rate reason, CP Integrity Protection Failure, UP Integrity Protection Failure, Slice(s) not supported by NG-RAN, MN Mobility, SN Mobility, Count reaches max value, Unknown Old NG-RAN node UE XnAP ID, PDCP Overload, DRB ID not available, Unspecified, . . . , UE Context ID not known and Non-relocation of context.

In an example, the cause may be a Transport Layer cause. Example Transport Layer causes include: Transport Resource Unavailable, Unspecified, etc. In an example, the cause may be a Protocol Cause. Example Protocol causes may include Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, etc. Other examples of cause value may include Control Processing Overload, Hardware Failure, O&M Intervention, Not enough User Plane Processing Resources, Unspecified, etc.

The Target Cell Global ID IE may indicate an NR CGI or an E-UTRA CGI. The NR CGI IE may be used to globally identify an NR cell. The E-UTRA CGI may be used to globally identify an E_UTRA cell. An NG-C UE associated Signaling reference IE may be used to uniquely identify the UE association over the source side NG interface instance. A Signaling TNL association address at source NG-C side IE may be used to provide the transport layer information associated with NG or Xn control plane transport. A UE Security Capabilities IE may define the supported algorithms for encryption and integrity protection in the UE. An AS Security Information IE may be used to generate the key material to be used for AS security with the UE. An Index to RAT/Frequency Selection Priority IE may be used to define local configuration for RRM strategies such as camp priorities and control of inter-RAT/inter-frequency mobility in RRC_CONNECTED.

A UE Aggregate Maximum Bit Rate IE may be applicable for all Non-GBR QoS flows per UE which may be defined for the Downlink and the Uplink direction and a subscription parameter provided by the AMF to the NG-RAN. A PDU Session Resources To Be Setup List IE may contain PDU session resource related information used at UE context transfer between NG-RAN nodes. An RRC Context IE may include a HandoverPreparationInformation message. A Location Reporting Information IE may indicate how the location information may be reported. A Mobility Restriction List IE may define roaming or access restrictions for subsequent mobility actions for which the NR-RAN provides information about the target of the mobility action towards the UE, e.g., handover, or for SCG selection during dual connectivity operation or for assigning proper RNAs. If the NG-RAN receives the Mobility Restriction List IE, it may overwrite previously received restriction information.

A Trace Activation IE may define parameters related to a trace activation. A Masked IMEISV IE may contain IMEISV value with a mask, to identify a terminal model without identifying an individual Mobile Equipment. A Global NG-RAN Node ID IE may be used to globally identify an NG-RAN node. An S-NG-RAN node UE XnAP ID may uniquely identify a UE over the Xn interface within the NG-RAN node.

The HANDOVER REQUEST ACKNOWLEDGE message may be sent by the target NG-RAN node to inform the source NG-RAN node about the prepared resources at the target. The handover request message may comprise the following IEs and IE Group: Message Type; Source NG-RAN node UE XnAP ID; Target NG-RAN node UE XnAP ID; PDU Session Resources Admitted List; PDU Session Resources Not Admitted List; Target NG-RAN node To Source NG-RAN node Transparent Container; UE Context Kept Indicator; Criticality Diagnostics; and DRBs transferred to MN.

The Target NG-RAN node UE XnAP ID IE may uniquely identify a UE over the Xn interface within the NG-RAN node. The PDU Session Resources Admitted List IE may contain PDU session resource related information to report success of the establishment of PDU session resources. The PDU Session Resources Not Admitted List IE may indicate a list of PDU session resources which were not admitted to be added or modified. The Target NG-RAN node To Source NG-RAN node Transparent Container IE may include a HandoverCommand message.

The UE Context Kept Indicator IE may contain a list of PDU session resources which were not admitted to be added or modified. The Criticality Diagnostics IE may be sent by the NG-RAN node when parts of a received message have not been comprehended or were missing, or if the message contained logical errors. When applicable, it may contain information about which IEs were not comprehended or were missing. The DRBs transferred to MN may contain a list of DRBs.

The Handover Preparation Failure message may be sent by the target NG-RAN node to inform the source NG-RAN node that the Handover Preparation has failed. The Handover Preparation Failure message may comprise following IEs: Message Type, Source NG-RAN node UE XnAP ID, Cause, and Criticality Diagnostics The HandoverCommand message may be used to transfer the handover command as generated by the target gNB. The HandoverCommand may Contain the RRCReconfiguration message used to perform handover within NR or handover to NR, as generated (entirely) by the target gNB.

The HandoverPreparationInformation message may be used to transfer the NR RRC information used by the target gNB during handover preparation or UE context retrieval, e.g., in case of resume or re-establishment, including UE capability information. This message may be also used for transferring the information between the CU and DU. The direction of this message may be from source gNB/source RAN to target gNB or from CU to DU.

In an example, an as-Context IE may indicate local RAN context required by the target gNB or DU. An rrm-Config IE may indicate local RAN context used mainly for RRM purposes. A sourceConfig IE may indicate the radio resource configuration as used in the source cell. A ue-CapabilityRAT-List IE may indicate the UE radio access related capabilities concerning RATs supported by the UE. A ue-InactiveTime IE may indicate duration while UE has not received or transmitted any user data.

In an example, an rrcReconfiguration message may contain the RRCReconfiguration configuration as generated entirely by the MN. A sourceRB-SN-Config may contain the IE RadioBearerConfig as generated entirely by the SN. This field is only used in NE-DC and NR-DC. A sourceSCG-EUTRA-Config may contain the current dedicated SCG configuration in RRCConnectionReconfiguration message. A sourceSCG-NR-Config may contain the current dedicated SCG configuration in RRCReconfiguration message as generated entirely by the SN. In an example, the RRCReconfiguration message may include fields CellGroupConfig and measConfig.

In an example, a Mobility Restriction List IE may define roaming or access restrictions for subsequent mobility actions for which the NR-RAN provides information about the target of the mobility action towards the UE, e.g., handover, or for SCG selection during dual connectivity operation or for assigning proper RNAs. If the NG-RAN receives the Mobility Restriction List IE, it may overwrite previously received restriction information.

Figure 23:
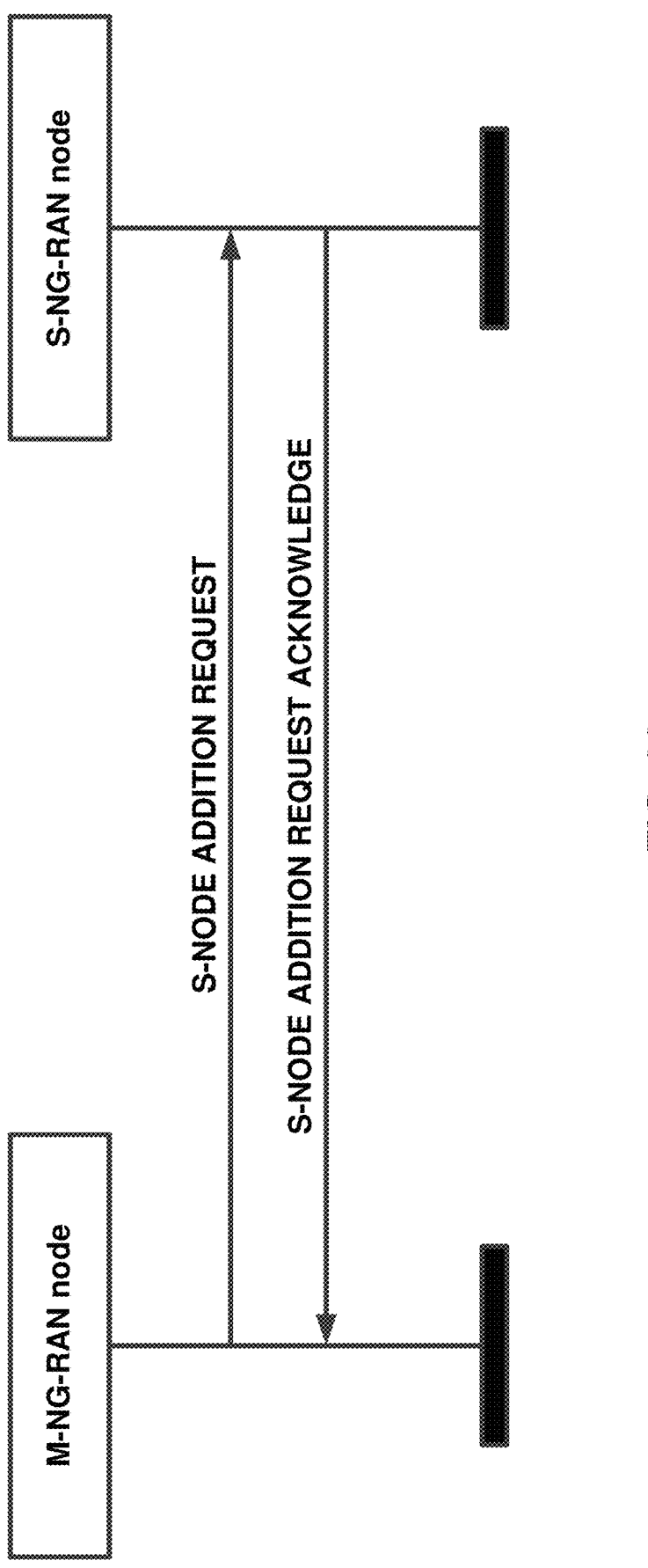
FIG. 23 shows an example S-NG-RAN node addition preparation procedure in accordance with several of various embodiments of the present disclosure.

The purpose of the S-NG-RAN node Addition Preparation procedure may be to request the S-NG-RAN node to allocate resources for dual connectivity operation for a specific UE. The procedure may use UE-associated signaling. An example procedure is shown in FIG. 23. The M-NG-RAN node may initiate the procedure by sending the S-NODE ADDITION REQUEST message to the S-NG-RAN node. When the M-NG-RAN node sends the S-NODE ADDITION REQUEST message, it may start the timer $TXn_{DCprep}$.

In an example, if the S-NG-RAN node admits at least one PDU session resource, the S-NG-RAN node may start the timer $TXn_{DCoverall}$ when sending the S-NODE ADDITION REQUEST ACKNOWLEDGE message to the M-NG-RAN node. The reception of the S-NODE RECONFIGURATION COMPLETE message may stop the timer $TXn_{DCoverall}$.

Upon receiving an S-NODE ADDITION REQUEST message containing the Desired Activity Notification Level IE, the S-NG-RAN node may, if supported, use this information to decide whether to trigger subsequent Activation Notification procedures according to the requested notification level.

Figure 24:
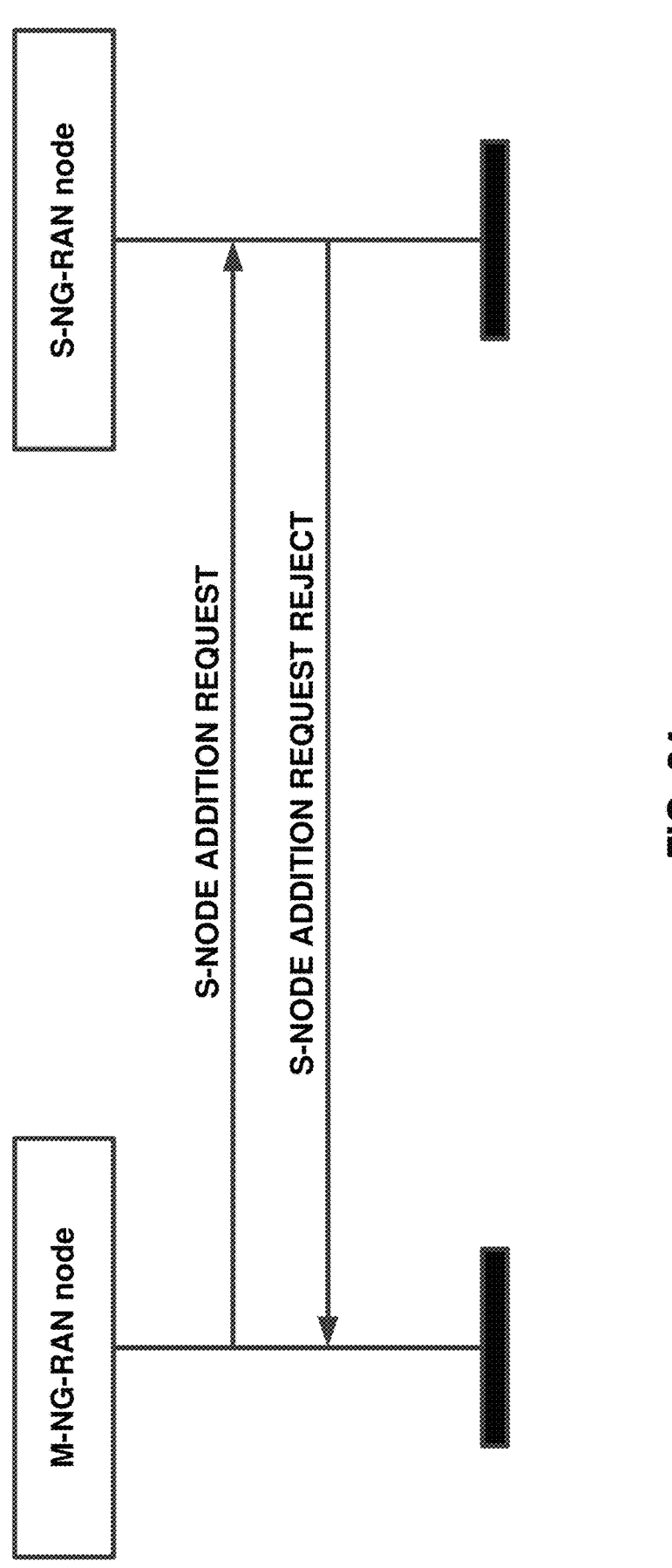
FIG. 24 shows example signaling for unsuccessful S-NG-RAN node addition in accordance with several of various embodiments of the present disclosure.

In an example, if the S-NG-RAN node may not able to accept any of the bearers or a failure occurs during the S-NG-RAN node Addition Preparation, the S-NG-RAN node may send the S-NODE ADDITION REQUEST REJECT message with an appropriate cause value to the M-NG-RAN node. An example procedure is shown in FIG. 24.

In an example, an S-NODE ADDITION REQUEST message may be sent by the M-NG-RAN node to the S-NG-RAN node to request the preparation of resources for dual connectivity operation for a specific UE. The S-NODE ADDITION REQUEST message comprise following IEs and IE groups: Message Type, M-NG-RAN node UE XnAP ID, UE Security Capabilities, S-NG-RAN node Security Key, S-NG-RAN node UE Aggregate Maximum Bit Rate, Selected PLMN, Mobility Restriction List, Index to RAT/Frequency Selection Priority, PDU Session Resources To Be Added List, M-NG-RAN node to S-NG-RAN node Container, S-NG-RAN node UE XnAP ID, Expected UE Behavior, Requested Split SRBs, PCell ID, Desired Activity Notification Level, Available DRB IDs, S-NG-RAN node Maximum Integrity Protected Data Rate Uplink, S-NG-RAN node Maximum Integrity Protected Data Rate Downlink, Location Information at S-NODE reporting, MR-DC Resource Coordination Information, Masked IMEISV, NE-DC TDM Pattern, SN Addition Trigger Indication, Trace Activation and Requested Fast MCG recovery via SRB3. The PDU Session Resources To Be Added List may comprise following IEs: PDU Session ID, S-NSSAI, S-NG-RAN node PDU Session Aggregate Maximum Bit Rate, PDU Session Resource Setup Info—SN terminated and PDU Session Resource Setup Info—MN terminated.

The UE Security Capabilities IE may define the supported algorithms for encryption and integrity protection in the UE. The S-NG-RAN node Security Key IE may be used to apply security in the S-NG-RAN node. The selected PLMN IE may indicate the PLMN identity. The Mobility Restriction List IE may define roaming or access restrictions for subsequent mobility actions for which the NR-RAN provides information about the target of the mobility action towards the UE, e.g., handover, or for SCG selection during dual connectivity operation or for assigning proper RNAs. If the NG-RAN receives the Mobility Restriction List IE, it may overwrite previously received restriction information. The Index to RAT/Frequency Selection Priority IE may be used to define local configuration for RRM strategies such as camp priorities and control of inter-RAT/inter-frequency mobility in RRC_CONNECTED. The PDU Session ID IE may identify PDU Session for a UE. The S-NSSAI IE may indicate Single Network Slice Selection Assistance Information (S-NSSAI). The S-NG-RAN node PDU Session Aggregate Maximum Bit Rate IE may be applicable for Non-GBR QoS flows per PDU session which may be defined for the downlink and the uplink direction and maybe provided at the Handover Preparation procedure to the target NG-RAN node and at the Retrieve UE Context procedure to the new NG-RAN node as received by the 5GC, during dual connectivity related procedures to the to the S-NG-RAN node as decided by the M-NG-RAN node. The PDU Session Resource Setup Info—SN terminated IE may contain information for the addition of S-NG-RAN node resources related to a PDU session for DRBs configured with an SN terminated bearer option. The M-NG-RAN node to S-NG-RAN node Container may include the ConfigInfo message.

The S-NG-RAN node UE XnAP ID may uniquely identify a UE over the Xn interface within the NG-RAN node. The Expected UE Behavior IE may indicate the behavior of a UE with predictable activity and/or mobility behavior, to assist the NG-RAN node in determining the optimum RRC connection time and to help with the RRC_INACTIVE state transition and RNA configuration (e.g., size and shape of the RNA). The Requested Split SRBs may indicate that resources for Split SRBs are requested. The PCell ID IE may indicate an NR or an E-UTRA Cell Identity. The Desired Activity Notification Level IE may contain information on which level activity notification may be performed. The Available DRB IDs IE may indicate the list of DRB IDs that the S-NG-RAN node may use for SN-terminated bearers. The S-NG-RAN node Maximum Integrity Protected Data Rate Uplink IE and the S-NG-RAN node Maximum Integrity Protected Data Rate Downlink IE may indicate the number of bits delivered by NG-RAN in UL or to NG-RAN in DL within a period of time, divided by the duration of the period. It may be used, for example, to indicate the maximum or guaranteed bit rate for a GBR QoS flow, or an aggregate maximum bit rate. The Location Information at S-NODE reporting IE may indicate that the user's Location Information at S-NODE is to be provided. The MR-DC Resource Coordination Information may be used to coordinate resource utilization between the M-NG-RAN node and the S-NG-RAN node. The Masked IMEISV IE may contain the IMEISV value with a mask, to identify a terminal model without identifying an individual Mobile Equipment. The NE-DC TDM Pattern IE may be provided by the gNB and used by the ng-eNB to determine UL/DL reference configuration indicating the time during which a UE configured with NE-DC is allowed to transmit. The SN Addition Trigger Indication IE may indicate the trigger for S-NG-RAN node Addition Preparation procedure. The Trace Activation IE may define parameters related to a trace activation.

The Requested Fast MCG recovery via SRB3 IE may indicate that the resources for fast MCG recovery via SRB3 are requested.

The S-NODE Addition Request Acknowledge message may be sent by the S-NG-RAN node to confirm the M-NG-RAN node about the S-NG-RAN node addition preparation.

The S-NODE Addition Request Acknowledge message may comprise following IEs and IE groups: Message Type, M-NG-RAN node UE XnAP ID, S-NG-RAN node UE XnAP ID, PDU Session Resources Admitted To Be Added List, PDU Session Resources Not Admitted List, S-NG-RAN node to M-NG-RAN node Container, Admitted Split SRBs, RRC Config Indication, Criticality Diagnostics, Location Information at S-NODE, MR-DC Resource Coordination Information, and Admitted fast MCG recovery via SRB3.

The S-NG-RAN node to M-NG-RAN node Container may include the CG-Config message. The Admitted Split SRBs IE may indicated admitted SRBs. The RRC Config Indication IE may indicate the type of RRC configuration used at the S-NG-RAN node.

The S-NODE ADDITION REQUEST REJECT message may be sent by the S-NG-RAN node to inform the M-NG-RAN node that the S-NG-RAN node Addition Preparation has failed. The S-NODE ADDITION REQUEST REJECT message may comprise following IEs: Message Type, M-NG-RAN node UE XnAP ID, S-NG-RAN node UE XnAP ID, Cause, and Criticality Diagnostics.

Figure 25:
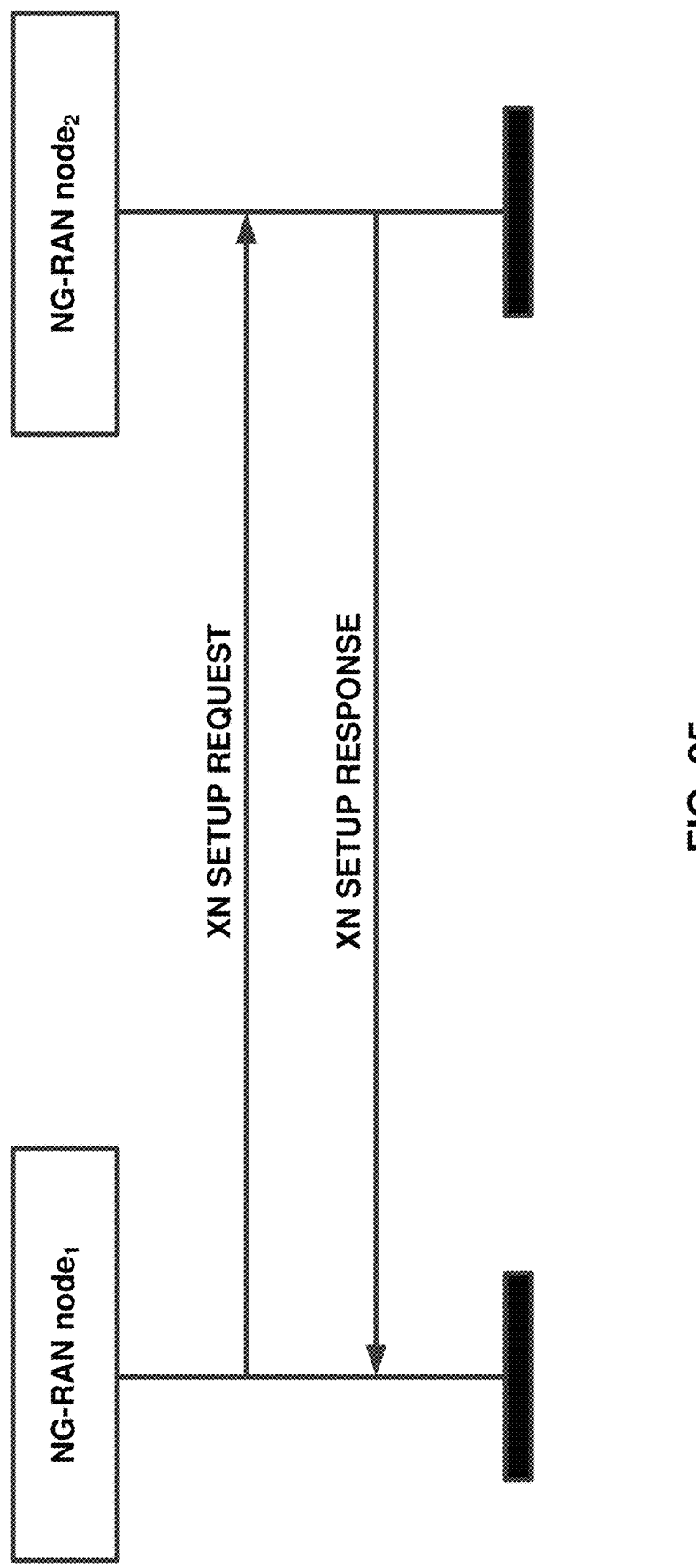
FIG. 25 shows an example Xn Setup procedure in accordance with several of various embodiments of the present disclosure.

The purpose of the Xn Setup procedure may be to exchange application level configuration data needed for two NG-RAN nodes to interoperate correctly over the Xn-C interface. The procedure may use non UE-associated signaling. An example procedure is shown in FIG. 25. The NG-RAN node1 may initiate the procedure by sending the XN SETUP REQUEST message to the candidate NG-RAN node2. The candidate NG-RAN node2 may reply with the XN SETUP RESPONSE message. If the candidate NG-RAN node2 cannot accept the setup, it may respond with the XN SETUP FAILURE message with appropriate cause value.

The XN SETUP REQUEST message may be sent by a NG-RAN node to a neighboring NG-RAN node to transfer application data for an Xn-C interface instance.

The XN SETUP REQUEST message may comprise following IEs and IE groups: Message Type, Global NG-RAN Node ID, TAI Support List, AMF Region Information, List of Served Cells NR, List of Served Cells E-UTRA, Interface Instance Indication and TNL Configuration Info. The List of Served Cells NR may comprise a Served Cell Information NR IE, a Neighbor Information NR IE, a Neighbor Information E-UTRA, a Partial List Indicator and a Cell and Capacity Assistance Information IE.

The TAI Support List may indicate the list of tracking area identities (TAIs) supported by NG-RAN node and associated characteristics e.g., supported slices. The Served Cell Information NR IE may contain cell configuration information of an NR cell that a neighboring NG-RAN node may need for the Xn AP interface. The Neighbor Information NR IE may contain cell configuration information of NR cells that a neighbor NG-RAN node may need to properly operate its own served cells. The Cell and Capacity Assistance Information IE may be used by the NG-RAN node to request information about NR or E-UTRA cells and it includes information about cell list size capacity. The Interface Instance Indication IE may contain the subcarrier spacing, cyclic prefix and TDD DL-UL slot configuration of an NR cell that a neighbor NG-RAN node needs to take into account for cross-link interference mitigation, when operating its own cells. The NG-RAN node sending the list of Intended TDD DL-UL Configuration IEs includes into the list of the configurations of NR cells that are neighboring to the cells of the receiving NG-RAN node.

The XN SETUP RESPONSE message may be sent by a NG-RAN node to a neighboring NG-RAN node to transfer application data for an Xn-C interface instance. The XN SETUP FAILURE message may be sent by the neighboring NG-RAN node to indicate Xn Setup failure.

In example embodiments, a CG-ConfigInfo message may be used by a maser base station (e.g., a master eNB or master gNB) to request the secondary base station (e.g., SgNB or SeNB) to perform certain actions e.g., to establish, modify or release a secondary cell group (SCG). The message may include additional information e.g., to assist the secondary base station (e.g., SgNB or SeNB) to set the SCG configuration. It may also be used by a central unit (CU) to request a distributed unit (DU) to perform certain actions, e.g., to establish, or modify a master cell group (MCG) or SCG. The direction of the CG-ConfigInfo message may be from a master base station (e.g., master eNB or master gNB) to secondary base station (e.g., secondary gNB or secondary eNB), alternatively CU to DU.

In example embodiments, a network-controlled repeater (NCR) may be an enhancement over conventional RF repeaters with the capability to receive and process side control information from the network. Side control information may allow a network-controlled repeater to perform its amplify-and-forward operation in a more efficient manner. Potential benefits may include mitigation of unnecessary noise amplification, transmissions and receptions with better spatial directivity, and simplified network integration.

In example embodiments, a network-controlled repeaters may be inband RF repeaters used for extension of network coverage on FR1 and/or FR2. The network-controlled repeater may be for single hop stationary network-controlled repeaters (NCRs). Network-controlled repeaters may be transparent to UEs. Network-controlled repeater may maintain the gNB-repeater link and repeater-UE link simultaneously.

Example side control information (SCI) for network-controlled repeaters may include beamforming information and/or timing information to align transmission/reception boundaries of the network-controlled repeater and/or information on UL-DL TDD configuration and/or ON-OFF information for efficient interference management and improved energy efficiency and/or power control information for efficient interference management. L1/L2 signaling may be to carry the side control information.

Figure 26:
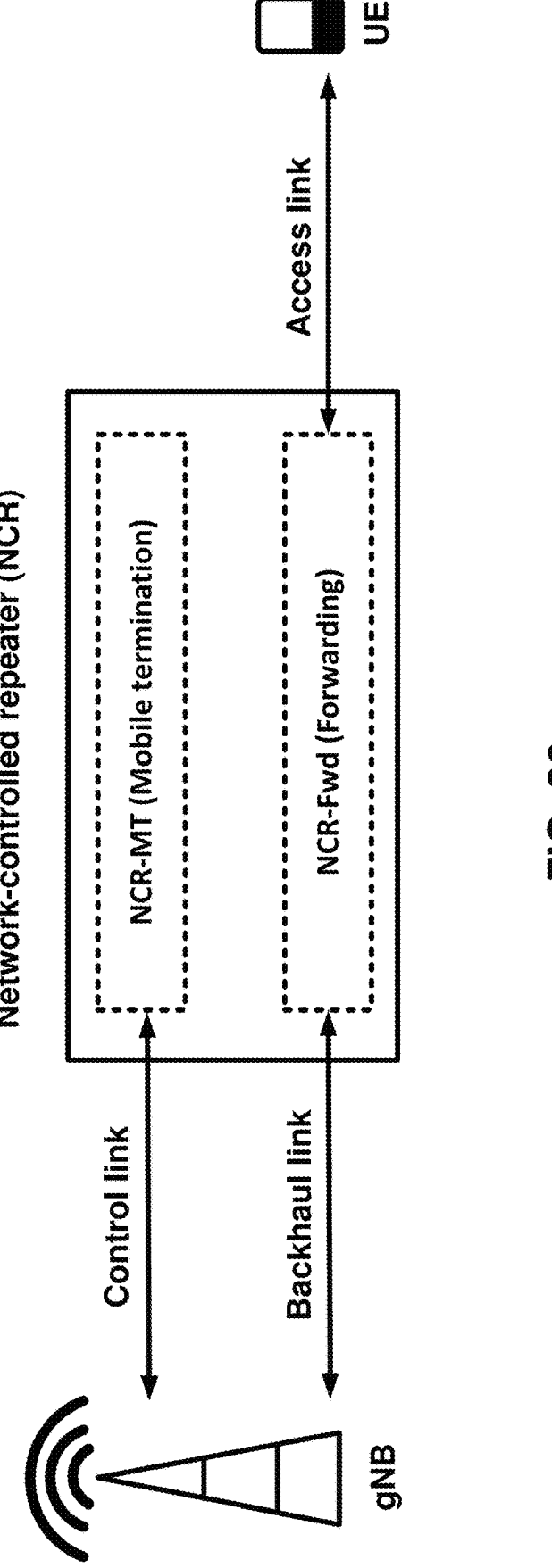
FIG. 26 shows an example model of a network controlled repeater (NCR) in accordance with several of various embodiments of the present disclosure.

An example network-controlled repeater (NCR) model is shown in FIG. 26. The NCR may include an NCR-MT function entity and an NCR-Fwd function entity. The NCR-MT may be defined as a function entity to communicate with a gNB via Control link (C-link) to enable the information exchanges (e.g., side control information (SCI)). In an example, the C-link may be based on NR Uu interface. The side control information may at least be used for the control of NCR-Fwd. In an example, the NCR-Fwd may be defined as a functi/on entity to perform the amplify-and-forwarding of UL/DL RF signal between gNB and UE via backhaul link and access link. The behavior of the NCR-Fwd may be controlled according to the received side control information (SCI) from gNB.

In an example, at least for FR2, beam information may be side control information for network-controlled repeater to control the behavior of NCR at least for access link.

In an example, both fixed beam and adaptive beam may be considered at NCR for both C-link and backhaul-link. Fixed beam refers to the case that beam at NCR for both C-link and backhaul-link cannot be changed.

In an example, for the TDD UL/DL configuration of network controller repeater: at least semi-static TDD UL/DL configuration may be needed for network-controlled repeater for links including C-link, backhaul link and access link. In an example, the same TDD UL/DL configuration may be assumed for backhaul link and access link. In an example, the same TDD UL/DL configuration may be assumed for C-link and backhaul link and access link if NCR-MT and NCR-Fwd are in the same frequency band.

In an example, for the timing of NCR: the DL receiving timing of the NCR-Fwd may be aligned with the DL receiving timing of the NCR-MT; the UL transmitting timing of the NCR-Fwd may be aligned with the UL transmitting timing of the NCR-MT. In an example, the impact of internal delay on the NCR may be considered/used in the DL receiving timing and DL transmitting timing of the NCR-Fwd and the UL transmitting timing and UL receiving timing of the NCR-Fwd.

In an example, ON-OFF information may be used in network-controlled repeater to control the behavior of NCR-Fwd.

In an example, both the dynamic indication and semi-static indication may be considered for the beam of access link for NCR-Fwd.

In an example, for indication of the ON-OFF information from gNB to NCR for controlling the behavior of NCR-Fwd, explicit indication with on-off state (e.g., via dynamic or semi-static signaling) or on-off pattern (e.g., periodic/semi-static ON-OFF pattern or new DRX-like pattern for ON-OFF) may be used. In an example, implicit indication via the signaling for other information (e.g., beam, DL/UL configuration, or PC information).

In an example, at least one of the NCR-MT's carrier(s) may be within the set of carriers forwarded by the NCR-Fwd in same frequency range.

In an example, same large-scale properties of the channel, e.g., channel properties in Type-A and Type-D (if applicable), may be expected to be experienced by C-link and backhaul link (at least when the NCR-MT and NCR-Fwd operating in same carrier).

In an example, the same TCI states as C-link may be assumed for beam at NCR-Fwd for backhaul link if the NCR-MT's carrier(s) is within the set of carriers forwarded by the NCR-Fwd. In an example, additional indication from gNB may be used to determine the beam at NCR-Fwd for backhaul link. In an example, implicit determination of the beam at NCR-Fwd may be used for backhaul link.

In an example, the same assumption of the beam correspondence may be applied for DL/UL of the backhaul link at NCR-Fwd as the DL/UL of the C-link at NCR-MT. In an example, the beam correspondence may be assumed for the DL/UL of the access link at NCR-Fwd.

In an example, the controlling of the amplifying gain of NCR-Fwd may be considered to enable the power control of NCR-Fwd.

In an example the DL of C-link and DL of backhaul link may be performed simultaneously or in TDM way.

In an example, the UL of C-link and UL of backhaul link may be performed in TDM way.

In an example, multiplexing may be under the control of gNB with consideration for NCR capability.

In an example, simultaneous transmission of the UL of C-link and UL of backhaul link may be subject to NCR's capability.

In an example, the NCR-MT may obtain the necessary configuration for receiving the L1/L2 signaling of the side control information. In an example, the necessary configuration is from RRC. In an example, the necessary configuration may be from OAM or hard-coded. In an example, the necessary configuration may be partially configured by RRC and partially configured by OAM or hard-coded.

In an example, for indication of NCR-Fwd ON-OFF for efficient interference management and improved energy efficiency, both dynamic and semi-static indication may be considered.

In an example, for the access link beamforming of the NCR-Fwd, dynamic beam indication only may be used.

In an example, for the access link beamforming of the NCR-Fwd, semi-static beam indication only may be used.

In an example, for the access link beamforming of the NCR-Fwd, dynamic beam indication and semi-static beam indication may be used.

In an example, for an NCR-MT, the necessary configurations from RRC and/or OAM (or hard-coded) may contain the configurations of PHY channels to carry the L1/L2 signaling and the configurations of L1/L2 signaling. The configurations of PHY channels to carry the L1/L2 signaling may include configurations for receiving PDCCH and PDSCH and/or configurations for transmitting PUCCH and/or the configurations for transmitting PUSCH. The configurations of L1/L2 signaling may include the configurations for DCI and/or the configurations for UCI.

In an example, in the access link beam indication, an access link beam may be indicated by a beam index.

In an example, in the access link beam indication, an access link may be indicated by an index of a source RS (e.g., a TCI-like indicator).

In an example, the same TDD UL/DL configuration may be assumed for C-link and backhaul link and access link if the NCR-MT and the NCR-Fwd are in the same frequency band.

In an example, the time at which the NCR applies an access link beam indication may be considered.

In an example, for the time-domain granularity of the access link beam indication, slot-level and/or symbol-level may be used.

To enhance the coverage, one or more cells of a wireless device may be served using a smart repeater or a network controlled repeater (NCR). An NCR may amplify and forward uplink signals/channels transmissions and/or downlink signals/channels transmissions via the one or more cells. Existing wireless device and/or wireless network and/or NCR processes and/or signaling (e.g., for RRM/measurements, connected state and/or idle/inactive state mobility, multi-connectivity, random access, initial access, etc.) may result in inefficiency and degraded performance of the wireless device and wireless network when an NCR is used or is expected to be used. There is a need to enhance existing wireless device and/or wireless network and/or NCR processes and/or signaling when an NCR is used or is expected to be used. Example embodiments enhance the existing wireless device and/or wireless network and/or NCR processes and/or signaling when an NCR is used or is expected to be used.

In example embodiments, a wireless device may be an NCR wireless device or a non-NCR wireless device (e.g., may be an NCR or may not be an NCR). A process described for a wireless in an example embodiment may be applicable to an NCR (e.g., a wireless device that is an NCR) or may be applicable to a non-NCR wireless device (e.g., a wireless device that is not an NCR) or may be applicable to both an NCR and a non-NCR wireless device. In an example embodiment, the term wireless device may refer to an NCR wireless device. In an example embodiment, the term wireless device may refer to a non-NCR wireless device (e.g., a wireless device that is not an NCR). In an example embodiment, the term wireless device may refer to an NCR wireless device and/or to a non-NCR wireless device.

Figure 27:
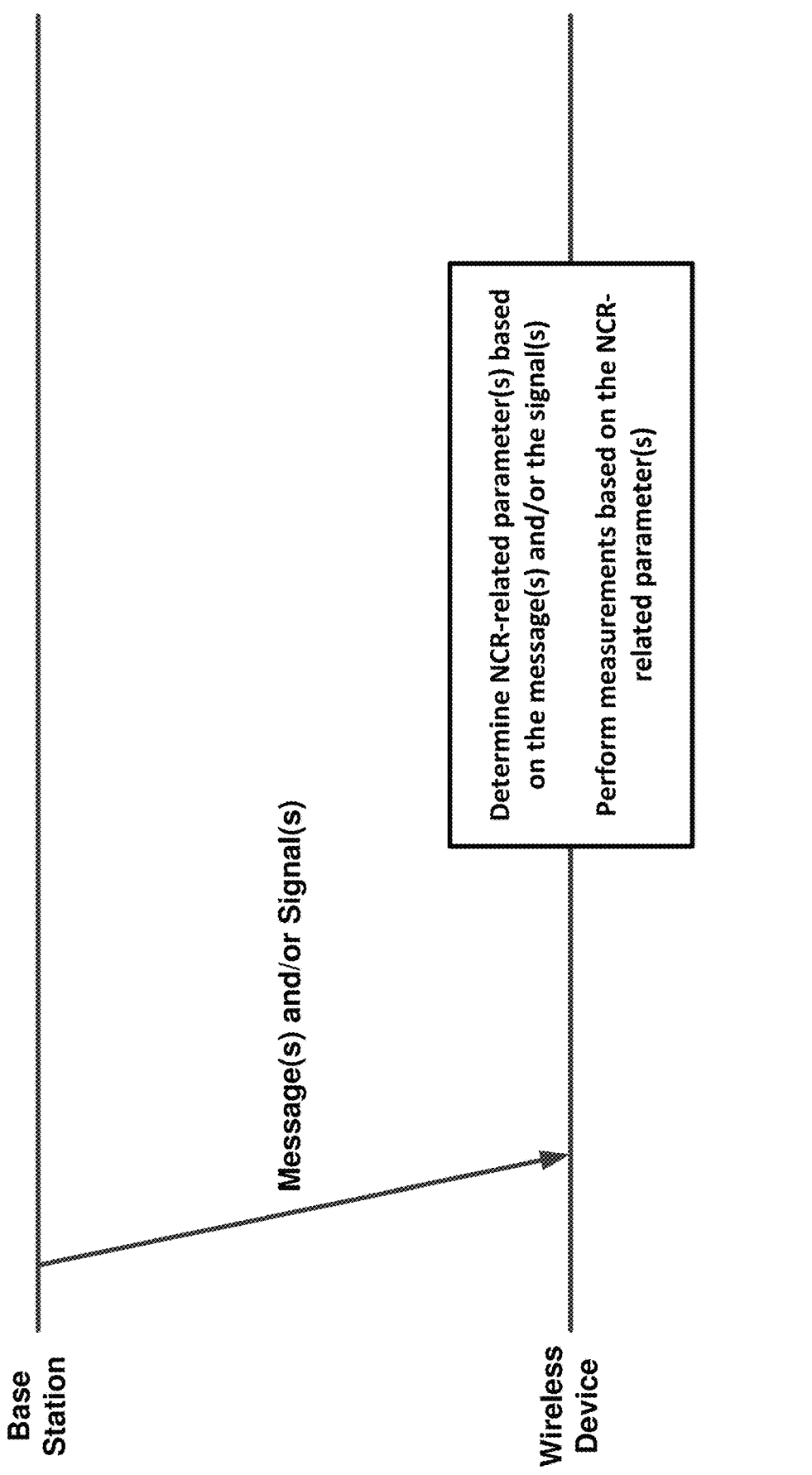
FIG. 27 shows an example process in accordance with several of various embodiments of the present disclosure.

In an example embodiment as shown in FIG. 27, a wireless device may receive one or more messages and/or one or more signals from a base station. In an example, the one or more messages may comprise a broadcast message, e.g., a SIB message, e.g., SIB1. The one or more messages and/or the one or more signals may indicate information related to one or more NCRs. For example, the one or more message and/or the one or more signals may indicate one or more NCR-related parameters associated with a base station and/or one or more first cells provided by the base station. In an example, the broadcast message may comprise one or more information elements with values indicating the information related to the one or more NCRs (e.g., the one or more NCR-related parameters). In an example, the one or more signals may comprise a SS/PBCH block. The wireless device may determine, based on the one or more messages (e.g., based on the values of the information elements) and/or the one or more signals (e.g., one or more parameters associated with the one or more signals), one or more NCR-related parameters associated with the base station and/or the one or more first cells provided by the base station.

In an example, the wireless device may receive the one or more messages and/or the one or more signals via the one or more first cells (e.g., via radio resources of/associated with the one or more first cells) and the determined one or more NCR-related parameters may be for the one or more first cells via which the one or more messages and/or the one or more signals are received.

In an example, based on the determination, the wireless device may perform measurements (e.g., RRM measurements, e.g., measurements for one or more beams) based on the one or more NCR-related parameters that are determined based on the one or more messages and/or the one or more signals. In an example, the wireless device may perform the measurements for the purpose of mobility (e.g., for the connected state mobility/handover and/or for the idle/inactive state mobility/cell (re)selection). In an example, the measurements may be based on one or more reference signals (e.g., SSB and/or CSI-RS) received from the base station (e.g., via the one or more first cells provided by the base station, e.g., associated with one or more beams). The measurements may be based on determining RSRP and/or RSRQ for the one or more reference signals.

In an example, in response to performing the measurements, the wireless device may generate and transmit one or more measurement reports to a source base station. In an example, the wireless device may be in an RRC connected state and the one or more measurement reports received by the source base station may trigger a handover to a first cell of the one or more first cells (e.g., for connected state mobility). The source base station may transmit a handover request to the target base station requesting handover to a first cell of the one or more cells provided by the target base station. In response to transmitting the one or more measurement reports, the wireless device may receive an RRC message (e.g., an RRC reconfiguration message) comprising configuration parameters (e.g., random access configuration parameters) of the first cell. The wireless device may initiate a handover procedure to handover to the first cell of the target base station in response to receiving the configuration parameters. The wireless device may initiate a random access process via the first cell based on the configuration parameters of the first cell (e.g., based on random access configuration parameters included in the configuration parameters of the first cell).

In an example, the wireless device may be in an RRC idle state or an RRC inactive state. In response to the measurements and based on the measurement results (e.g., based on the determined RSRP and/or the RSRQ of the one or more reference signals), the wireless device may determine to camp on a first cell of the one or more first cells (e.g., for idle state/inactive state mobility).

In an example, the one or more NCR-related parameters may indicate NCR information that are used for one or more NCRs that operate to extend coverage for one or more cells provided by the base station. For example, the one or more NCR-related parameters may indicate beamforming information (e.g., beams for communications between the base station and the NCR), timing information (e.g., used in determining uplink and/or downlink timing at the NCR and/or a wireless device), duplexing (e.g., TDD) configuration (e.g., for determination of downlink and/or uplink and/or flexible symbols), ON-OFF information (e.g., used in determination ON and OFF durations/time patterns of the NCR), power control parameters (e.g., used in determination of transmit power of the NCR), etc.

In an example, the one or more NCR-related parameters may indicate information about NCR support (e.g., information about NCR support by a base station or by one or more first cells provided by the base station). For example, the one or more NCR-related parameters may indicate whether the one or more first cells support NCR and/or whether downlink or uplink transmissions, via the one or more first cells, are forwarded by the base station (e.g., forwarded by the NCR-Fwd function entity of the NCR). For example, the one or more NCR-related parameters may indicate one or more frequency bands for which NCR is supported and/or may indicate one or more frequency bands associated with one or more cells, wherein NCR support for a cell is based on the frequency band/coverage area associated with the cell and the wireless device may determine whether a cell supports NCR based on the frequency band associated with the cell. For example, the one or more NCR-related parameters may indicate whether the one or more first cells support NCR (e.g., whether coverage for the one or more first cells may be extended using NCR and/or NCR is used for extending coverage for the one or more first cells). For example, the one or more NCR-related parameters may indicate whether side control information (SCI) is transmitted by the base station, for example whether SCI is transmitted by the base station for the one or more cells provided by the base station. For example, the one or more NCR-related parameters may indicate whether NCR related information/system information is transmitted/broadcast by the base station (e.g., transmitted/broadcast by the base station for one or more cells provided by the base station).

Figure 28:
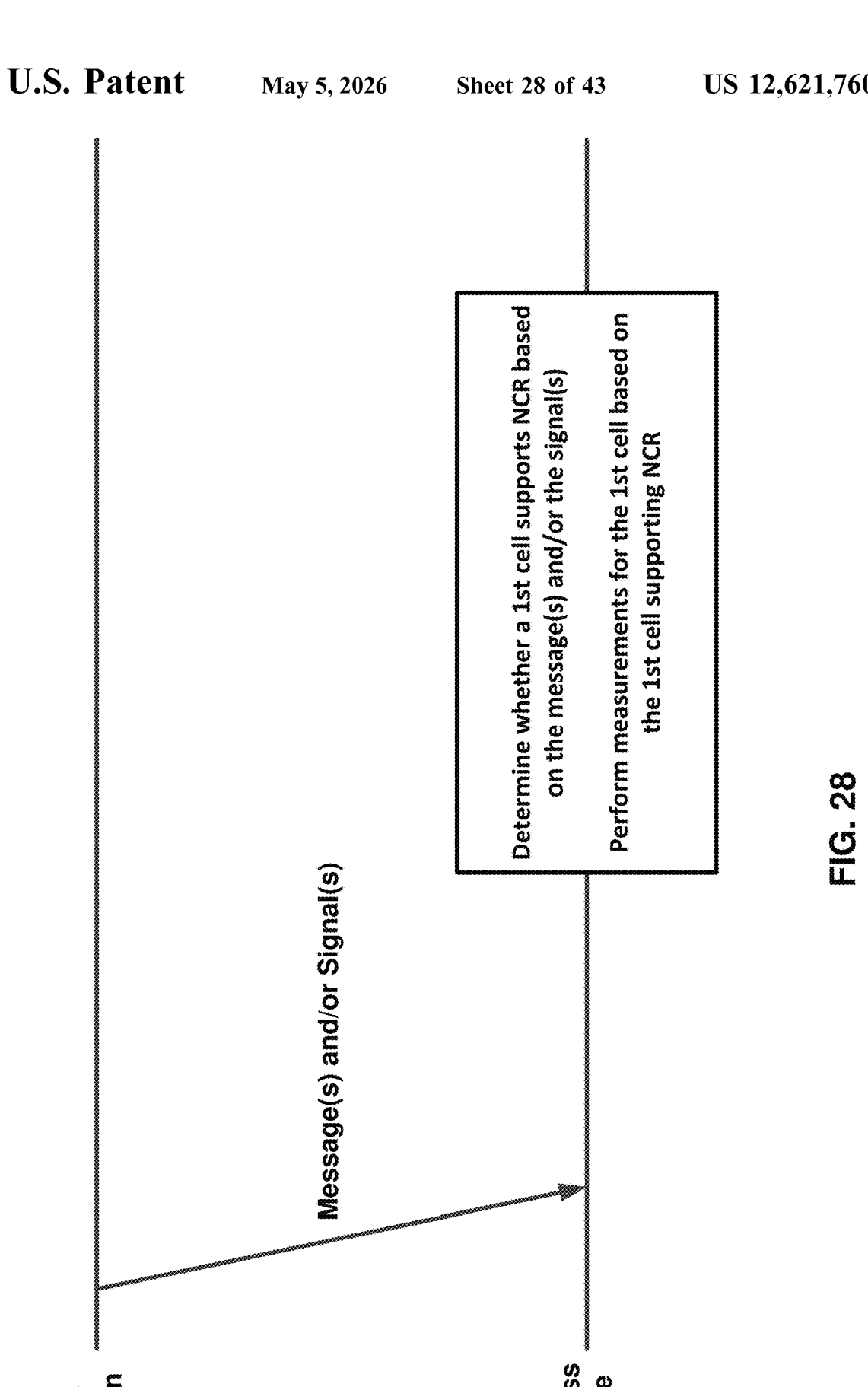
FIG. 28 shows an example process in accordance with several of various embodiments of the present disclosure.

In an example as shown in FIG. 28, a wireless device may receive one or more messages and/or one or more signals from a base station. In an example, the one or more messages may comprise a broadcast message, e.g., a SIB message, e.g., SIB1. In an example, the one or more signals may comprise a SS/PBCH block (SSB). The one or more messages (e.g., values of one or more information elements in the one or more messages) and/or the one or more signals (e.g., one or more parameters associated with the one or more signals) may indicate whether a first cell supports NCR and/or whether SCI is transmitted for the first cell and/or whether NCR related information (e.g., system information) is transmitted/broadcast via the first cell. The wireless device may determine, based on the one or more messages (e.g., based on values of one or more information elements in the one or more messages) and/or the one or more signals (e.g., one or more parameters associated with the one or more signals) whether a first cell support NCR and/or whether SCI is transmitted for the first cell and/or whether NCR related information (e.g., system information) is transmitted/broadcast via the first cell.

In an example, based on the determination, the wireless device may perform measurements (e.g., RRM measurements, e.g., measurements for one or more beams) based on the first cell supporting NCR and/or based on the SCI being transmitted for the first cell and/or based on NCR related information (e.g., system information) being transmitted/broadcast via the first cell. In an example, the wireless device may perform the measurements for the purpose of mobility (e.g., for the connected state mobility/handover and/or for the idle/inactive state mobility/cell (re)selection). In an example, the measurements may be based on one or more reference signals (e.g., SSB and/or CSI-RS) received from the base station (e.g., via the first cell, e.g., associated with one or more beams). The measurements may be based on determining RSRP and/or RSRQ for the one or more reference signals.

In an example as shown in FIG. 29, a wireless device may receive one or more messages and/or one or more signals from a base station. In an example, the one or more messages may comprise a broadcast message, e.g., a SIB message, e.g., SIB1. In an example, the one or more signals may comprise a SS/PBCH block (SSB). The one or more messages (e.g., values of one or more information elements in the one or more messages) and/or the one or more signals (e.g., one or more parameters associated with the one or more signals) may indicate whether a base station supports NCR and/or whether SCI is transmitted by the base station and/or whether NCR related information (e.g., system information) is transmitted/broadcast by the base station. The wireless device may determine, based on the one or more messages (e.g., based on values of one or more information elements in the one or more messages) and/or the one or more signals (e.g., one or more parameters associated with the one or more signals) whether the base station support NCR and/or whether SCI is transmitted by the base station and/or whether NCR related information (e.g., system information) is transmitted/broadcast by the base station.

In an example, based on the determination, the wireless device may perform measurements (e.g., RRM measurements, e.g., measurements for one or more beams) for a first cell of the base station based on the first cell supporting NCR and/or based on the SCI being transmitted by the base station and/or based on NCR related information (e.g., system information) being transmitted/broadcast by the base station. In an example, the wireless device may perform the measurements for the purpose of mobility (e.g., for the connected state mobility/handover and/or for the idle/inactive state mobility/cell (re)selection). In an example, the measurements may be based on one or more reference signals (e.g., SSB and/or CSI-RS) received from the base station (e.g., via the first cell, e.g., associated with one or more beams). The measurements may be based on determining RSRP and/or RSRQ for the one or more reference signals.

Figure 30:
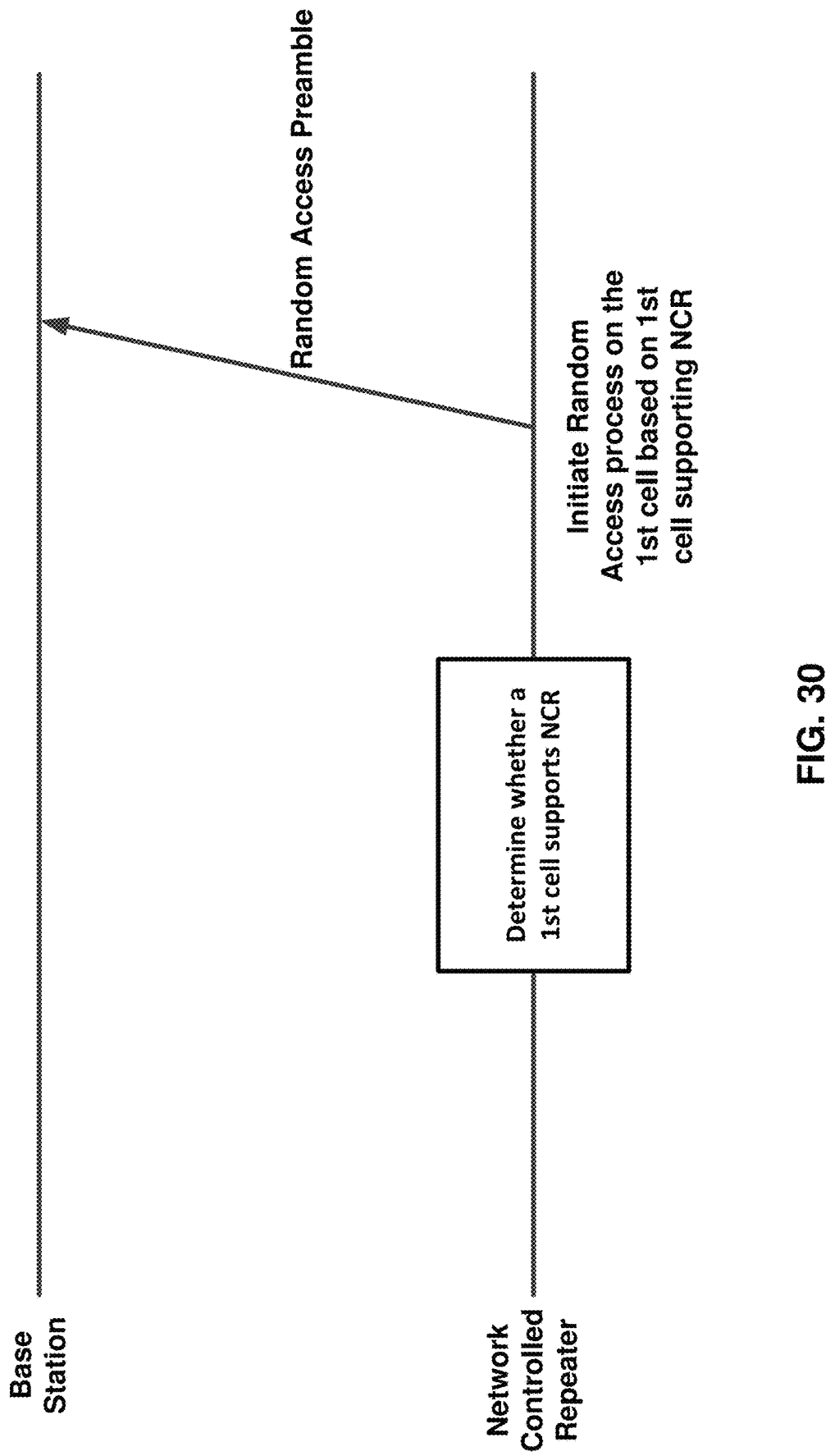
FIG. 30 shows an example process in accordance with several of various embodiments of the present disclosure.

In an example embodiment as shown in FIG. 30, an NCR may determine one or more NCR-related parameters associated with a first cell. For example, the NCR may determine whether the first cell supports NCR (e.g., supporting to forward uplink and/or downlink transmissions e.g., using the NCR-Fwd function entity of the NCR and/or supporting NCR based on a frequency band/coverage associated with the first cell) and/or may determine whether SCI is transmitted by the base station for the first cell and/or may determine whether NCR-related information/system information is transmitted/broadcast by the base station for the first cell. For example, the wireless device may receive (e.g., via radio resources of the first cell) one or more messages and/or one or more signals and the determination may be based on the one or more messages and/or the one or more signals. In an example, the one or more messages may comprise a broadcast message, e.g., a SIB message, e.g., SIB1. In an example, the one or more signals may comprise a SS/PBCH block (SSB). The one or more messages (e.g., values of one or more information elements in the one or more messages) and/or the one or more signals (e.g., one or more parameters associated with the one or more signals) may indicate whether a first cell supports NCR and/or whether SCI is transmitted for the first cell and/or whether NCR related information (e.g., system information) is transmitted/broadcast via the first cell. The determination may be based on values of the one or more information elements of the one or more messages and/or based on one or more parameters associated with the one or more signals. Based on the determination that the first cell supports NCR and/or that SCI is transmitted by the base station for the first cell and/or that NCR-related information/system information is transmitted/broadcast by the base station for the first cell, the NCR may initiate a random access process via the first cell. In an example, initiating the random access process may be to access (e.g., for initial access to) the first cell. In an example, initiating the random access process may be for obtaining timing advance. The random access process may comprise receiving a random access message (e.g., a random access response/RAR) comprising a field with a value indicating the timing advance. The timings of uplink transmissions by the NCR (e.g., by the NCR-MT function entity of the NCR for the control link and/or by the NCR-Fwd function entity of the NCR for the backhaul link) may be based on the timing advance. The NCR may transmit an uplink transmission (e.g., an uplink channel or an uplink signal) via the NCR-MT function entity for the control link based on the timing advance. The NCR may transmit an uplink transmission (e.g., an uplink channel or an uplink signal) via the NCR-Fwd function entity for the backhaul link based on the timing advance.

Figure 31:
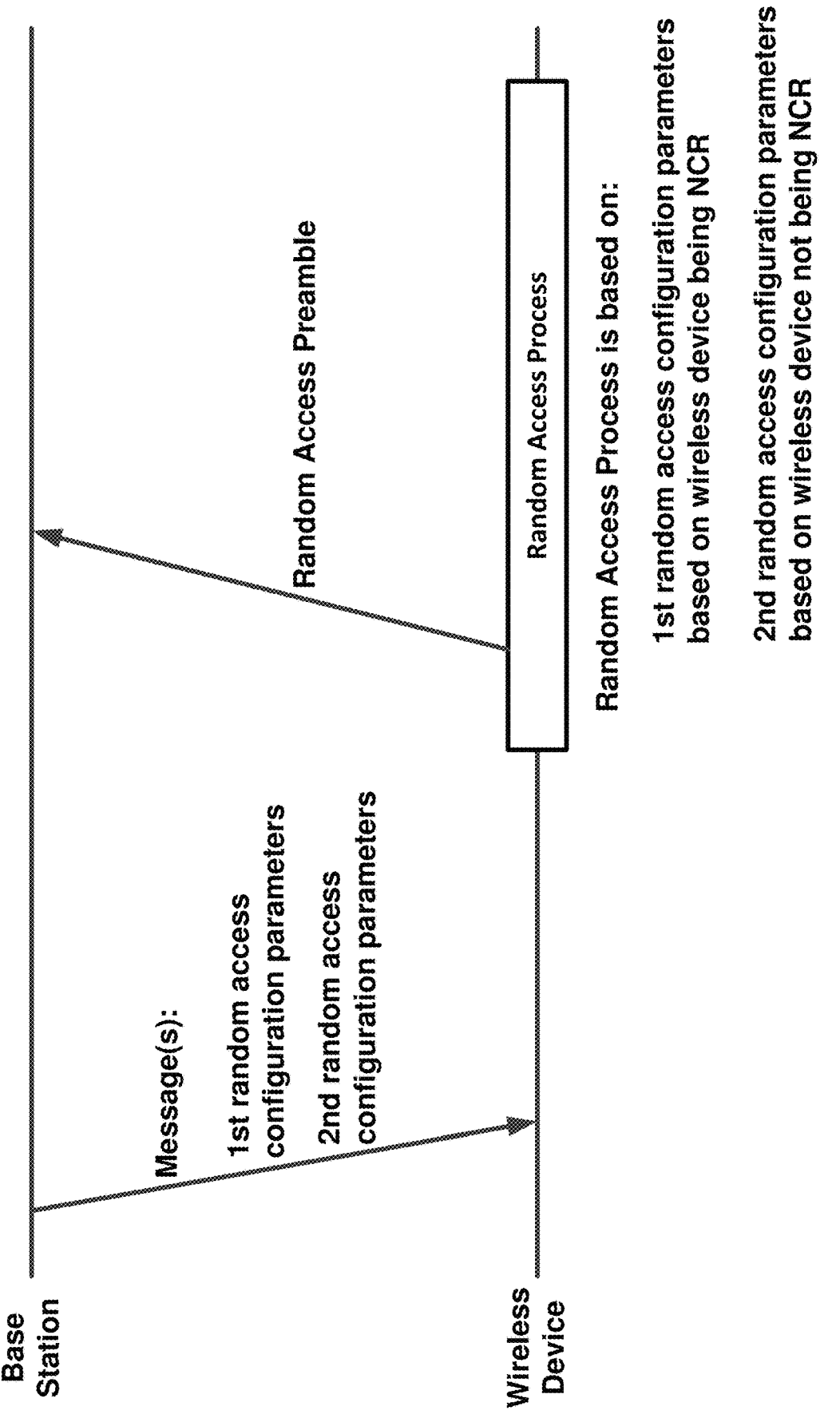
FIG. 31 shows an example process in accordance with several of various embodiments of the present disclosure.

In an example embodiment as shown in FIG. 31, a wireless device may receive one or more messages (e.g., one or more broadcast messages, e.g., one or more SIB messages comprising a SIB1 message). The one or more messages may comprise one or more first random access configuration parameters and one or more second random access configuration parameters. The one or more first random access processes may be associated with/dedicated to NCRs. The one or more second random access configuration parameters may be associated with/dedicated to wireless devices that are not NCRs. In an example, the one or more first random access configuration parameters may indicate first random access preambles and the one or more second random access configuration parameters may indicate second random access preambles. The first random access preambles may be dedicated to/associated with the NCRs and the second random access preambles may be dedicated to/associate with wireless devices that are not NCRs. In an example, the one or ore first random access configuration parameters may indicate first random access resources/occasions and the second random access configuration parameters may indicate second random access resources/occasions. The first random access resources/occasions may be dedicated to/associated with/used in random access processes initiated by the NCRs and the second random access resources/occasions may be dedicated to/associate with/used in random processes initiated by wireless devices that are not NCRs.

The wireless device may initiate a random access process. The initiating the random access process may be based on the one or more first random access configuration parameters based on/when/if the random access process being for/initiated by an NCR (e.g., the wireless device being an NCR). The initiating the random access process may be based on the one or more second random access configuration parameters based on/when/if the random access process being for/initiated by a wireless device that is not an NCR (e.g., the wireless device not being an NCR). For example, when/if/based on the wireless device being an NCR, the wireless device may initiate the random access process using/based on the one or more first random access configuration parameters and may initiate the random access process via the control link.

In an example, a base station may determine whether a wireless device that has initiated the random access process is an NCR or is not an NCR. For example, based on the random access process initiated by the wireless device using the one or more first random access configuration parameters (e.g., based on the random access process using a first random access preamble in the first random access preambles and/or using a first random access resource/occasion in the first random access resources/occasions), the base station may determine that the wireless device is an NCR. For example, based on the random access process using the one or more second random access configuration parameters (e.g., based on the random access process using a second random access preamble in the second random access preambles and/or using a second random access resource/occasion in the second random access resources/occasions), the base station may determine that the wireless device is not an NCR.

Figure 32:
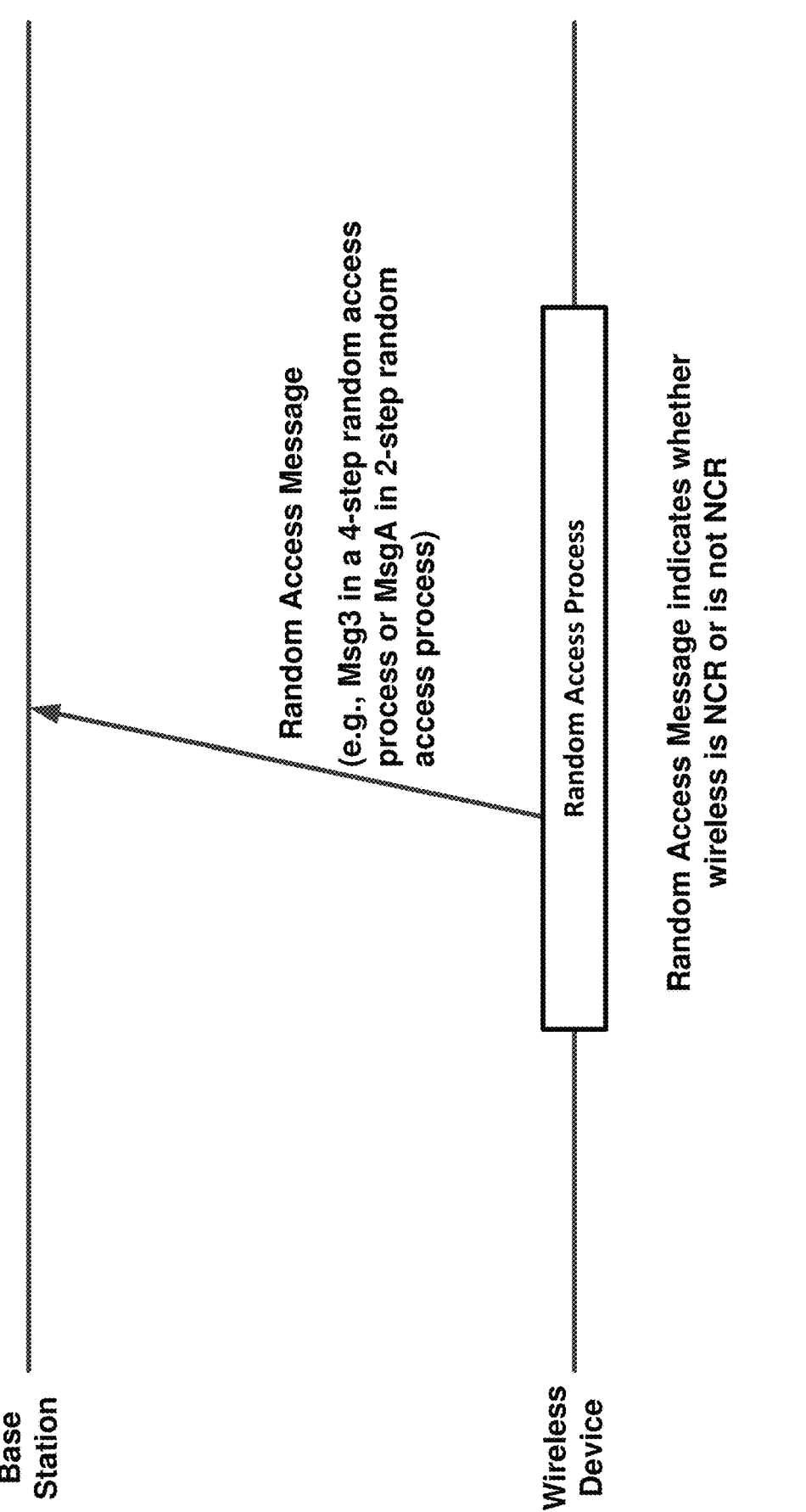
FIG. 32 shows an example process in accordance with several of various embodiments of the present disclosure.

In an example embodiment as shown in FIG. 32, a wireless device may initiate a random access process. In an example, the random access process may be a 4-step random access process. In an example, the random access process may be a 2-step random access process. The random access process may comprise transmitting a random access message (e.g., a random access preamble, a Msg3 (in 4-step random access) or a MsgA (in 2-step random access)) indicating whether the wireless device is a network control repeater or is not a network controlled repeater. For example, the random access preamble and/or the random access occasion in which the random access preamble is transmitted may indicate whether the wireless device is a network controlled repeater or is not a network controlled repeater. For example, certain random access preambles and/or random access occasions may be dedicated to NCRs and certain other random access preambles and/or other random access occasions may be dedicated to wireless devices that are not NCRs. For example, a Msg3 or a MsgA (e.g., a MAC CE included in the TB transmitted via Msg3/MsgA, an identifier (e.g., an LCID, e.g., an LCID for CCCH) associated with the Msg3/MsgA or the TB transmitted via the Msg3/MsgA, etc.), etc.) may indicate whether the wireless device is a network controlled repeater or is not a network controlled repeater. In response to receiving, by the base station, the random access message (e.g., the random access preamble or the Msg3/MsgA), the base station may determine whether the wireless device is allowed to/may access a cell. For example, based on the wireless device being an NCR and the NCR being allowed to access the cell, the base station may respond with a RAR/MsgB (in a 2-step random access process) or a Msg3 (in a 4-step random access process). For example, based on the wireless device being an NCR and the NCR not being allowed to access the cell, the base station may not respond with a RAR/MsgB (in a 2-step random access process) or a Msg3 (in a 4-step random access process) and/or the random access process may be terminated/aborted.

Figure 33:
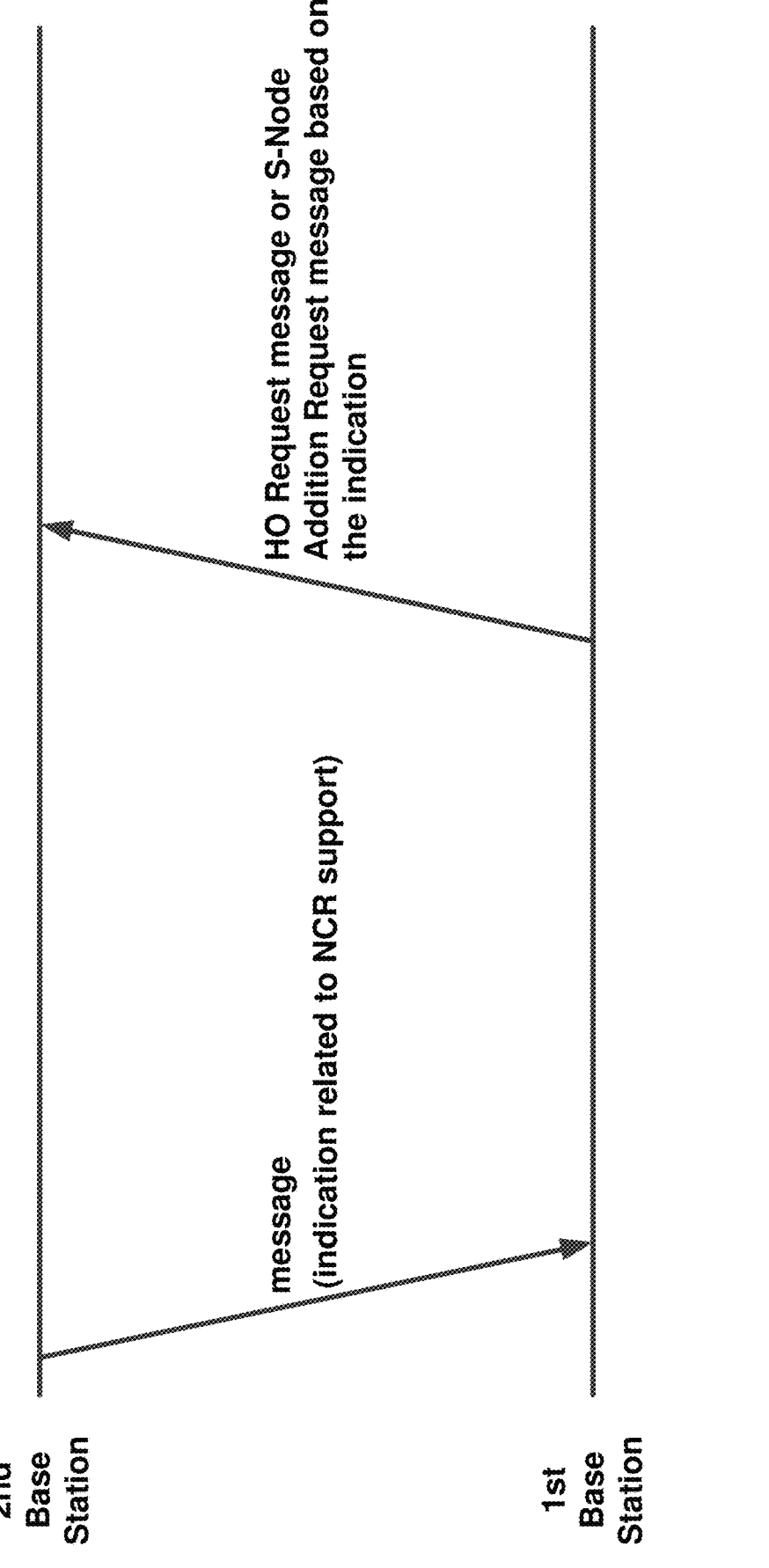
FIG. 33 shows an example process in accordance with several of various embodiments of the present disclosure.

In an example embodiment as shown in FIG. 33, a first base station may receive an application protocol message from a second base station (e.g., an Xn message, e.g., an Xn Setup Response message received in response to transmitting an Xn Setup Request message by the first base station to the second base station). The application protocol message may comprise an indication of NCR support (e.g., an indication of NCR support by the second base station and/or an indication of NCR support by/for a first cell of/associated with/provided by the second base station). The NCR support by the second base station or by the first cell may be based on forwarding uplink and/or downlink transmissions/channels/signals (e.g., via the first cell) using an NCR (e.g., using an NCR-Fwd function entity of the NCR). The indication may be that the second base station transmits side control information (SCI) (e.g., for/via the first cell) for controlling the NCR and/or that the second base station transmits/broadcasts NCR-related information/system information (e.g., for/via the first cell). In response to receiving the application protocol message, the first base station may determine to send and may send, to the second base station, a handover request message (e.g., for handover to the first cell of the second base station) or may send a secondary node addition request message (e.g., indicating a request to add the first cell of the second base station for dual connectivity operation of a wireless device).

In an example, a first base station may receive an application protocol message (e.g., an Xn message, e.g., an Xn Setup response message from a second base station in response to transmitting an Xn Setup Request message by the first base station to the second base station) from the second base station. The application protocol message (e.g., values of one or more information elements of the application protocol message) may indicate whether the second base station or a first cell of/provided by/associated with the second base station supports an NCR and/or whether SCI is transmitted by the second base station (e.g., for/via the first cell) and/or whether NCR-related information/system information is transmitted/broadcast by the second base station (e.g., for/via the first cell).

In an example, support for NCR (e.g., by the second base station and/or for/by a first cell of the second base station) may be based on supporting to forward uplink and/or downlink transmissions/signals/channels (e.g., uplink and/or downlink transmissions/signals/channels via the first cell) based on an NCR. In an example, support for an NCR for a first cell may be based on a frequency band/coverage area associated with the first cell.

In response to receiving the application protocol message, the first base station may transmit a handover request message or a secondary node addition request message to the second base station. For example, the first base station may transmit a handover request message indicating a request for handover of a wireless device from a cell provided by/associated with/of the first base station to the first cell of/associated with/provided by the second base station. The transmission of the handover request message may be in response to receiving, by the first base station, measurement information comprising first measurement information associated with the first cell of the second base station. The second base station may transmit a handover acknowledge message in response to admitting the wireless device. The handover acknowledge message may comprise configuration parameters (e.g., RRC configuration parameters) of the first cell. The first base station may further transmit the RRC configuration parameters of the first cell to the wireless device. The wireless device may initiate a random access process via the first cell of the second base station in response to receiving the RRC configuration parameters of the first cell.

Figure 34:
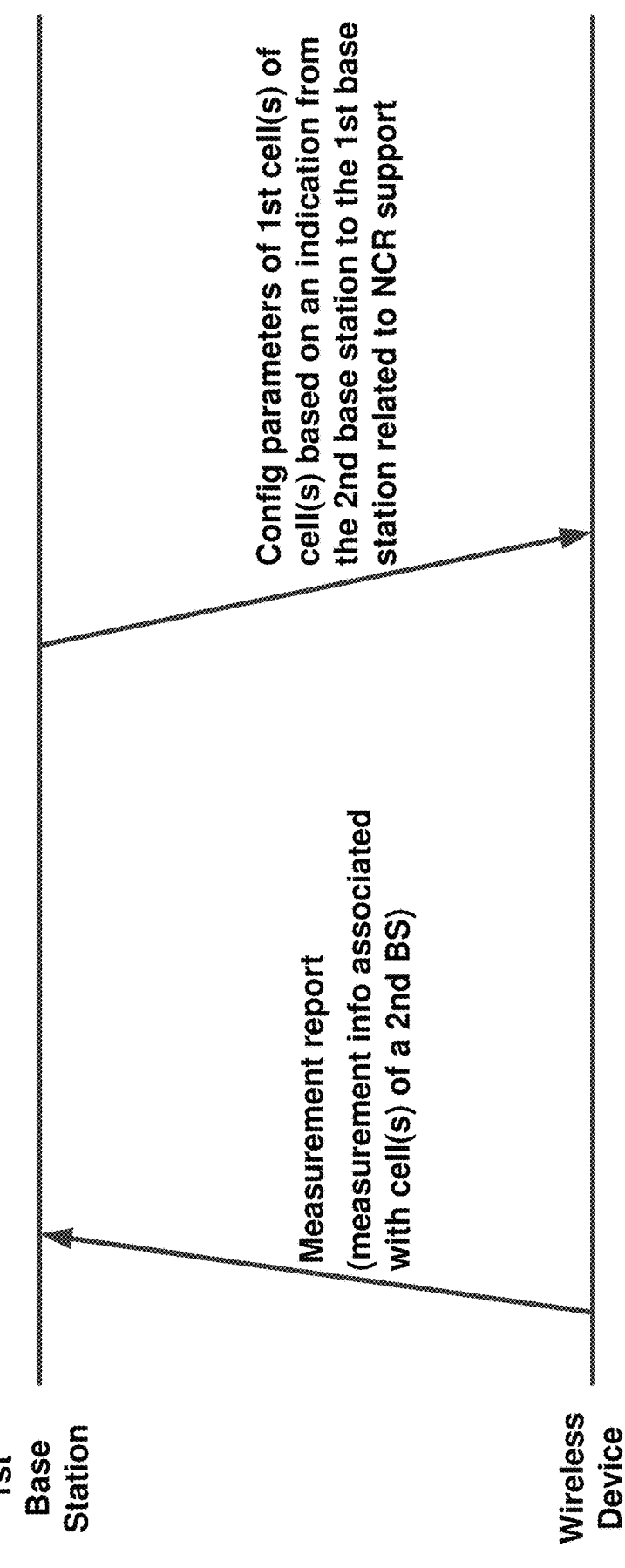
FIG. 34 shows an example process in accordance with several of various embodiments of the present disclosure.

In an example embodiment as shown in FIG. 34, a wireless device may transmit, to a first base station, a measurement report comprising measurement information associated with one or more cells of a second base station. In response to transmitting the measurement report, the wireless device may receive, from the first base station, configuration parameters of one or more first cells of the one or more cells. The receiving the configuration parameters may be based on an indication, that is sent by the second base station to the first base station and is related to NCR support by the second base station (e.g., based on NCR support by one or more cells of/provided by/associated with the second base station). For example, the indication may be that the second base station and/or that one or more first cells of/provided by/associated with the second base station supports NCR and/or SCI is transmitted for/via the one or more first cells and/or NCR-related system information/information is transmitted/broadcast by the base station for/via the one or more first cells.

Figure 35:
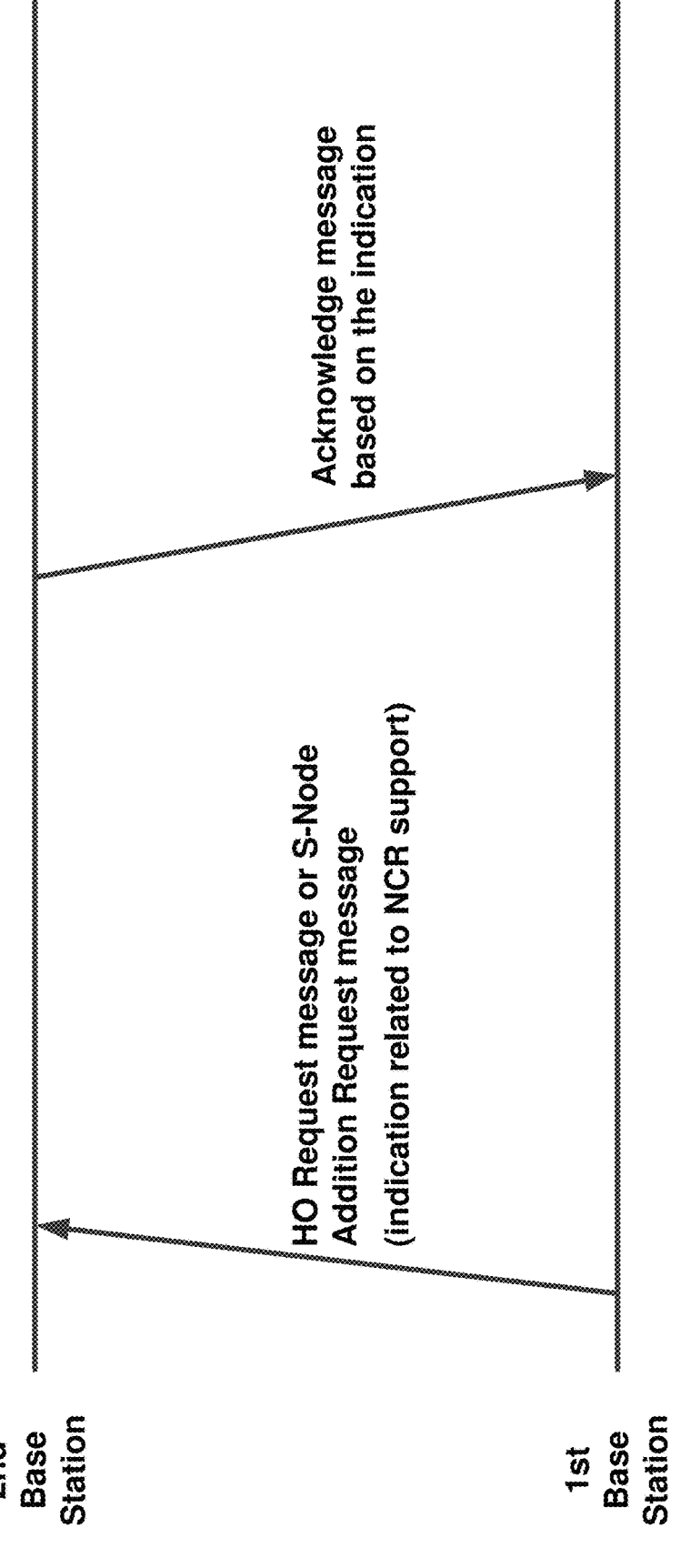
FIG. 35 shows an example process in accordance with several of various embodiments of the present disclosure.
Figure 36:
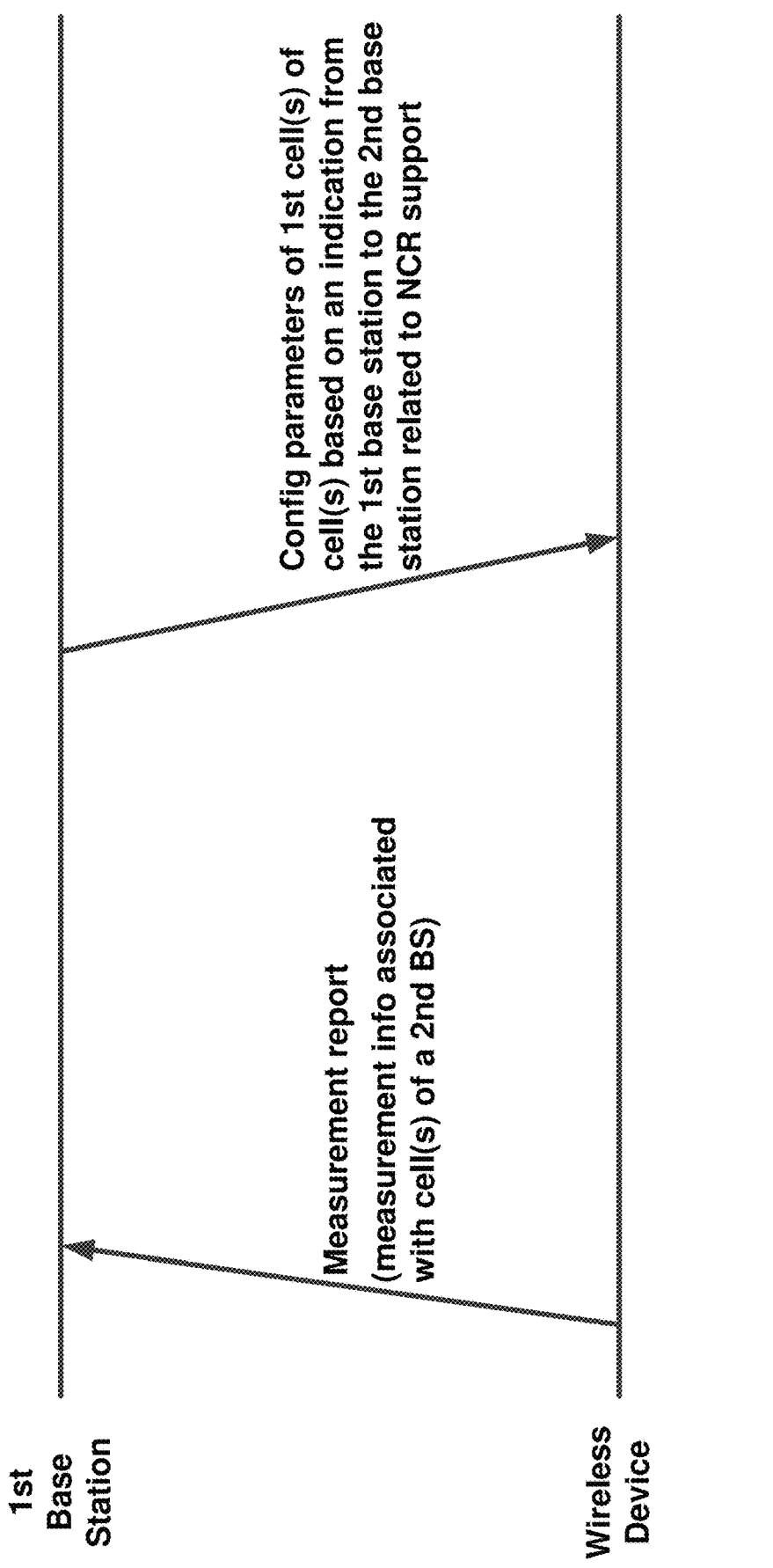
FIG. 36 shows an example process in accordance with several of various embodiments of the present disclosure.

In an example embodiment as shown in FIG. 35, a first base station may transmit a handover request message or a secondary node addition request to a second base station. The handover request message or the secondary node addition request message may comprise an indication related to NCR support/requirement for NCR support. In an example, the indication may be based on values of one or more information elements of the handover request message or the secondary node addition request message. In an example, the NCR support/requirement for NCR support may be based on NCR support by the second base station and/or NCR support by one or more first cells of/provided by/associated with the second base station and/or SCI transmission (e.g., SCI transmission by the second base station and/or SCI transmission by one or more first cells of/provided by/associated with the second base station) and/or transmission/broadcast of NCR-related information/system information (e.g., transmission/broadcast of NCR-related information/system information by the second base station and/or transmission/broadcast of NCR-related information/system information by one or more first cells of/provided by/associated with the second base station). The first base station may receive, from the second base station, an acknowledge message (e.g., a handover request acknowledge message, or a secondary node addition request acknowledge message) based on the indication. The first base station may receive the acknowledge message based on supporting NCR and/or SCI transmission and/or transmission/broadcast of NCR-related information/system information by the second base station and/or one or more first cells provided by the second base station. In case the second base station and/or one or more first cells provided by the second base station not supporting NCR and/or not transmitting SCI and/or not transmitting/broadcasting NCR-related information/system information, the second base station may transmit a handover reject message or a secondary node addition reject message.

In an example, the indication may indicate that the request is for a first cell of the second base station that supports an NCR and/or a first cell of the second base station via/for which side control information (SCI) is transmitted by the second base station and/or a first cell of the second base station via/for which NCR-related system information/information is transmitted/broadcast by the second base station.

In an example, a wireless device may transmit, to the first base station, and the first base station may receive one or more measurement reports comprising first measurement reports associated with one or more first cell of the second base station. The first base station may transmit the handover request message based on/in response to receiving the one or more measurement reports. In response to transmitting the handover request message, the first base station may receive a handover request acknowledge message comprising configuration parameters (e.g., RRC configuration parameters) of the first cell. The first base station may transmit the RRC configuration parameters to the wireless device to initiate a random access process via the first cell of the second base station.

In an example, a wireless device may transmit a measurement report comprising measurement information associated with one or more cells of a second base station. The wireless device may receive measurement configuration parameters and transmitting the measurement report may be based on the measurement configuration parameters. The wireless device may receive, from the first base station, configuration parameters of one or more first cells of the one or more cells based on an indication, from the first base station to the second base station, related to NCR support by (e.g., requirement for NCR support by) the second base station and/or one or more cells of the second base station.

In an example embodiment, message(s) (e.g., broadcast message(s), e.g., a SIB message, e.g., SIB1 message) and/or reference signal(s) (e.g., SSB or CSI-RS) may indicate whether a first cell supports NCR and/or whether SCI is transmitted by the base station for a first cell and/or whether NCR related information/system information is transmitted/broadcast via the first cell. The UE may determine, based on the message(s) and/or the reference signal(s), whether a first cell supports NCR and/or whether SCI is transmitted by the base station for the first cell and/or whether NCR related information/system information is transmitted/broadcast via the first cell. In an example, the UE may perform measurements (e.g., RRM measurements) for a first cell based on whether the first cell supports NCR and/or based on whether SCI is transmitted by the base station for the first cell and/or based on whether NCR related information/system information is transmitted/broadcast via the first cell. In an example, a UE (e.g., a UE in RRC idle or inactive state) may select or reselect a first cell to camp on based on whether the first cell supports NCR and/or based on whether SCI is transmitted by the base station for the first cell and/or based on whether NCR related information/system information is transmitted/broadcast via the first cell.

In an example embodiment, a wireless device may receive at least one message and/or at least one signal. The wireless device may determine, based on the at least one message and/or the at least one signal, whether a first cell supports a network controlled repeater (NCR). The wireless device may determine, based on the at least one message and/or the at least one signal, whether side control information (SCI) for a first cell is transmitted by a base station. The wireless device may determine, based on the at least one message and/or the at least one signal, whether NCR related information/system information is transmitted/broadcast via a first cell. The wireless device may perform measurements (e.g., radio resource management (RRM) measurements) for the first cell (e.g., for one or more beams of/associated with the first cell) based on the first cell supporting an NCR. The wireless device may perform measurements for the first cell (e.g., for one or more beams of/associated with the first cell) based on SCI being transmitted by the base station for the first cell. The wireless device may perform measurements for the first cell (e.g., for one or more beams of/associated with the first cell) based on NCR related information/system information being transmitted/broadcast via the first cell. The wireless device may perform measurements for the first cell (e.g., for one or more beams of/associated with the first cell) based on the determining indicating that the first cell supports an NCR. The wireless device may perform measurements for the first cell (e.g., for one or more beams of/associated with the first cell) based on the determining indicating that SCI is being transmitted by the base station for the first cell. The wireless device may perform measurements for the first cell (e.g., for one or more beams of/associated with the first cell) based on the determining indicating that NCR related information/system information being transmitted/broadcast via the first cell.

In an example, whether the first cell supports an NCR and/or the determining may be based on whether uplink transmissions and/or downlink transmissions via the first cell are forwarded by the NCR (e.g., by an NCR-Fwd function of the NCR).

In an example, whether the first cell supports an NCR and/or the determining may be based on a frequency band/coverage area associated with the first cell.

In an example, receiving the at least one message and/or the at least one signal may be via the first cell (e.g., via radio resources of/associated with the first cell).

In an example, the at least one message may comprise a broadcast message (e.g., a SIB message, e.g., SIB1). In an example, the broadcast message may comprise one or more information elements, wherein the determining may be based on values of the one or more information elements. In an example, the broadcast message may comprise one or more information elements with values indicating whether the first cell supports an NCR and/or whether SCI for the first cell is transmitted by the base station and/or whether NCR related information/system information is transmitted/broadcast via the first cell.

In an example, the at least one signal may comprise a synchronization signal/PBCH (SS/PBCH) block (e.g., SSB).

In an example, the determining may be based on one or more parameters associated with the at least one signal. In an example, the one or more parameters associated with the at least one signal may indicate whether the first cell supports NCR and/or whether SCI is transmitted for the first cell by the base station and/or whether NCR related information/system information is transmitted/broadcast by the base station via the first cell.

In an example, performing the measurements may be based on measuring one or more reference signals received via the first cell. In an example, the measurements may be based on determining reference signal received power (RSRP) and/or reference signal received quality (RSRQ) of the one or more reference signals. In an example, the one or more reference signals may comprise synchronization signal/physical broadcast channel block (SS/PBCH block (SSB)). In an example, the one or more reference signals may comprise a channel state information reference signal (CSI-RS).

In an example, the wireless device may transmit one or more measurement reports based on the measurements. In an example, the wireless device may receive a radio resource control (RRC) message (e.g., an RRC reconfiguration message) comprising configuration parameters of the first cell in response to transmitting the one or more measurement reports. In an example, receiving the RRC reconfiguration message may be for handover to the first cell. In an example, the wireless device may initiate a random access process via the first cell. In an example, the wireless device may be in an RRC connected state.

In an example, the wireless device may select or reselect the first cell to camp on based on the measurements. In an example, the wireless device may be in an RRC inactive state or an RRC idle state.

In an example, the wireless device may determine, based on the at least one message and/or the at least one signal, that a second cell does not support an NCR. The wireless device may determine, based on the at least one message and/or the at least one signal, that side control information (SCI) for the second cell is not transmitted by the base station. The wireless device may determine, based on the at least one message and/or the at least one signal, that NCR related information/system information is not transmitted/broadcast via the second cell. In an example, based on the second cell not supporting the NCR and/or based on SCI for the second cell not being transmitted by the base station and/or based on NCR related information/system information not being transmitted/broadcast by the base station via the second cell, the wireless device may not perform the measurements (e.g., the RRM measurements) for the second cell.

In an example, the NCR related information/system information may comprise random access parameters for random processes initiated by NCRs.

In an example, the NCR related information/system information comprise one or more parameters indicating a time division duplexing (TDD) configuration (e.g., for an NCR).

In an example, the NCR related information/system information comprise one or more parameters indicating ON-OFF information for an NCR.

In an example, the NCR related information/system information comprise one or more parameters indicating beamforming information.

In an example, the NCR related information/system information comprise one or more parameters indicating power control information.

In an example, SCI for the first cell may be transmitted by the base station based on a common physical downlink control channel (PDCCH).

In an example embodiment, message(s) (e.g., broadcast message(s), e.g., a SIB message, e.g., SIB1 message) and/or reference signal(s) (e.g., SSB or CSI-RS) may indicate whether a base station supports NCR and/or whether a base station transmits side control information (SCI) and/or whether NCR related information/system information is transmitted/broadcast by the base station. The UE may determine, based on the broadcast message(s) and/or the reference signal(s), whether a base station supports NCR and/or whether a base station transmits SCI and/or whether NCR related information/system information is broadcast by the base station. In an example, the UE may perform RRM measurements for a first cell of the base station based on whether the base statin supports NCR and/or based on whether the base station transmits side control information (SCI) and/or based on whether NCR related information/ system information is transmitted/broadcast by the base station. In an example, the UE (e.g., the UE in RRC idle or inactive state) may select or reselect a first cell of the base station to camp on based on whether the base statin supports NCR and/or based on whether the base station transmits side control information (SCI) and/or based on whether NCR related information/system information is transmitted/ broadcast by the base station.

In an example embodiment, a wireless device may receive at least one message and/or at least one signal. The wireless device may determine, based on the at least one message and/or the at least one signal, whether a base station supports a network controlled repeater (NCR). The wireless device may determine, based on the at least one message and/or the at least one signal, whether side control information (SCI) is transmitted by a base station. The wireless device may determine, based on the at least one message and/or the at least one signal, whether NCR related information/system information is transmitted/broadcast by a base station. The wireless device may perform measurements for a first cell of the base station (e.g., for one or more beams of the first cell) based on the base station supporting an NCR. The wireless device may perform measurements for a first cell of/associated with the base station (e.g., for one or more beams of the first cell) based on SCI being transmitted by the base station. The wireless device may perform measurements for a first cell of/associated with the base station (e.g., for one or more beams of the first cell) based on NCR related information/system information being transmitted/broadcast by the base station. The wireless device may perform measurements for a first cell of/associated with the base station (e.g., for one or more beams of the first cell) based on the determining indicating that the base station supports an NCR. The wireless device may perform measurements for a first cell of/associated with the base station (e.g., for one or more beams of the first cell) based on the determining indicating that SCI is being transmitted by the base station. The wireless device may perform measurements for a first cell of/associated with the base station (e.g., for one or more beams of the first cell) based on the determining indicating that NCR related information/system information being transmitted/broadcast by the base station.

In an example, whether the base station supports an NCR and/or the determining may be based on whether uplink transmissions and/or downlink transmissions are forwarded by the NCR (e.g., by an NCR-Fwd function of the NCR).

In an example, whether the base station supports an NCR and/or the determining may be based on a frequency band/ coverage area associated with the first cell.

In an example, receiving the at least one message or the at least one signal may be via a cell (e.g., the first cell of (associated with/provided by) the base station (e.g., via radio resources of/associated with the first cell)).

In an example, the at least one message may comprise a broadcast message (e.g., a SIB message, e.g., SIB1). In an example, the broadcast message may comprise one or more information elements, wherein the determining is based on values of the one or more information elements. In an example, the broadcast message may comprise one or more information elements with values indicating whether the base station supports an NCR and/or whether SCI is transmitted by the base station and/or whether NCR related information/system information is transmitted/broadcast by a base station.

In an example, the at least one signal may comprise a synchronization signal/physical broadcast channel (SS/ PBCH block (SSB)).

In an example, the determining may be based on one or more parameters associated with the at least one signal. In an example, the one or more parameters associated with the at least one signal may indicate whether the base station supports NCR. In an example, the one or more parameters associated with the at least one signal may indicate whether SCI is transmitted by the base station. In an example, the one or more parameters associated with the at least one signal may indicate whether NCR related information/system information is transmitted/broadcast by the base station.

In an example, performing the measurements may be based on measuring one or more reference signals received via the first cell. In an example, the measurements may be based on determining reference signal received power (RSRP) and/or reference signal received quality (RSRQ) of the one or more reference signals. In an example, the one or more reference signals may comprise a synchronization signal/physical broadcast channel block (SS/PBCH block (SSB)). In an example, the one or more reference signals may comprise a channel state information reference signal (CSI-RS).

In an example, the wireless device may transmit one or more measurement reports based on the measurements. In an example, the wireless device may receive a radio resource control (RRC) message (e.g., an RRC reconfiguration message) comprising configuration parameters of the first cell in response to transmitting the one or more measurement reports. In an example, receiving the RRC reconfiguration message may be for handover to the first cell. In an example, the wireless device may initiate a random access process via the first cell. In an example, the wireless device may be in an RRC connected state.

In an example, the wireless device may select or reselect the first cell to camp on based on the measurements. In an example, the wireless device may be in an RRC inactive state or an RRC idle state.

In an example, the NCR related information/system information may comprise random access parameters for random processes initiated by NCRs.

In an example, the NCR related information/system information comprise one or more parameters indicating a time division duplexing (TDD) configuration (e.g., for an NCR).

In an example, the NCR related information/system information comprise one or more parameters indicating ON-OFF information for an NCR.

In an example, the NCR related information/system information comprise one or more parameters indicating beamforming information.

In an example, the NCR related information/system information comprise one or more parameters indicating power control information.

In an example, SCI for the first cell may be transmitted by the base station based on a common physical downlink control channel (PDCCH).

In an example embodiment, a wireless device may receive at least one message and/or at least one signal. The wireless device may determine, based on the at least one message and/or the at least one signal, one or more network controlled repeater (NCR) parameters associated with a base station and/or associated with a first cell provided by the base station. The wireless device may perform measurements (e.g., RRM measurements) based on the one or more NCR related parameters.

In an example, the one or more NCR related parameters may indicate beamforming information.

In an example, the one or more NCR related parameters may indicate timing information.

In an example, the one or more NCR related parameters may indicate a time division duplexing (TDD) configuration (e.g., UL-DL TDD configuration).

In an example, the one or more NCR related parameters may indicate ON-OFF information associated with the NCR.

In an example, the one or more NCR related parameters may indicate power control information (e.g., for an NCR).

In an example, the one or more NCR related parameters indicate whether the first cell supports NCR and/or whether the base station transmits side control information (SCI), e.g., for the first cell of the base station and/or whether NCR related information/system information is transmitted/broadcast by the base station.

In an example, the one or more NCR related parameters and/or the determining may indicate whether the first cell supports an NCR and/or whether uplink transmissions and/or downlink transmissions via the first cell are forwarded by the NCR (e.g., by an NCR-Fwd function of the NCR).

In an example, the one or more NCR related parameters may indicate whether the first cell supports an NCR and/or a frequency band/coverage area associated with the first cell.

In an example, receiving the at least one message and/or the at least one signal may be via the first cell (e.g., via radio resources of/associated with the first cell).

In an example, the at least one message may comprise a broadcast message (e.g., a SIB message, e.g., SIB1). In an example, the broadcast message may comprise one or more information elements, wherein the determining may be based on values of the one or more information elements. In an example, the broadcast message may comprise one or more information elements with values indicating whether the first cell supports an NCR and/or whether SCI for the first cell is transmitted by the base station and/or whether NCR related information/system information is transmitted/broadcast via the first cell).

In an example, the at least one signal may comprise a synchronization signal/physical broadcast channel block (SS/PBCH block (SSB)).

In an example, the determining may be based on one or more parameters associated with the at least one signal. In an example, the one or more parameters associated with the at least one signal may indicate whether the first cell supports NCR and/or whether SCI is transmitted for the first cell by the base station and/or whether NCR related information/system information is transmitted/broadcast via the first cell.

In an example, performing the measurements may be based on measuring one or more reference signals received via the first cell. In an example, the measurements may be based on determining reference signal received power (RSRP) and/or reference signal received quality (RSRQ) of the one or more reference signals. In an example, the one or more reference signals may comprise a synchronization signal/physical broadcast channel block (SS/PBCH block (SSB)). In an example, the one or more reference signals may comprise a channel state information reference signal (CSI-RS).

In an example, the wireless device may transmit one or more measurement reports based on the measurements. In an example, the wireless device may receive a radio resource control (RRC) message (e.g., an RRC reconfiguration message) comprising configuration parameters of the first cell in response to transmitting the one or more measurement reports. In an example, the wireless device may receive a radio resource control (RRC) message (e.g., an RRC reconfiguration message) comprising configuration parameters of the first cell in response to transmitting the one or more measurement reports. In an example, receiving the RRC reconfiguration message may be for handover to the first cell. In an example, the wireless device may initiate a random access process via the first cell. In an example, the wireless device may be in an RRC connected state.

In an example, the wireless device may select or reselect the first cell to camp on based on the measurements. In an example, the wireless device may be in an RRC inactive state or an RRC idle state.

In an example embodiment, a network controlled repeater (NCR) may initiate a random access process (e.g., via the control link of the NCR). In an example, the NCR (e.g., the NCR-MT function of the NCR) may initiate a random access process on a cell (e.g., for initial access). In an example, the NCR may initiate the random access process via a cell (e.g., via a cell that supports NCR, e.g., as determined based on a message (e.g., a broadcast message) and/or a signal, e.g., transmitted via the cell). In an example, the NCR may initiate the random access process to determine the uplink timing (e.g., for UL transmitting timing of the NCR-Fwd and/or the UL transmitting timing of the NCR-MT).

In an example embodiment, a network controlled repeater (NCR) may determine whether a first cell supports a network controlled repeater (NCR). The NCR may determine whether side control information (SCI) is transmitted by a base station for a first cell. The NCR may determine whether NCR related information/system information is transmitted/broadcast by a base station (e.g., via a first cell). The NCR may initiate a random access process via the first cell based on the first cell supporting the NCR and/or based on SCI being transmitted by the base station for the first cell and/or based on NCR related information/system information being transmitted/broadcast by a base station.

In an example, whether the first cell supports an NCR and/or the determining may be based on whether uplink transmissions and/or downlink transmissions via the first cell are forwarded by the NCR (e.g., by an NCR-Fwd function of the NCR).

In an example, whether the first cell supports an NCR and/or the determining may be based on a frequency band/coverage area associated with the first cell.

In an example, the NCR may receive at least one message and/or at least one signal, wherein the determining may be based on the at least one message and/or the at least one signal. In an example, receiving the at least one message or the at least one signal may be via the first cell (e.g., via radio resources of/associated with the first cell). In an example, the at least one message may comprise a broadcast message (e.g., a SIB message, e.g., SIB1). In an example, the broadcast message may comprise one or more information elements, wherein the determining may be based on values of the one or more information elements. In an example, the broadcast message may comprise one or more information elements with values indicating whether the first cell supports an NCR and/or indicating whether SCI is being transmitted by the base station for the first cell and/or indicating whether NCR related information/system information is transmitted/broadcast by the base station (e.g., for the first cell). In an example, the at least one signal may comprise a synchronization signal/PBCH (SS/PBCH) block (SSB). In an example, the determining may be based on one or more parameters associated with the at least one signal. In an example, one or more parameters associated with the at least one signal may indicate whether the first cell supports NCR.

In an example, initiating the random access process may be to access (e.g., for initial access to) the first cell.

In an example, initiating the random access process may be for receiving a timing advance. In an example, the random access process may comprise receiving a random access response indicating the timing advance. In an example, the NCR may transmit an uplink transmission via a control link (e.g., based on an NCR-MT function) based on the timing advance. In an example, the NCR may transmit an uplink transmission via the backhaul link (NCR-Fwd function) based on the timing advance.

In an example embodiment, first RACH resources/preambles may be dedicated to NCRs. The first RACH resources/preambles may be indicated based on broadcast message(s) (e.g., a SIB message, e.g., SIB1 message). The RACH resources/preambles that are dedicated to the NCRs may be separate from RACH resources/preambles for/dedicated to regular UEs (e.g., based on separate broadcast configuration parameters for regular UEs and NCRs). The base station may determine whether a random access process is initiated by an NCR or by a regular UE based on the resources/preambles used in the random access process.

In an example embodiment, a wireless device may receive a message comprising one or more first random access configuration parameters and one or more second random access configuration parameters. The one or more first random access configuration parameters may be associated with/used in random access processes initiated by network controlled repeaters (NCRs). The one or more second random access configuration parameters may be associated with/used in random access processes initiated by wireless devices that are not NCRs. The wireless device may initiate a random access process. Based on the wireless device being an NCR, the random access process may be based on the one or more first random access configuration parameters. Based on the wireless device not being an NCR, the random access process may be based on the one or more second random access configuration parameters.

In an example, the message may be a broadcast message. In an example, the broadcast message may be a system information block (SIB) message (e.g., a SIB1 message).

In an example, the one or more first random access configuration parameters may indicate first random access preambles for random access processes initiated by NCRs. The one or more second random access configuration parameters may indicate second random access preambles for random access processes initiated by wireless devices that are not NCRs.

In an example, the one or more first random access configuration parameters may indicate first random access resources for random access processes initiated by NCRs. The one or more second random access configuration parameters may indicate second random access resources for random access processes initiated by wireless devices that are not NCRs.

In an example, the wireless device may be an NCR. The initiating the random access process may be based on the one or more first random access configuration parameters, and via the control link (e.g., based on the NCR-MT function).

In an example embodiment, an application protocol/Xn message (e.g., an Xn Setup message) may indicate whether a cell of a base station supports NCR (e.g., whether SCI is transmitted by the base station for the cell and/or whether NCR related information/system information is transmitted/broadcast by the base station via the cell). In an example, the application protocol/Xn message (e.g., the Xn status message) may comprise one or more information elements (IEs) indicating whether the cell of the base station supports NCR (e.g., whether SCI is transmitted by the base station for the cell and/or whether NCR related information/system information is transmitted/broadcast by the base station via the cell).

In an example embodiment a source base station may determine, based on the application protocol/Xn message, e.g., the Xn status message (e.g., based on values of one or more IEs in the application protocol/Xn message, e.g., the Xn status message), whether to send a handover request message for handover to a cell of the target base station or whether to send a secondary node addition request message indicating addition of the cell of the secondary base station. In an example, the source base station may determine based on the application protocol/Xn message, e.g., the Xn status message (e.g., based on values of one or more IEs in the application protocol/Xn message, e.g., the Xn status message) whether the cell of the target base station supports NCR (e.g., whether the target base station transmits SCI for the cell and/or whether NCR related information/system information is transmitted/broadcast by the base station via the cell).

In an example embodiment, a first base station may receive, from a second base station, an application protocol message (e.g., Xn message) comprising an indication related to network controlled repeater (NCR) support (e.g., transmission of side control information (SCI) and/or transmission/broadcast of NCR related information/system information). The first base station may transmit to the second base station, a handover request message or a secondary node addition request message based on the indication (e.g., based on the indication indicating NCR support and/or transmission of SCI and/or transmission/broadcast of NCR related information/system information).

In an example embodiment, a first base station may receive, from a second base station, an application protocol message (e.g., Xn message) indicating whether a first cell of the second base station supports a network controlled repeater (NCR) and/or whether SCI is transmitted by the second base station for the first cell and/or whether NCR-related information/system information is transmitted/broadcast by the second base station via the first cell. The first base station may transmit to the second base station, a handover request message or a secondary node addition request message based on the first cell supporting an NCR (e.g., based on SCI being transmitted by the second base station for the first cell and/or based on NCR-related information/system information being transmitted/broadcast by the second base station via the first cell).

In an example, whether the first cell supports an NCR may be based on whether uplink transmissions and/or downlink transmissions via the first cell are forwarded by the NCR (e.g., by an NCR-Fwd function of the NCR).

In an example, whether the first cell supports an NCR may be based on a frequency band/coverage area associated with the first cell.

In an example, the application layer message may comprise one or more information elements with values indicating whether the first cell of the second base station supports an NCR and/or whether SCI is transmitted by the second base station for the first cell and/or whether NCR-related information/system information is transmitted/broadcast by the second base station via the first cell.

In an example, the handover request may be for a wireless device. The transmitting the handover request message or the secondary node addition request message may further be based on receiving one or more measurement reports from the wireless device. In an example, the one or more measurement reports comprise first measurement information associated with the first cell.

In an example, the application layer message may be an Xn message. In an example, the Xn message may be an Xn Setup Request message. In an example, the first base station may transmit, to the second base station, an Xn Setup Response message.

In an example, the first base station may receive, from second base station, a handover request acknowledge message in response to transmitting the handover request message. In an example, the handover request acknowledge message many comprise radio resource control (RRC) configuration parameters of the first cell. In an example, the first base station may transmit the RRC configuration parameters to a wireless device.

In an example, the handover request may be for a wireless device. The wireless device may be served (e.g., served before handover to the first cell of the second base station) by a cell of the first base station based on/via an NCR.

In an example embodiment, an application protocol/Xn message (e.g., Xn Setup message) may indicate whether a base station supports NCR (e.g., whether SCI is transmitted by the base station and/or whether NCR related system information/information is transmitted/broadcast by the base station).

In an example embodiment, a source base station may determine, based on the application protocol/Xn message (e.g., the Xn Setup message), whether to send a handover request message to a cell of target base station or a secondary node addition request, based on whether the target base station supports NCR and/or whether SCI being transmitted by the second base station and/or whether NCR related system information/information is transmitted/broadcast by the target base station.

In an example embodiment, a first base station may receive, from a second base station, an application protocol message (e.g., Xn message) indicating whether the second base station supports a network controlled repeater (NCR) and/or whether side control information (SCI) is transmitted by the second base station and/or whether NCR-related system information/information is transmitted/broadcast by the second base station. The first base station may transmit to the second base station, a handover request message or a secondary node addition request message based on the second base station supporting an NCR and/or based on SCI being transmitted by the second base station and/or based on NCR-related system information/information being transmitted/broadcast by the second base station.

In an example, the application layer message may comprise one or more information elements with values indicating whether the second base station supports an NCR and/or whether SCI is transmitted by the second base station and/or whether NCR-related system information/information is transmitted/broadcast by the second base station.

In an example, the handover request may be for a wireless device. The transmitting the handover request message or the secondary node addition request message may further be based on receiving one or more measurement reports from the wireless device.

In an example, the application protocol message may be an Xn message. In an example, the Xn message may be an Xn Setup Request message. In an example, the first base station may transmit to the second base station an Xn Setup Response message.

In an example, the first base station may receive from the second base station, a handover request acknowledge message in response to transmitting the handover request message. In an example, the handover request acknowledge message may comprise radio resource control (RRC) configuration parameters of a first cell of the second base station. In an example, the first base station may transmit the RRC configuration parameters to a wireless device.

In an example, the handover request may be for a wireless device. The wireless device may be served (e.g., served before handover to a first cell of the second base station) by a cell of the first base station based on/via an NCR.

In an example embodiment, a wireless device may transmit to a first base station, a measurement report comprising measurement information associated with one or more cells of a second base station. The wireless device may receive from the first base station, configuration parameters of one or more first cells of the one or more cells based on an indication, from the second base station to the first base station, related to NCR support by the second base station.

In an example embodiment, a wireless device may transmit to a first base station, a measurement report comprising measurement information associated with one or more cells of a second base station. The wireless device may receive from the first base station, configuration parameters of one or more first cells of the one or more cells based on an indication, from the second base station to the first base station, indicating that the one or more first cells support NCR (e.g., SCI is transmitted by the second base station for the first cell and/or NCR-related system information/information is transmitted/broadcast by the second base station for the one or more first cells).

In an example embodiment, a wireless device may transmit, to a first base station, a measurement report comprising measurement information associated with one or more cells of a second base station. The wireless device may receive, from the first base station, configuration parameters of one or more first cells of the one or more cells based on an indication, from the second base station to the first base station, indicating that the second base station supports NCR and/or SCI is transmitted by the second base station and/or NCR-related system information/information is transmitted/broadcast by the second base station.

In an example embodiment, a handover request message or an S-Node addition request message may indicate whether the new cell of the target base station is required to support a network controlled repeater and/or whether the target base station is required to transmit side control information (SCI) for the new cell and/or whether target base station is required to transmit/broadcast NCR-related system information/information. In an example, the target base station may transmit a handover request acknowledge message or an S-Node addition request acknowledge message indicating accepting the handover request, e.g., in response to the new cell of the target base station supporting a network controlled repeater and/or the target base station transmitting SCI for the new cell of the target base station and/or the target base station transmitting NCR-related system information/information for the new cell.

In an example embodiment, a first base station may transmit to a second base station, a handover request message or a secondary node addition request message comprising an indication related to a network controlled repeater (NCR) support and/or side control information (SCI) transmission by the second base station and/or transmission/broadcast of NCR-related system information by the second base station. The first base station may receive, from the second base station, a handover request acknowledge message or a secondary node addition request acknowledge message based on the indication.

In an example, the indication may be based on value of one or more information elements of the handover request message or the secondary node addition request message.

In an example, the indication may indicate that the request is for a first cell of the second base station that supports a network controlled repeater (NCR) and/or for a first cell of the second base station via/for which side control information (SCI) is transmitted by the second base station and/or for a first cell of the second base station via/for which NCR-related system information/information is transmitted/broadcast by the second base station. In an example, receiving the handover request acknowledge message or the secondary node addition request acknowledge message may be in response to the first cell supporting a NCR and/or SCI being transmitted by the second base station via/for the first cell and/or NCR-related system information/information being transmitted/broadcast by the second base station via/for the first cell.

In an example, the handover request message or the secondary node addition request message may comprise one or more information elements with values indicating that the request is for the first cell of the second base station that supports an NCR and/or for a first cell of the second base station via/for which SCI is transmitted by the second base station and/or for a first cell of the second base station via/for which NCR-related system information/information is transmitted/broadcast. In an example, the handover request message or the secondary node addition request message may be for a wireless device. The transmitting the handover request message or the secondary node addition request message may further be based on receiving one or more measurement reports from the wireless device. In an example, the handover request acknowledge message may comprise radio resource control (RRC) configuration parameters of the first cell. In an example, the first base station may transmit the RRC configuration parameters to the wireless device.

In an example, the handover request may be for a wireless device. The wireless device may be served (e.g., served before handover to the first cell of the second base station) by a cell of the first base station based on an NCR.

In an example embodiment, a wireless device may transmit, to a first base station, a measurement report comprising measurement information associated with one or more cells of a second base station. The wireless device may receive, from the first base station, configuration parameters of one or more first cells of the one or more cells based on an indication, from the first base station to the second base station, related to NCR support by the second base station.

In an example embodiment as shown in FIG. 37, a network controlled repeater (NCR, e.g., an NCR wireless device, e.g., a wireless device that is an NCR) may comprise a first entity (e.g., an MT-NCR entity) and a function (e.g., a Fwd-NCR function). As described in FIG. 26, the NCR-MT may be an entity (e.g., an entity that supporting some of the UE functionality) that may communicates with the base station to receive side control information (SCI). The reception of the SCI may be via a control link between the NCR-MT and the base station. For example, the reception of the SCI via the control link may be based on L1/L2 signaling. The control link may be based on a Uu interface. The NCR-Fwd may be a function performing amplifying-and-forwarding of signals between the base station and UE. The link between the NCR-Fwd and the base station may be referred to as an NCR-Fwd backhaul link and the link between a wireless device (UE) and NCR-Fwd may be referred to as an NCR-Fwd access link, respectively. The behavior of the NCR-Fwd may be controlled according to the side control information (SCI) received from the gNB (e.g., received by the NCR-MT entity from the base station via the control link). The SCI may be used to control the amplifying and/or forwarding functions performed by the NCR-Fwd. For example, the SCI may comprise beam indication information (e.g., beam indication for the backhaul link or the access link). In an example, the beam indication information may be based on using a beam index. The NCR (e.g., the NCR-MT entity of the NCR) may receive a SIB message (e.g., SIB1). The SIB message may be associated with/for a cell. The SIB message may comprise an information element indicating that the cell supports NCR. The value of the information element may indicate that the cell supports NCR. The NCR may be in an RRC idle state or an RRC inactive state. The NCR may select the cell (e.g., select while in the RRC idle state or in the RRC inactive state) based on/in response to receiving the SIB message and the IE of the SIB message indicating that the cell supports an NCR.

In an example, the NCR (e.g., the NCR wireless device) may initiate a random access process (e.g., for initial access and/or for transitioning from the RRC idle state or the RRC inactive state to an RRC connected state). The NCR (e.g., the NCR wireless device) may initiate the random access process based on the cell supporting an NCR (e.g., based on/in response to receiving the SIB message and the SIB message comprising the IE indicating NCR support for the cell).

In an example, the NCR (e.g., the NCR wireless device) may perform measurements (e.g., radio resource management (RRM) measurements) associated with the cell. In an example, the NCR (e.g., the NCR wireless device) may select the cell further based on the measurement results derived in response to performing the measurements. In an example, the NCR (e.g., the NCR wireless device) may perform the measurements in response to/based on the cell supporting NCR (e.g., based on/in response to receiving the SIB message and the SIB message comprising the IE indicating NCR support for the cell).

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 38 shows an example flow diagram in accordance with several of various embodiments of the present disclosure. At 3810, a network controlled repeater (NCR) may receive, from a base station, a system information block (SIB) message comprising an information element (IE) indicating that a cell supports an NCR. An NCR may be a radio frequency (RF) repeater comprising a first entity and a first function. The first entity of the NCR may be associated with receiving side control information from the base station via a control link between the first entity and the base station. The first function of the NCR may be associated with amplifying and forwarding of signals between a wireless device and the base station based on the side control information. At 3820, the NCR may select the cell based on the SIB message comprising the IE indicating that the cell supports an NCR.

In an example embodiment, the forwarding may be based on: an access link between the wireless device and the first function of the NCR; and a backhaul link between the first function of the NCR and the base station.

In an example embodiment, the NCR may initiate a random access process via the cell in response to the cell supporting the NCR (e.g., in response to the received SIB message comprising the IE indicating that the cell supports an NCR).

In an example embodiment, the behavior of the first function may be controlled according to the side control information.

In an example embodiment, the NCR may be in a radio resource control (RRC) idle state.

In an example embodiment, the NCR may be in a radio resource control (RRC) inactive state.

In an example embodiment, the NCR may perform measurements associated with the cell.

In an example embodiment, receiving the side control information via the control link may be based on L1/L2 signaling.

In an example embodiment, the control link may be based on a Uu interface.

In an example embodiment, the side control information may comprise beam indication. In an example embodiment, the beam indication may comprise backhaul link (e.g., the backhaul link between the base station and the NCR) beam indication. In an example embodiment, In an example embodiment, the beam indication may comprise access link (e.g., the access link between the function and the wireless device) beam indication. In an example embodiment, the beam indication may be based on a beam index.

FIG. 39 shows an example flow diagram in accordance with several of various embodiments of the present disclosure. At 3910, a network controlled repeater (NCR) may receive, from a base station, a system information block (SIB) message comprising an information element (IE) indicating that a cell supports an NCR. An NCR may be a radio frequency (RF) repeater associated with amplifying and forwarding of signals between a wireless device and the base station based on side control information received by the NCR from the base station. At 3920, the NCR may select the cell based on the SIB message comprising the IE indicating that the cell supports an NCR.

In an example embodiment, an NCR may comprise a first entity and a first function. The first entity of the NCR may be associated with receiving the side control information from the base station via a control link between the first entity and the base station. The first function of the NCR may be associated with the amplifying and the forwarding of the signals between the wireless device and the base station based on the side control information. In an example embodiment, the side control information may be received by the NCR via the first entity of the NCR using a Uu interface. In an example embodiment, the behavior of the first function of the NCR may be controlled according to the side control information.

FIG. 40 shows an example flow diagram in accordance with several of various embodiments of the present disclosure. At 4010, a network controlled repeater (NCR) may receive, from a base station, a system information block (SIB) message comprising an information element (IE) indicating that that a cell supports an NCR. An NCR may be a radio frequency (RF) repeater comprising a first entity and a first function. At 4020, the NCR may initiate a random access process via the cell based on the cell supporting an NCR. At 4030, the NCR may receive side control information via a control link between the first entity and the base station. At 4040, the NCR may amplify and forward signals between a wireless device and the base station based on the side control information.

In an example embodiment, the forwarding, at 4040, may be based on: an access link between the wireless device and the first function of the NCR; and a backhaul link between the first function of the NCR and the base station.

In an example embodiment, the behavior of the first function may be controlled according to the side control information.

In an example embodiment, the NCR may perform measurements associated with the cell.

In an example embodiment, the initiating the random access process, at 4020, may be for an initial access to the cell. In an example embodiment, the NCR may receive a timing advance value in response to initiating the random access process. In an example embodiment, an uplink transmission via the control link may be based on the timing advance value. In an example embodiment, the NCR may transition from a radio resource control (RRC) idle state or an RRC inactive state to an RRC connected state in response to the initiating the random access process at 4020.

FIG. 41 shows an example flow diagram in accordance with several of various embodiments of the present disclosure. At 4110, a network controlled repeater (NCR) may receive, from a base station, a system information block (SIB) message comprising an information element (IE) indicating that that a cell supports an NCR. An NCR may be radio frequency (RF) repeater associated with amplifying and forwarding of signals between a wireless device and the base station based on side control information received by the NCR from the base station. At 4120, the NCR may initiate a random access process via the cell based on the cell supporting an NCR.

In an example embodiment, an NCR may comprise a first entity and a first function. The first entity of the NCR may be for communications with the base station and receiving the side control information via a control link between the first entity and the base station. The first function of the NCR may be for the amplifying and the forwarding of the signals between the wireless device and the base station based on the side control information. In an example embodiment, the side control information may be received by the NCR via the first entity of the NCR using a Uu interface. In an example embodiment, the behavior of the first function of the NCR is controlled according to the side control information.

FIG. 42 shows an example flow diagram in accordance with several of various embodiments of the present disclosure. At 4210, a wireless device may receive at least one message and/or at least one signal. At 4220, the wireless device may determine, based on the at least one message and/or the at least one signal, one or more network controlled repeater (NCR) related parameters associated with a base station or a first cell provided by the base station. At 4230, the wireless device may perform measurements based on the one or more NCR related parameters.

In an example embodiment, the one or more NCR related parameters, determined at 4220, may indicate beam/beamforming information.

In an example embodiment, the one or more NCR related parameters, determined at 4220, may indicate timing information.

In an example embodiment, the one or more NCR related parameters, determined at 4220, may indicate a time division duplexing (TDD) configuration (e.g., UL/DL TDD configuration).

In an example embodiment, the one or more NCR related parameters, determined at 4220, may indicate ON-OFF information.

In an example embodiment, the one or more NCR related parameters, determined at 4220, may indicate power control information.

In an example embodiment, the one or more NCR related parameters, determined at 4220, may indicate whether the first cell supports NCR and/or whether the base station transmits side control information (SCI), e.g., for the first cell of the base station and/or whether NCR related information/system information is transmitted/broadcast by the base station. In an example embodiment, the one or more NCR related parameters, determined at 4220, may indicate whether the first cell supports an NCR and/or whether uplink transmissions and/or downlink transmissions via the first cell are forwarded by the NCR (e.g., by an NCR-Fwd function of the NCR).

In an example embodiment, the one or more NCR related parameters, determined at 4220, may indicate whether the first cell supports an NCR and/or a frequency band/coverage area associated with the first cell.

In an example embodiment, receiving the at least one message and/or the at least one signal, at 4210, may be via the first cell (e.g., via radio resources of/associated with the first cell).

In an example embodiment, the at least one message, received at 4210, may comprise a broadcast message (e.g., a SIB message, e.g., SIB1). In an example embodiment, the broadcast message may comprise one or more information elements, wherein the determining, at 4220, may be based on values of the one or more information elements. In an example embodiment, the broadcast message may comprise one or more information elements with values indicating whether the first cell supports an NCR and/or whether SCI for the first cell is transmitted by the base station and/or whether NCR related information/system information is transmitted/broadcast via the first cell.

In an example embodiment, the at least one signal, received at 4210, may comprise a synchronization signal block (SSB) (synchronization signal/PBCH (SS/PBCH) block).

In an example embodiment, the determining at 4220, may be based on one or more parameters associated with the at least one signal received at 4210. In an example embodiment, the one or more parameters associated with the at least one signal, received at 4210, may indicate whether the first cell supports NCR and/or whether SCI is transmitted for the first cell by the base station and/or whether NCR related information/system information is transmitted/broadcast via the first cell.

In an example embodiment, performing the measurements, at 4230, may be based on measuring one or more reference signals received via the first cell at 4210. In an example embodiment, the measurements, at 4230, may be based on determining reference signal received power (RSRP) and/or reference signal received quality (RSRQ) of the one or more reference signals. In an example embodiment, the one or more reference signals may comprise a synchronization signal/physical broadcast channel block (SS/PBCH block (SSB)). In an example embodiment, the one or more reference signals may comprise a channel state information reference signal (CSI-RS).

In an example embodiment, the wireless device may transmit one or more measurement reports based on the measurements at 4230. In an example embodiment, the wireless device may receive a radio resource control (RRC) message (e.g., an RRC reconfiguration message) comprising configuration parameters of the first cell in response to transmitting the one or more measurement reports. In an example embodiment, the wireless device may receive the RRC reconfiguration message may be for handover to the first cell.

In an example embodiment, the wireless device may initiate a random access process via the first cell. In an example embodiment, the wireless device may be in an RRC connected state.

In an example embodiment, the wireless device may select or reselect the first cell to camp on based on the measurements. In an example embodiment, the wireless device may be in an RRC inactive state or an RRC idle state.

FIG. 43 shows an example flow diagram in accordance with several of various embodiments of the present disclosure. At 4310, a wireless device may receive a message comprising: one or more first random access configuration parameters that are used in random access processes initiated by a network controlled repeater (NCR); and one or more second random access configuration parameters that are used in random access processes initiated by a wireless device that is not an NCR. At 4320, the wireless device may initiate a random access process, that is: using the one or more first random access configuration parameters based on the wireless device being an NCR; and using the one or more second random access configuration parameters based on the wireless device not being an NCR.

In an example embodiment, the message may be a broadcast message. In an example, the broadcast message may be system information block (SIB) message.

In an example embodiment, the one or more first random access configuration parameters indicate first random access preambles for random access processes initiated by NCRs. The one or more second random access configuration parameters may indicate second random access preambles for random access processes initiated by wireless devices that are not NCRs.

In an example embodiment, the one or more first random access configuration parameters indicate first random access resources for random access processes initiated by NCRs. The one or more second random access configuration parameters may indicate second random access resources for random access processes initiated by wireless devices that are not NCRs.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a network controlled repeater (NCR) from a base station, a system information block (SIB) message comprising:
   an information element (IE) indicating that a cell supports an NCR;
   first random access parameters associated with NCRs; and
   second random access parameters associated with wireless devices that are not NCRs;
   wherein:
   an NCR is a radio frequency (RF) repeater comprising a first entity and a first function;

the first entity of the NCR is associated with receiving side control information from the base station via a control link between the first entity and the base station; and the first function of the NCR is associated with amplifying and forwarding of signals between a wireless device and the base station based on the side control information;

selecting the cell based on the IE indicating that the cell supports an NCR; and initiating a random access process via the cell based on the first random access parameters and in response to the cell supporting the NCR.

2. The method of claim 1, wherein the forwarding is based on:

an access link between the wireless device and the first function of the NCR; and a backhaul link between the first function of the NCR and the base station.

3. The method of claim 1, wherein the random access process is based on the first random access parameters based on being initiated by an NCR.

4. The method of claim 1, wherein the behavior of the first function is controlled according to the side control information.

5. The method of claim 1, wherein the NCR is in a radio resource control (RRC) idle state.

6. The method of claim 1, wherein the NCR is in a radio resource control (RRC) inactive state.

7. The method of claim 1, further comprising performing measurements associated with the cell.

8. A network controlled repeater (NCR) comprising:

one or more processors; and memory storing instructions that, when executed by the one or more processors, cause the NCR to:

receive, from a base station, a system information block (SIB) message comprising:

an information element (IE) indicating that that a cell supports an NCR;

first random access parameters associated with NCRs; and second random access parameters associated with wireless devices that are not NCRs;

wherein:

an NCR is a radio frequency (RF) repeater comprising a first entity and a first function;

the first entity of the NCR is associated with receiving side control information from the base station via a control link between the first entity and the base station; and the first function of the NCR is associated with amplifying and forwarding of signals between a wireless device and the base station based on the side control information;

select the cell based on the IE indicating that the cell supports an NCR and initiate a random access process via the cell based on the first random access parameters and in response to the cell supporting the NCR.

9. The NCR of claim 8, wherein the forwarding is based on:

an access link between the wireless device and the first function of the NCR; and a backhaul link between the first function of the NCR and the base station.

10. The NCR of claim 8, wherein the random access process is based on the first random access parameters based on being initiated by an NCR.

11. The NCR of claim 8, wherein the behavior of the first function is controlled according to the side control information.

12. The NCR of claim 8, wherein the NCR is in a radio resource control (RRC) idle state.

13. The NCR of claim 8, wherein the NCR is in a radio resource control (RRC) inactive state.

14. The NCR of claim 8, wherein the instructions, when executed by the one or more processors, cause the NCR to perform measurements associated with the cell.

15. A system comprising:

a base station; and a network controlled repeater (NCR) comprising: one or more processors; and memory storing instructions that, when executed by the one or more processors, cause the NCR to: receive, from the base station, a system information block (SIB) message comprising: an information element (IE) indicating that a cell supports an NCR; first random access parameters associated with NCRs; and second random access parameters associated with wireless devices that are not NCRs; wherein: an NCR is a radio frequency (RF) repeater comprising a first entity and a first function; the first entity of the NCR is associated with receiving side control information from the base station via a control link between the first entity and the base station; and; and the first function of the NCR is associated with amplifying and forwarding of signals between a wireless device and the base station based on the side control information; select the cell based on the IE indicating that the cell supports an NCR and initiate a random access process via the cell based on the first random access parameters and in response to the cell supporting the NCR.

16. The system of claim 15, wherein the forwarding is based on:

an access link between the wireless device and the first function of the NCR; and a backhaul link between the first function of the NCR and the base station.

17. The system of claim 15, wherein the random access process is based on the first random access parameters based on being initiated by an NCR.

18. The system of claim 15, wherein the behavior of the first function is controlled according to the side control information.

19. The system of claim 15, wherein the NCR is in a radio resource control (RRC) idle state.

20. The system of claim 15, wherein the NCR is in a radio resource control (RRC) inactive state.

\* \* \* \* \*